(12) United States Patent
Schechter

(10) Patent No.: US 11,959,296 B2
(45) Date of Patent: Apr. 16, 2024

(54) GRAVESIDE MEMORIAL TELEPRESENCE METHOD, APPARATUS AND SYSTEM

(71) Applicant: GraveTime Inc., Brooklyn, NY (US)

(72) Inventor: Joseph Schechter, Brooklyn, NY (US)

(73) Assignee: GraveTime Inc., Brooklyn, NY (US)

( * ) Notice: Subject to any disclaimer, the term of this patent is extended or adjusted under 35 U.S.C. 154(b) by 229 days.

(21) Appl. No.: 17/614,543

(22) PCT Filed: May 30, 2020

(86) PCT No.: PCT/US2020/035473
§ 371 (c)(1),
(2) Date: Nov. 28, 2021

(87) PCT Pub. No.: WO2020/243680
PCT Pub. Date: Dec. 3, 2020

(65) Prior Publication Data
US 2022/0307284 A1  Sep. 29, 2022

Related U.S. Application Data

(60) Provisional application No. 62/854,499, filed on May 30, 2019.

(51) Int. Cl.
*G06T 7/20* (2017.01)
*E04H 13/00* (2006.01)
(Continued)

(52) U.S. Cl.
CPC ............ *E04H 13/003* (2013.01); *G06T 7/20* (2013.01); *H04N 7/183* (2013.01); *H04R 1/028* (2013.01);
(Continued)

(58) Field of Classification Search
None
See application file for complete search history.

(56) References Cited

U.S. PATENT DOCUMENTS

| 2,500,646 A | 3/1950 | Riesz |
| 3,604,852 A | 9/1971 | Weintraub |

(Continued)

FOREIGN PATENT DOCUMENTS

| CN | 102236994 A | 11/2010 |
| CN | 203099509 U | 7/2013 |

(Continued)

*Primary Examiner* — Eileen M Adams
(74) *Attorney, Agent, or Firm* — Lance M. Pritikin

(57) ABSTRACT

Apparatus and associated methods relate to a graveside communications device exchanging multimedia between a grave and a user's communications device remote from the grave, activating an energy emitter configured by the graveside device to physically interact with the grave responsive to the remote user's activity, and sending to the user's communication device a live indication of the interaction. In an illustrative example, the device at the grave may include a video camera. The user's device may be configured to exchange multimedia with the graveside device. In some examples, the energy emitter may be a laser pointer directed at the grave. The remote user's activity may be, for example, the user1 s voice captured by the user's smartphone modulating the laser pointer light. Various examples may advantageously provide graveside telepresence, permitting a user physical interaction with a grave, and providing live indication of the interaction to the user.

18 Claims, 63 Drawing Sheets

(51) Int. Cl.
*H04N 7/18* (2006.01)
*H04R 1/02* (2006.01)
*H04R 1/08* (2006.01)
*H04R 3/00* (2006.01)
*G02B 27/20* (2006.01)
*H04L 67/55* (2022.01)

(52) U.S. Cl.
CPC ............... *H04R 1/08* (2013.01); *H04R 3/00* (2013.01); *G02B 27/20* (2013.01); *G06T 2207/10016* (2013.01); *H04L 67/55* (2022.05); *H04R 2420/07* (2013.01); *H04R 2499/11* (2013.01)

(56) References Cited

U.S. PATENT DOCUMENTS

| | | |
|---|---|---|
| 4,376,404 A | 3/1983 | Haddad |
| 5,729,921 A | 3/1998 | Rojas |
| 6,324,736 B1 | 12/2001 | Atrio |
| 6,414,663 B1 | 7/2002 | Manross, Jr. |
| 6,637,911 B2 | 10/2003 | Sittner |
| 6,681,534 B2 | 1/2004 | David et al. |
| 6,956,599 B2 | 10/2005 | Lim et al. |
| 6,980,107 B1 | 12/2005 | Ziegler |
| 6,989,736 B2 | 1/2006 | Berberich et al. |
| 7,089,495 B2 | 8/2006 | Barrows |
| 7,665,881 B2 | 2/2010 | Elam |
| 7,765,655 B2 | 8/2010 | Dannenberg |
| 9,987,184 B2 | 6/2018 | Borovinov |
| 10,015,628 B1 | 7/2018 | Heintz |
| 2001/0036354 A1 | 11/2001 | Majors |
| 2002/0175915 A1 | 11/2002 | Lichtfuss |
| 2003/0038928 A1 | 2/2003 | Alden |
| 2003/0208890 A1 | 11/2003 | Kim |
| 2003/0217120 A1 | 11/2003 | Hickey et al. |
| 2006/0281403 A1 | 12/2006 | Richards et al. |
| 2010/0307037 A1 | 12/2010 | Chi |
| 2011/0047893 A1 | 3/2011 | Iezza |
| 2014/0211961 A1 | 7/2014 | Koch |
| 2014/0218519 A1 | 8/2014 | Borovinov |
| 2014/0233906 A1 | 8/2014 | Neskin et al. |
| 2014/0239251 A1* | 8/2014 | Abe ................ H01S 5/34326 257/13 |
| 2016/0002948 A1* | 1/2016 | Galarza ............. E04H 13/003 386/230 |
| 2016/0142830 A1 | 5/2016 | Hu |
| 2016/0275103 A1* | 9/2016 | Robinson .......... G06F 16/487 |
| 2017/0041584 A1* | 2/2017 | Jones .................. H04N 5/76 |
| 2017/0321920 A1* | 11/2017 | Rosen ................ F24F 11/46 |

FOREIGN PATENT DOCUMENTS

| | | |
|---|---|---|
| CN | 207277964 U | 4/2018 |
| FR | 2746665 A1 | 10/1997 |
| JP | 11112971 A | 4/1999 |
| JP | 2003186379 A | 7/2003 |
| JP | 2007129623 A | 5/2007 |
| JP | 2015152316 A | 8/2015 |
| JP | 3215247 U | 3/2018 |

* cited by examiner

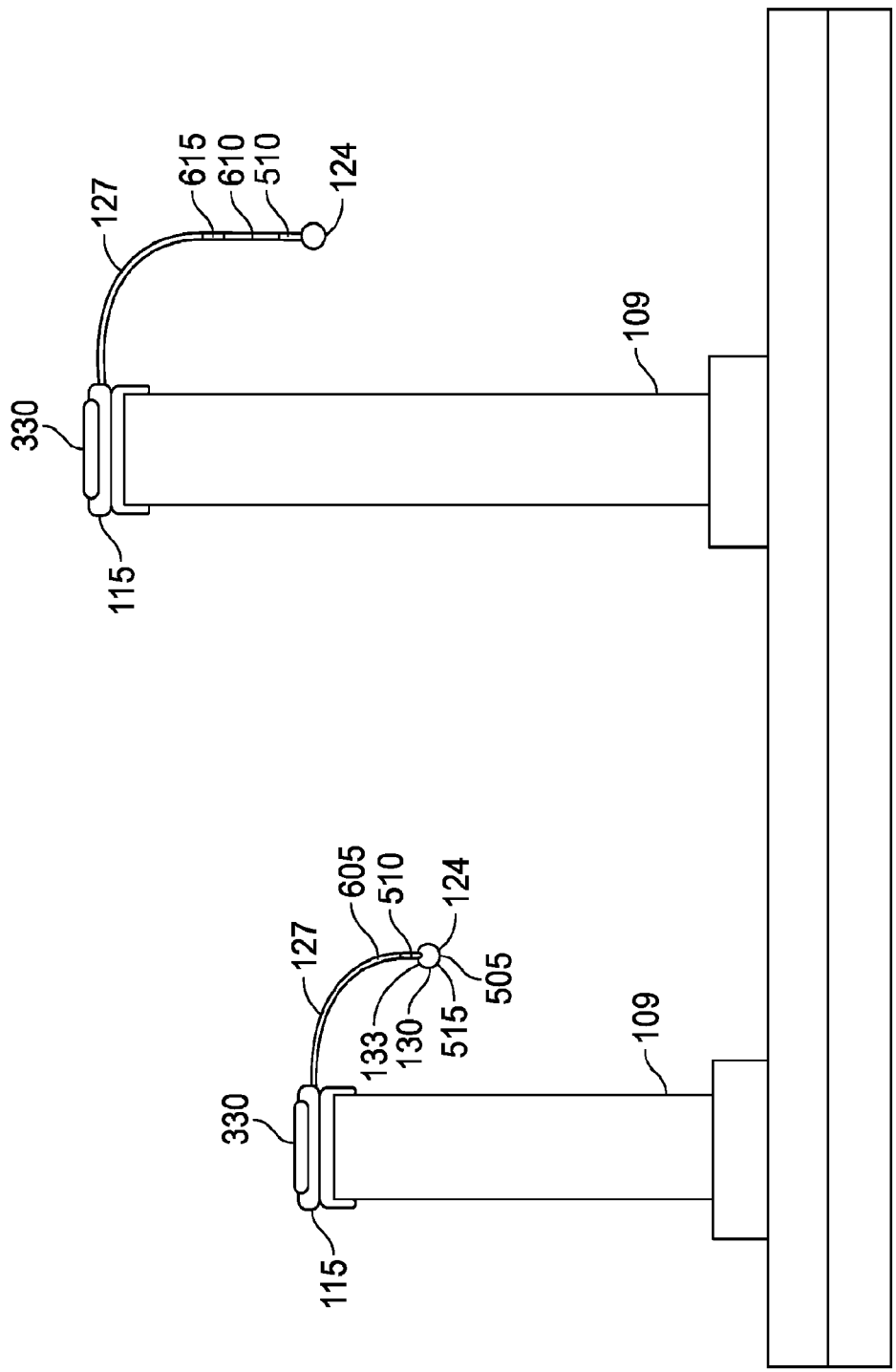

Notes

- Camera is Scheduled to Take 3 Single Images Per Day.
- Push Notification is Schedule Once Per Day.
- When APP Connects, Images are Transferred to APP Diary. Images are Named YYYYMMDD-HHMM

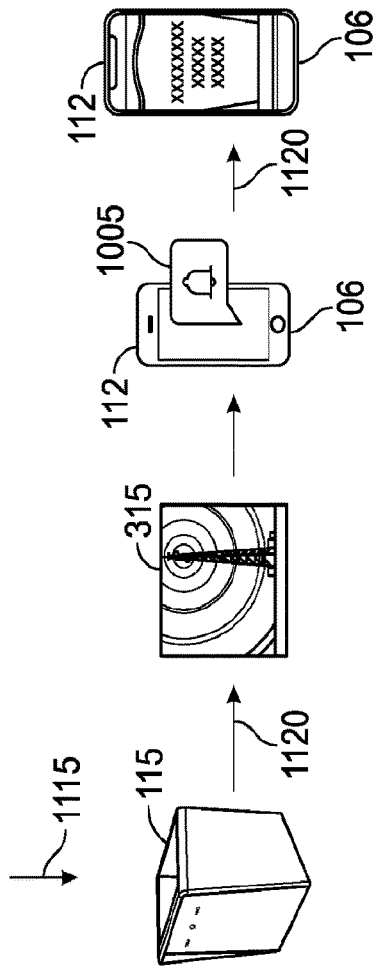
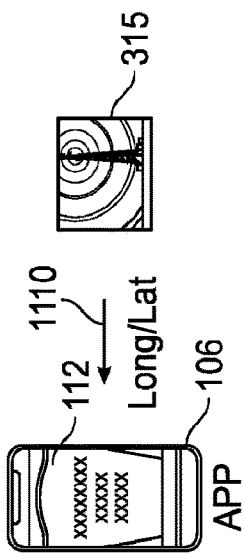
FIG. 11

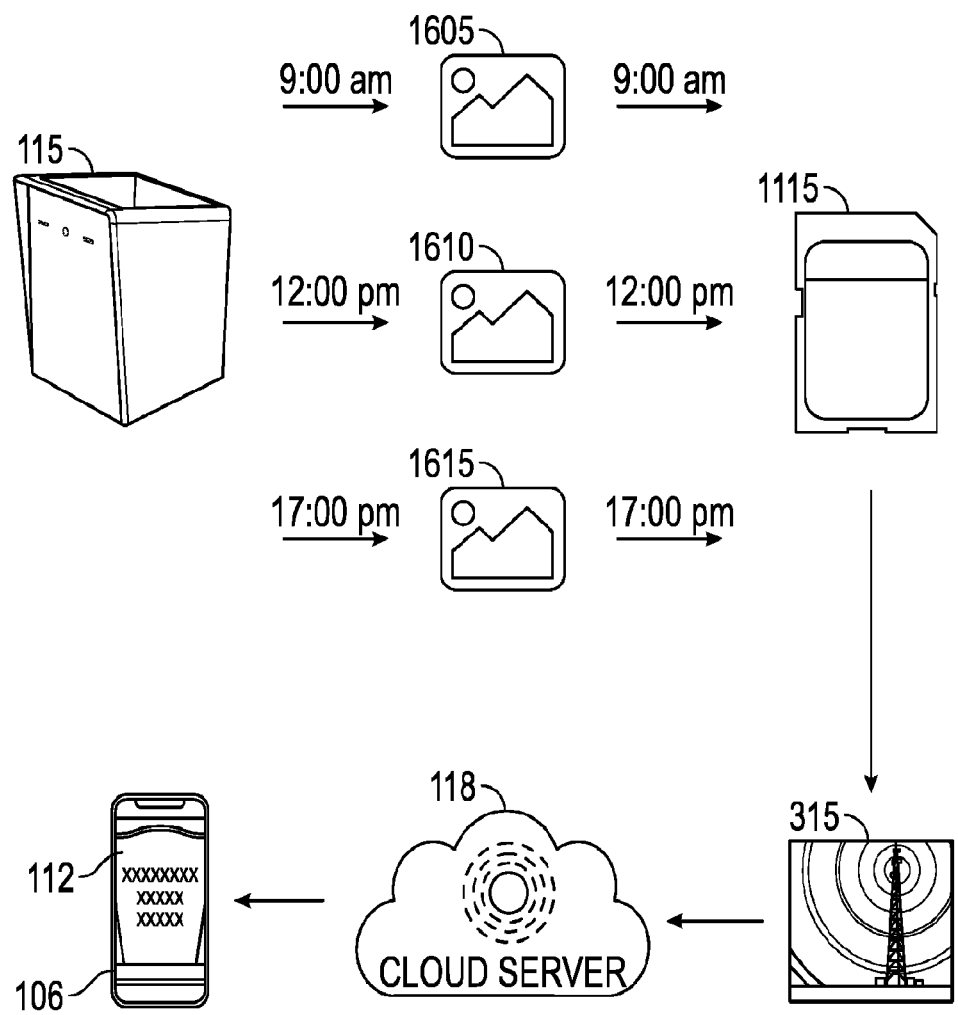

Notes

- Camera is Scheduled to Take 3 Single Images Per Day then Pushed Images to the Cloud Server(AWS).

- Local Push Notification is Scheduled Once Per Day.

- When APP Connects, Images are Transferred to APP Diary from the Cloud Server.

- Images are Named YYYYMMDD-HHMM

- Each Camera Owner User Account on the Server Should Have a Unique Share URL for the Time-Lapse Photos. If Shared, Another User Can View the Time-Lapse Video. (http://tinyurl.com/y2fv88a7)

FIG. 16

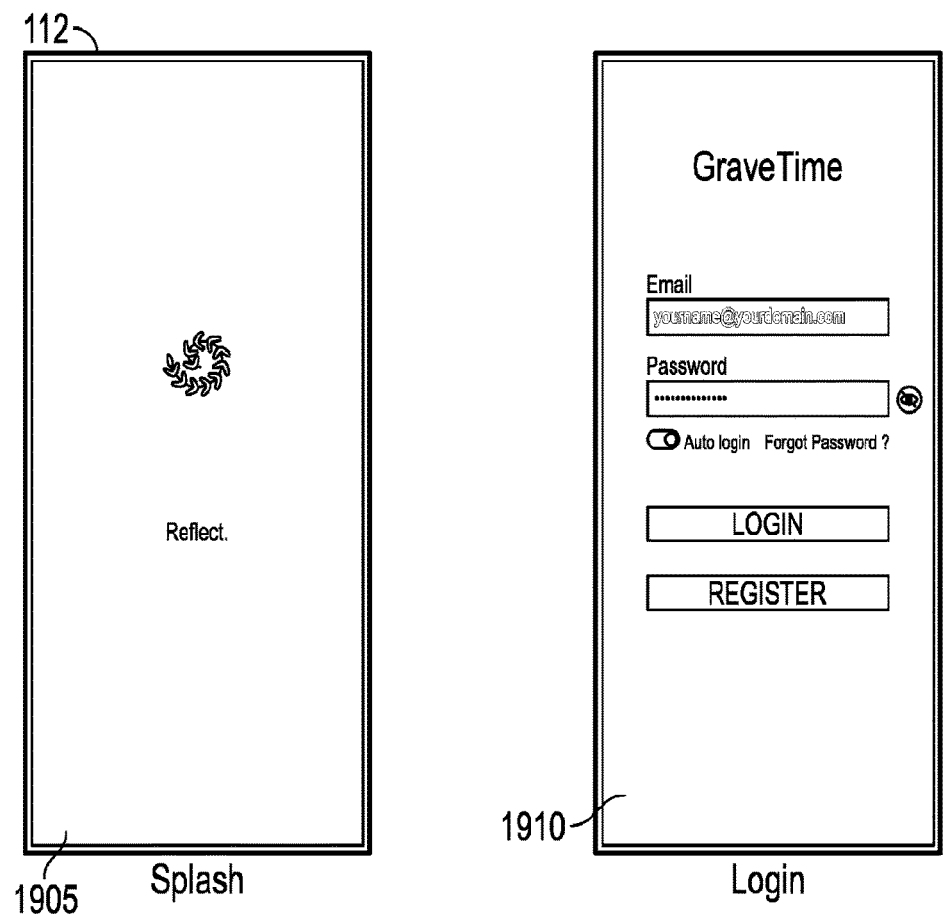
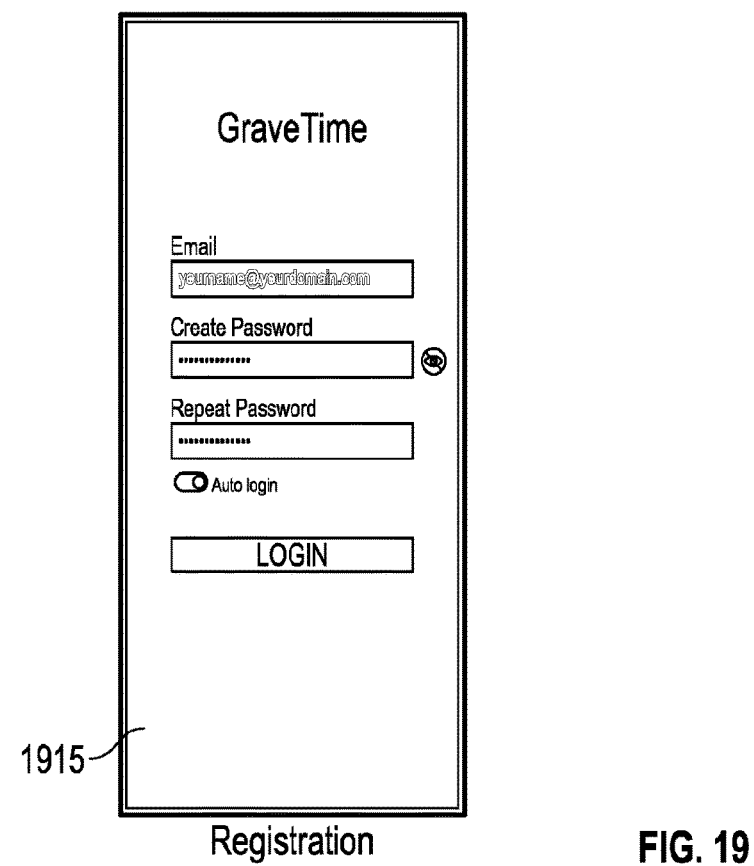
FIG. 19

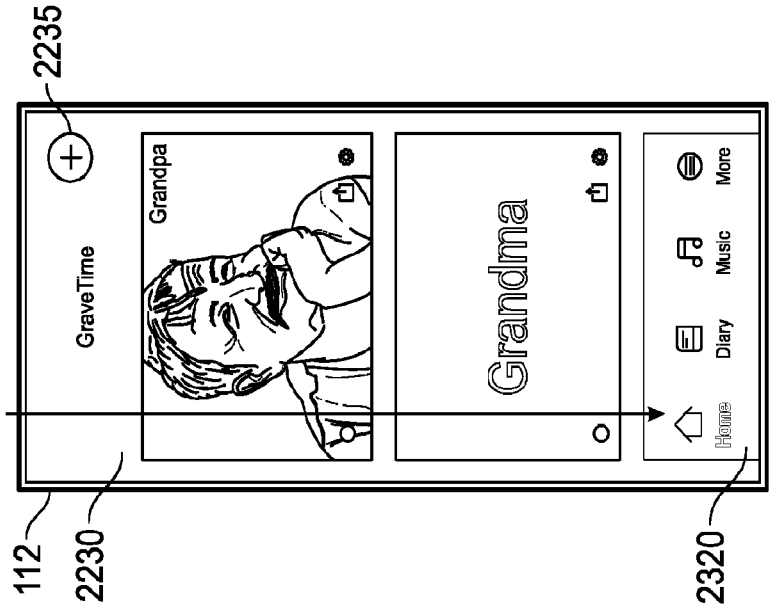
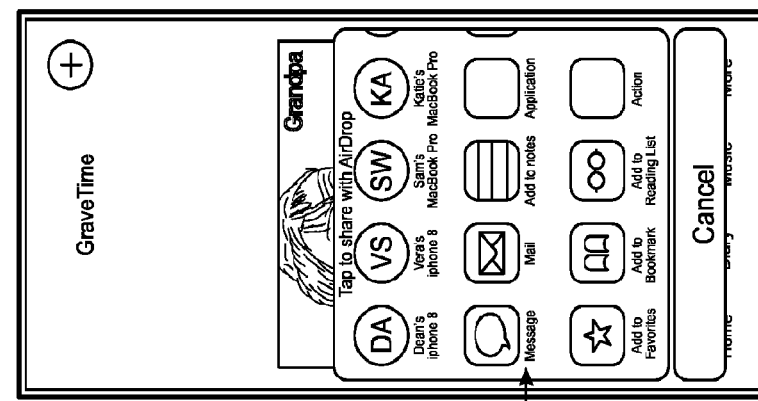
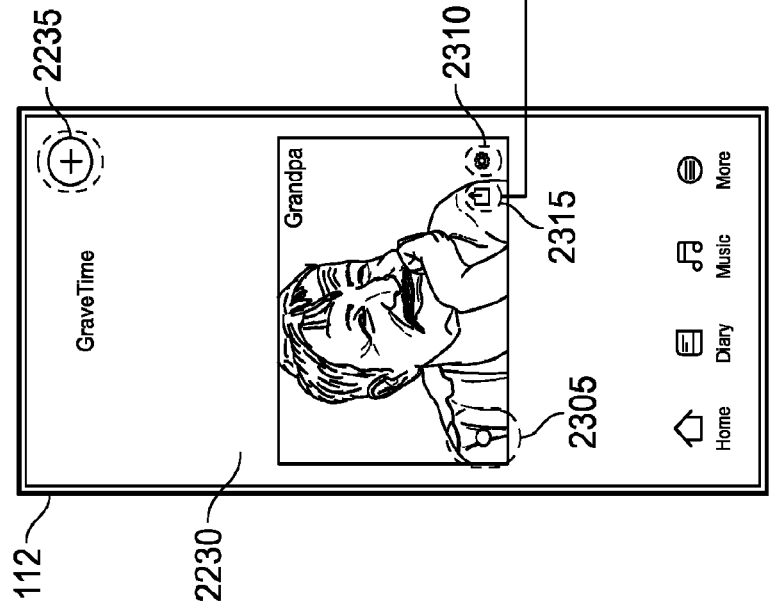
FIG. 23

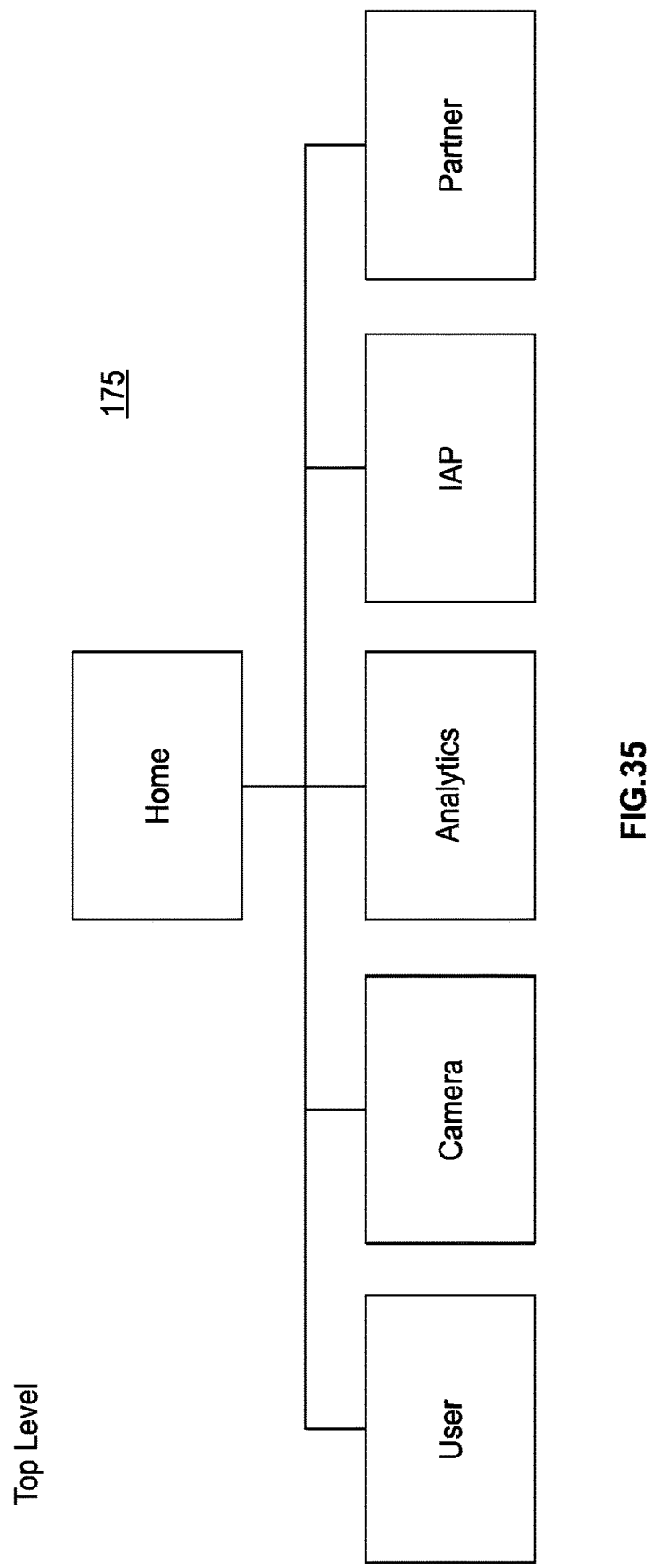

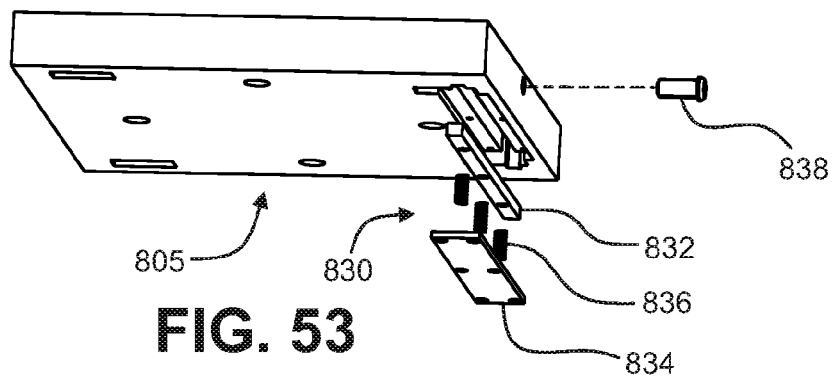
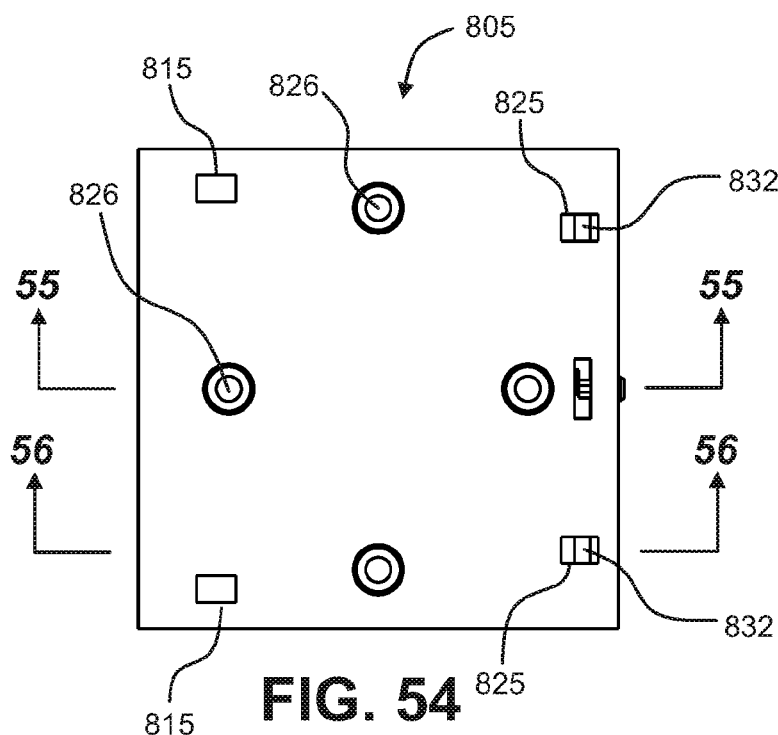
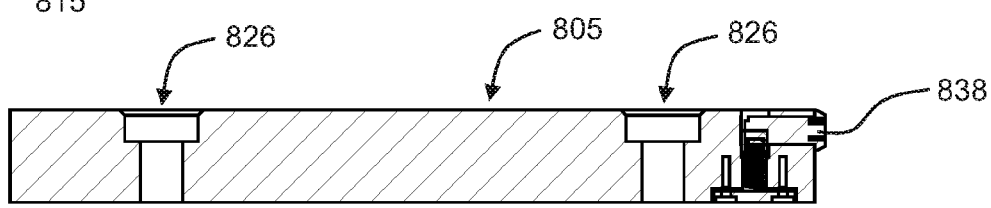
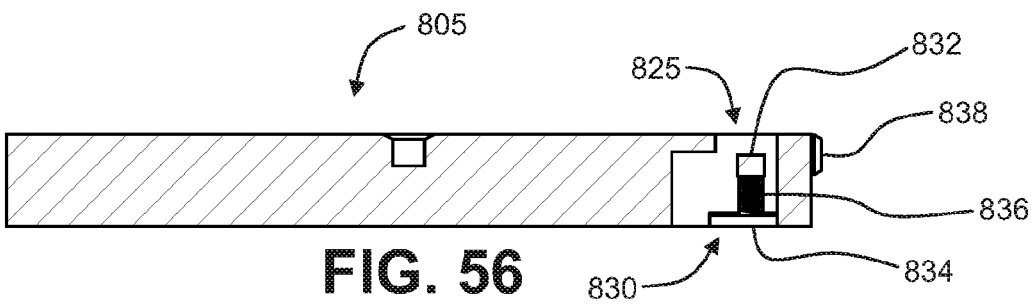

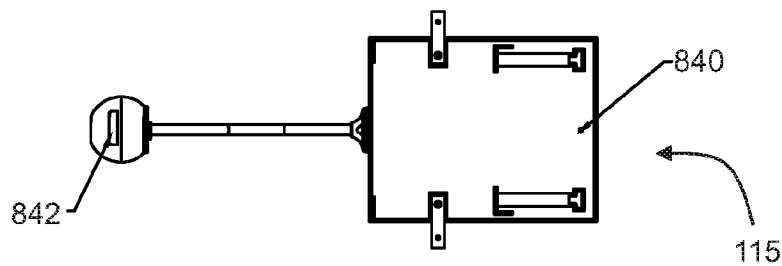
FIG. 60
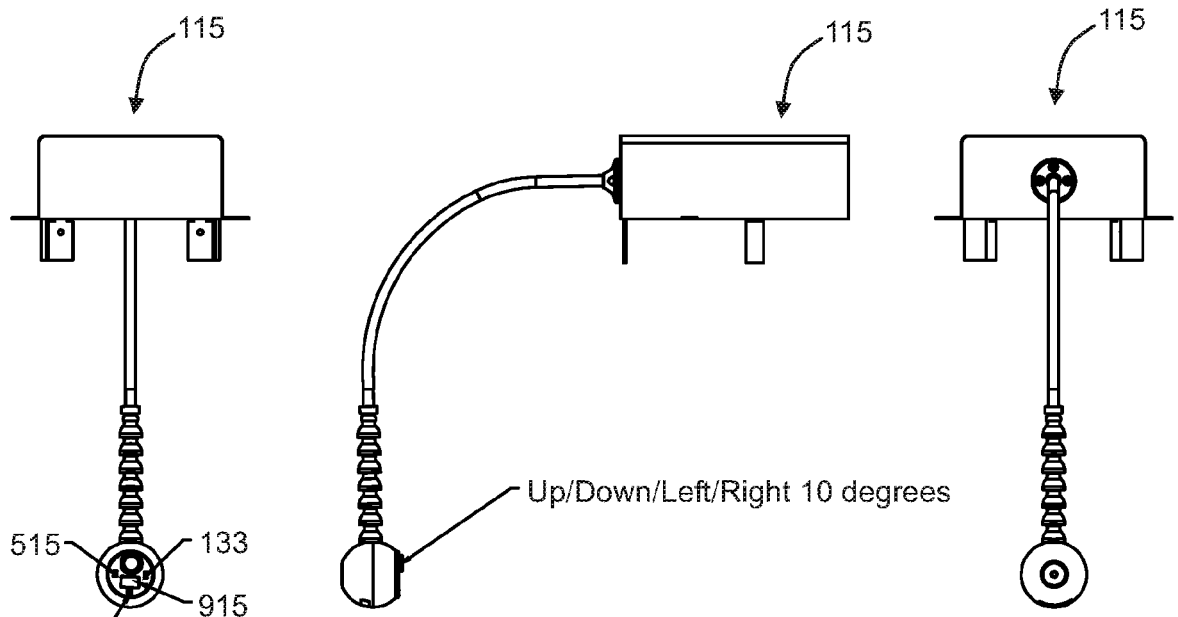
FIG. 61
FIG. 62
FIG. 63
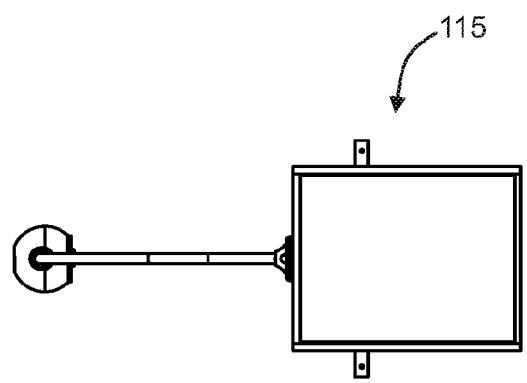
FIG. 64

GRAVESIDE MEMORIAL TELEPRESENCE METHOD, APPARATUS AND SYSTEM

RELATED APPLICATIONS

This application claims the benefit of U.S. Provisional Application No. 62/854,499 filed May 30, 2019, the contents of which are incorporated by this reference in their entireties for all purposes as if fully set forth herein.

TECHNICAL FIELD

Various embodiments relate generally to graveside telepresence.

BACKGROUND

A memorial is a product of human activity serving as a remembrance. Memorials may take various forms. For example, some memorials may be ceremonies that end when the participants leave. In various examples, a physical memorial may be constructed as a long-lasting remembrance. Some memorials are constructed to remember people or events. For example, a memorial may serve to honor an individual, an event, or a group of people. In some examples, a physical memorial may mark the location of a historically important event, such as a famous person's birthplace, or a deceased person's grave.

In an illustrative example, a deceased person's grave may be marked with a memorial monument placed at the grave. Some memorials may be located in private settings. In some examples, a private memorial may be inaccessible to the general public. For example, a memorial to a famous or historically significant deceased person may be located on restricted access estate property. In various examples, a deceased person's memorial may be located in a cemetery, with memorials to other persons.

A deceased person's family or friends may wish to visit the person's memorial as an act of remembrance. Some family or friends may regularly visit a deceased person's memorial on special occasions. A visit to a grave memorial may help a living person include remembrance of a deceased person in their life during times such as, for example, a holiday season, or a religious observance. Some families may visit a grave memorial to pass on to their children remembrance of the deceased. In some examples, a deceased person's family or friends may be geographically distributed far from the memorial location. Arranging a time when all living family members together at the same time are able to physically visit a deceased relative's grave memorial may be very difficult.

SUMMARY

Apparatus and associated methods relate to a graveside communications device exchanging multimedia between a grave and a user's communications device remote from the grave, activating an energy emitter configured by the graveside device to physically interact with the grave responsive to the remote user's activity, and sending to the user's communication device a live indication of the interaction. In an illustrative example, the device at the grave may include a video camera. The user's device may be, for example, a smartphone configured to exchange multimedia with the graveside device. In some examples, the energy emitter may be a laser pointer directed at the grave. The remote user's activity may be, for example, the user's voice captured by the user's smartphone modulating the laser pointer light. Various examples may advantageously provide graveside telepresence, permitting a user physical interaction with a grave, and providing live indication of the interaction to the user.

Various embodiments may achieve one or more advantages. For example, some embodiments may improve a user's ease of access to graveside memorials. This facilitation may be a result of reducing the user's effort visiting a graveside memorial in person, based on a graveside telepresence device delivering live graveside memorial images and sound to the remote user's mobile device. In some embodiments, the user may be able to physically interact with a graveside memorial through a mobile app configured in the user's mobile device. Such physical interaction with a graveside memorial may be a result of a graveside telepresence device configured to physically interact with the memorial with a laser pointer or low-frequency audio transducer controlled as a function of the user's activity captured by the user's mobile device. In an illustrative example, the physical interaction may include modulating the laser pointer illumination as a function of the remote user's voice, providing a live indication in the user's video feed that their voice is reaching the graveside memorial. In some designs, the user's privacy remembering a loved one may be enhanced. Such enhanced user privacy may be a result of a graveside telepresence device playing the user's voice through a low-frequency speaker inaudible to a human at the graveside. Various implementations may provide the user a live laser pointer video indication their in-audible voice is reaching the grave, based on an energy detector configured to modulate the laser pointer illumination as a function of sensing the low-frequency audio energy.

Some examples may increase the user's sense of physical presence at a graveside memorial. This facilitation may be a result of a graveside telepresence device configured with a moveable laser pointer controlled by the user's mobile device. In an illustrative example, the user may turn the laser pointer light on or off, or direct the laser pointer to different memorial surface locations, and confirm via the user's video feed that the laser pointer acted consistent with the user input. Various examples may enhance the user's experience remembering their deceased loved one. Such enhanced remembrance experience may be a result of a graveside telepresence device configured to send to the user's mobile device a live indication confirming the user's interaction with a graveside memorial. In an illustrative example, the live interaction indication received by the user's mobile device may include tracking the movement of the laser pointer illumination from a first memorial surface location to a second memorial surface location. Various examples may analytically confirm based on object tracking or optical flow algorithms implemented in the graveside device that the tracked laser pointer illumination movement was consistent with the user action, and send an indication of the confirmation to the user's mobile device. Such a confirmation of live interaction based on physical measurement at the memorial may improve the sense of realism associated to a user's interaction with a loved one's memorial. Some examples may automatically generate at the mobile device commands causing graveside telepresence device laser pointer or audio transducer activity designed to be imperceptible to a human, detect the activity at the graveside memorial, and send a continuous indication to the mobile device of the user's physical communication with the memorial. In some scenarios, such a continuous indication to the mobile device of the user's physical communication with a memorial may improve the user's sense of presence at the memorial. In certain embodiments, the laser illumination movement on the memorial surface may modulate (e.g., tracing a user-selected pattern) with the user's voice while being viewable by the user via the mobile device to provide confirmation to the user of the live interaction (i.e., the user can "see" their voice touching the memorial in real-time). In certain such embodiments, the laser may project real-time video of the user speaking from the user's mobile device onto the memorial, to provide confirmation to the user of the live interaction.

The details of various embodiments are set forth in the accompanying drawings and the description below. Other features and advantages will be apparent from the description and drawings, and from the claims.

BRIEF DESCRIPTION OF THE DRAWINGS

FIG. 6 depicts an illustrative memorial configured with an exemplary graveside telepresence device camera arm extension embodiment.

FIG. 11 depicts an exemplary graveside telepresence device embodiment in an illustrative geofencing scenario.

FIG. 16 depicts an exemplary graveside telepresence device embodiment in an illustrative time-lapse photo scenario, in accordance with various graveside telepresence embodiment designs.

FIG. 19 depicts an exemplary graveside telepresence user interface in an illustrative user registration and login scenario, in accordance with various graveside telepresence embodiment designs.

FIG. 23 depicts an exemplary graveside telepresence user interface displaying an exemplary camera lobby feature, in accordance with various graveside telepresence embodiment designs.

FIG. 35 depicts the top level of an exemplary graveside telepresence administrative dashboard user interface flow map, in accordance with the exemplary administrative server 175 depicted by FIG. 1.

FIG. 53 is an exploded view of an exemplary mounting plate of the graveside telepresence device embodiment implementation of FIG. 46.

FIG. 54 is a top view of the mounting plate of FIG. 46.

FIG. 55 is a cross-sectional view taken along lines 55-55 of FIG. 54, illustrating the anchor bold apertures for use in securing the mounting plate to the ground, and illustrating the center segment of the mount lock assembly for locking the remainder of the graveside telepresence device to the mounting plate.

FIG. 56 is a cross-sectional view taken along lines 56-56 of FIG. 54, illustrating a lateral segment of the mounting lock assembly for locking the remainder of the graveside telepresence device to the mounting plate.

FIG. 60 is a bottom view of an exemplary embodiment of an exemplary MountCam-type graveside telepresence device embodiment.

FIG. 61 is a rear view of the MountCam-type graveside telepresence device embodiment of FIG. 60.

FIG. 62 is a side view of the MountCam-type graveside telepresence device embodiment of FIG. 60.

FIG. 63 is a front view of the MountCam-type graveside telepresence device embodiment of FIG. 60.

FIG. 64 is a top view of the MountCam-type graveside telepresence device embodiment of FIG. 60.

Like reference symbols in the various drawings indicate like elements.

DETAILED DESCRIPTION OF ILLUSTRATIVE EMBODIMENTS

To aid understanding, this document is organized as follows. First, design, operation, and use of various graveside telepresence embodiment implementations are briefly introduced with reference to FIGS. 1-4. Second, with reference to FIGS. 5-9, the discussion turns to exemplary embodiments that illustrate graveside telepresence device physical design. Specifically, memorial-mounted and ground-mounted embodiment designs are disclosed. Then, with reference to FIGS. 10-18, illustrative scenarios of exemplary graveside telepresence operational transactions are described. Fourth, with reference to FIGS. 19-39, exemplary graveside telepresence component user interface designs are disclosed. Finally, exemplary apparatus and process embodiment designs are disclosed with reference to FIGS. 40-45. Specifically, graveside telepresence device and remote interface hardware and executable process embodiment designs are presented to explain improvements in graveside telepresence technology.

Figure 1:
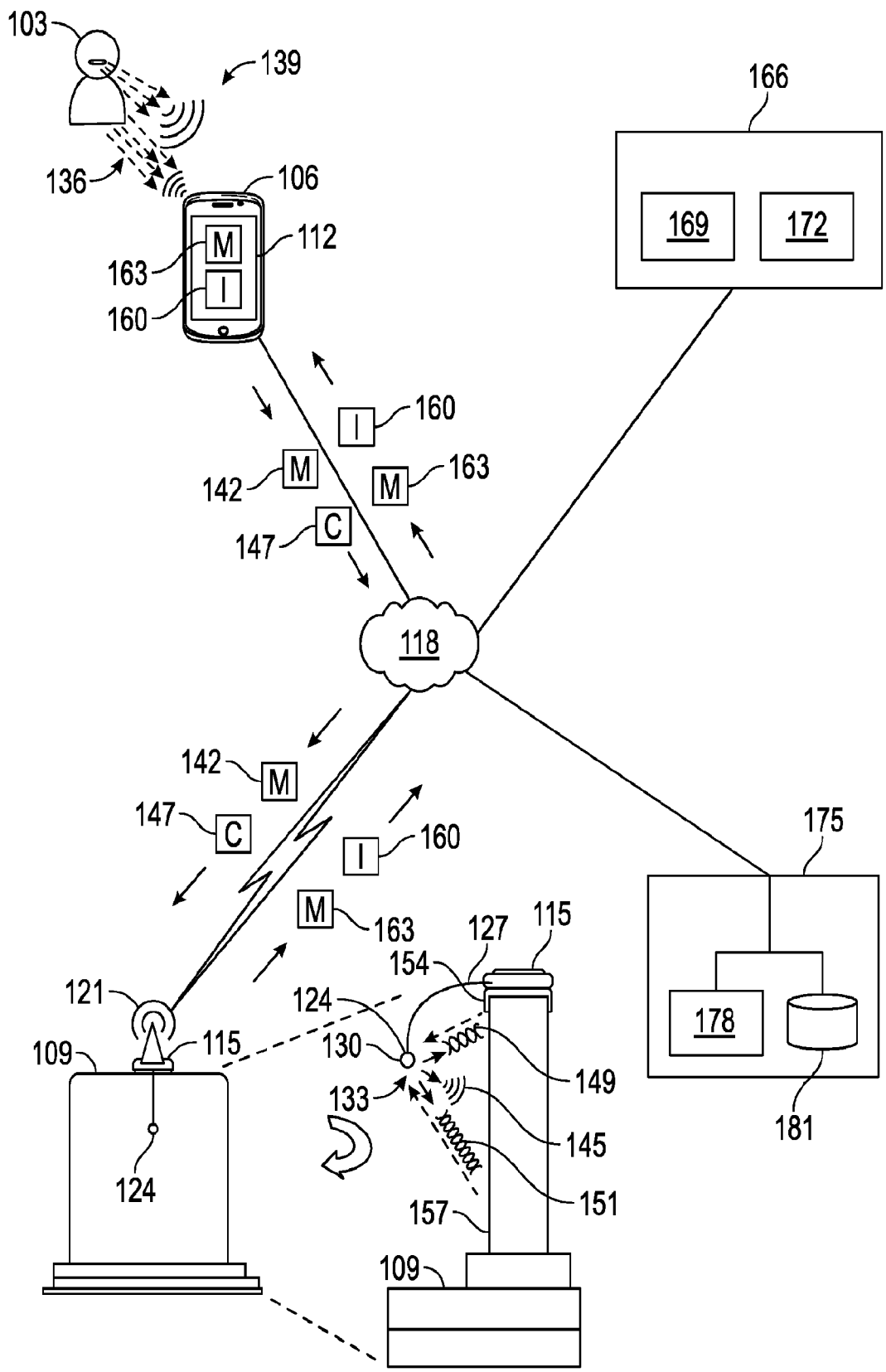
FIG. 1 depicts an illustrative operational scenario wherein a user employs an exemplary grave time system configured to provide graveside telepresence based on a graveside communications device exchanging multimedia between a grave and a user's communications device remote from the grave, activating an energy emitter configured by the graveside device to physically interact with the grave responsive to the remote user's activity, and sending to the user's communication device a live indication of the interaction.

FIG. 1 depicts an illustrative operational scenario wherein a user employs an exemplary grave time system configured to provide graveside telepresence based on a graveside communications device exchanging multimedia between a grave and a user's communications device remote from the grave, activating an energy emitter configured by the graveside device to physically interact with the grave responsive to the remote user's activity, and sending to the user's communication device a live indication of the interaction. In the example illustrated by FIG. 1, the user 103 employs the mobile device 106 to physically interact with the memorial 109, and receive a live indication of the interaction. In the illustrated example, the mobile device 106 is configured with the exemplary user interface 112. In the depicted example, the user interface 112 includes a mobile app configured to permit a mobile device 106 user to physically interact with the memorial 109 and receive a live indication of the interaction. In an illustrative example, a mobile device 106 user may physically interact with the memorial 109 via user action captured by the user interface 112. In the depicted example, the user 103 receives through the user interface 112 a live indication of the user's physical interaction with the memorial 109. In the illustrated example, the memorial 109 is configured with the exemplary graveside telepresence device 115. In the depicted example, the mobile device 106 is operably and communicatively coupled with the graveside telepresence device 115 via the network cloud 118. In the illustrated example, the wireless access point 121 operably and communicatively couples the graveside telepresence device 115 with the network cloud 118. In the depicted embodiment, the graveside telepresence device 115 includes the multimedia impact module 124. In the illustrated embodiment, the multimedia impact module 124 is movably secured by the flexible arm mount 127 to the memorial 109. In the depicted embodiment, the multimedia impact module 124 includes the laser pointer 130. In the illustrated embodiment, the laser pointer 130 is a laser emitter configured to emit focused light energy. In the depicted embodiment, the multimedia impact module 124 also includes the audio transducer 133. In the depicted embodiment, the audio transducer 133 is a low-frequency speaker, configured to emit sound energy constrained to a frequency range below the lower limit of the human-audible frequency range, wherein the sound energy emitted is not audible by a human when the audio transducer is activated. In some embodiments, the audio transducer may be an ultrasonic speaker configured to emit sound energy constrained to a frequency range above the upper limit of the human-audible frequency range, wherein the sound energy emitted is not audible by a human when the audio transducer is activated. In the depicted embodiment, the multimedia impact module 124 includes a video camera and a microphone. In the illustrated example, the mobile device 106 includes a video camera and a microphone. In the illustrated example, the mobile device 106 video camera captures light energy 136 reflected from the user 103. In the illustrated example, the mobile device 106 microphone captures sound energy 139 emitted by the user 103 vocal tract as the user 103 speaks. In the depicted example, the light energy 136 captured by the mobile device 106 video camera and the sound energy 139 captured by the mobile device 106 microphone are encoded by the mobile device 106 in user multimedia 142. In various embodiments, the user multimedia 142 may include raw or encoded data organized in a frame, packet, or stream. In the illustrated example, the mobile device 106 sends the user multimedia 142 to the graveside telepresence device 115. In the depicted embodiment, the graveside telepresence device 115 receives the user multimedia 142 from the mobile device 106. In an illustrative example, the mobile device 106 may send the user multimedia 142 to a back end server, or to a cloud database, for authentication, billing, identification, signal processing, encoding, or logging. In some examples, the graveside telepresence device 115 may play the user multimedia 142 through a media player operable at the memorial 109. In the illustrated embodiment, the graveside telepresence device plays the user multimedia 142 audio through the audio transducer 133. In the depicted embodiment, the audio transducer 133 emits the user multimedia 142 audio as sound energy 145 directed to the memorial 109. In the illustrated embodiment, the sound energy 145 includes the user 103 voice energy at a frequency range below the lower limit of the human-audible frequency range. In the illustrated example, the graveside telepresence device 115 advantageously enhances the privacy of user 103 by emitting the user 103 voice energy in a frequency range not audible by a human within hearing distance of the memorial 109. In some embodiments, the laser light emitted by the laser pointer 130 may be governed as a function of the user multimedia 142 audio received by the graveside telepresence device 115. For example, the graveside telepresence device 115 may modulate the laser pointer 130 illumination as a function of the energy, pitch period, or frequency range of the user 103 voice energy. In some designs, the user 103 may advantageously receive a live video stream from the graveside telepresence device 115 indicating the user 103 vocal energy modulating the laser pointer 130, enhancing the user's awareness of physical interaction with the memorial 109. In an illustrative example, the graveside telepresence device 115 may modulate the laser pointer 130 illumination based on the user 103 voice energy before or after shifting or compressing the vocal energy to a range conformant with the range of the audio transducer 133. In some examples, the mobile device 106 may frequency shift, or compress, the vocal energy spectrum before sending the user multimedia 142 audio to the graveside telepresence device 115. In the depicted example, the user 103 mobile device 106 user interface 112 is configured to capture user 103 action governing the direction of the laser pointer 130. In an illustrative example, the user 103 may tap a user selectable icon configured in the user interface 112 that represents the direction of the laser pointer 130 with respect to a memorial 109 surface. In some embodiments, the user selectable icon representing the direction of the laser pointer 130 may be displayed in the user interface 112. In the illustrated embodiment, the user 103 may drag the selected icon representing the direction of the laser pointer 130 to direct the laser pointer 130 to a different location with respect to a memorial 109 surface. In the illustrated embodiment, the mobile device 106 captures the user 103 action dragging the icon representing the direction of the laser pointer 130, and generates user command 147. In the depicted embodiment, the user command includes data configured to direct the graveside telepresence device 115 to change the laser pointer 130 direction with respect to a memorial 109 surface. In the depicted embodiment, the mobile device 106 sends the user command 147 to the graveside telepresence device. In the illustrated example, the graveside telepresence device 115 receives the user command 147 from the mobile device 106. In the illustrated embodiment, the graveside telepresence device 115 is configured to independently move the laser pointer separate from the flexible arm mount 127 positioning of the multimedia impact module 124. In some embodiments, the laser pointer 130 may be configured with an independent pan and tilt control governed as a function of user command 147 received by the graveside telepresence device 115. In the depicted embodiment the laser pointer 130 is initially positioned to direct the laser beam 149 to a first location on the memorial 109. In the illustrated example, the graveside telepresence device 115 moves the laser pointer 130 in response to the user command 147 to direct the laser beam 151 to a second location on the memorial 109. In the depicted embodiment, the graveside telepresence device 115 multimedia impact module 124 video camera captures video of the laser pointer 130 laser beam reflection from the memorial 109. In the illustrated embodiment, the graveside telepresence device 115 employs object tracking as a function of the captured video to confirm the laser pointer 130 movement conformed to the user 103 action captured by the user interface 112. In the illustrated example, the graveside telepresence device 115 tracks the laser pointer 130 laser beam movement based on object tracking analysis of captured video depicting the laser pointer 130 reflection 154 at the first location on the memorial 109, to the laser pointer 130 reflection 157 at the second location on the memorial 109. In some examples, the graveside telepresence device 115 may track the laser pointer 130 movement based on optical flow as a function of the captured video. In the depicted embodiment, the graveside telepresence device 115 generates graveside telepresence indication 160 which includes an indication the graveside telepresence device 115 independently confirmed the laser pointer movement conformed with the user 103 action captured by the user interface 103. In the illustrated example, the mobile device 106 receives the graveside telepresence indication 160 from the graveside telepresence device 115, thereby advantageously enhancing the user 103 experience interacting with the memorial 109 based on independently confirming the interaction as a function of data collected and processed at the memorial 109. In the depicted embodiment, the mobile device 106 presents the graveside telepresence indication 160 to the user 103 through the mobile device 106 user interface 112. In the depicted example, the graveside telepresence device 115 multimedia impact module 124 video camera captures images of the memorial 109. In the illustrated example, the graveside telepresence device multimedia impact module 124 microphone captures audio from the memorial 109 environment. In the depicted embodiment, the graveside telepresence device 115 encodes the audio and video captured by the multimedia impact module 124 in graveside multimedia 163. In various embodiments, the graveside multimedia 163 may include raw or encoded data organized in a frame, packet, or stream. In the illustrated example, the graveside telepresence device 115 sends the graveside multimedia 163 to the mobile device 106. In the depicted embodiment, the mobile device 106 receives the graveside multimedia 163 from the graveside telepresence device 115. In an illustrative example, the graveside telepresence device 115 may send the graveside multimedia 163 to a back end server, or to a cloud database, for authentication, billing, identification, signal processing, encoding, or logging. In the illustrated embodiment, the mobile device 106 presents the graveside multimedia 163 to the user 103 through the mobile device 106 user interface 112. In the depicted example, the mobile device 106 user 103 authenticates access to the graveside telepresence device 115 via the account management server 166 operably and communicatively coupled with the network cloud 118. In the illustrated example, the account management server 166 includes account registration database 169. In the depicted example, the account registration database includes user and memorial profile data such as identification, contact information, and memorial registration information. In the depicted example, the account management server 166 includes the account media database 172. In an illustrative example, the account media database may be a repository of multimedia captured at a memorial, or stock media clips offered to visitors or users through the disclosed telepresence facilities. In various examples, the account management server 166 may be locally hosted near a site with many memorials, to serve data facilitating account and media access to the telepresence facilities provided to the memorials on site. In the depicted example, the illustrated graveside telepresence network operation is governed via the administrative server 175. In the depicted embodiment, the administrative server 175 includes the site registration database 178. In an illustrative example, the site registration database 178 may provide access to authentication and registration data supporting payment for and use of graveside telepresence networks by multiple memorial sites. In the depicted example, the administrative server 175 also includes the global memorial media database 181. In the illustrated embodiment, the global memorial media database 181 facilitates storage and retrieval of media generated by memorial visitors.

Figure 2:
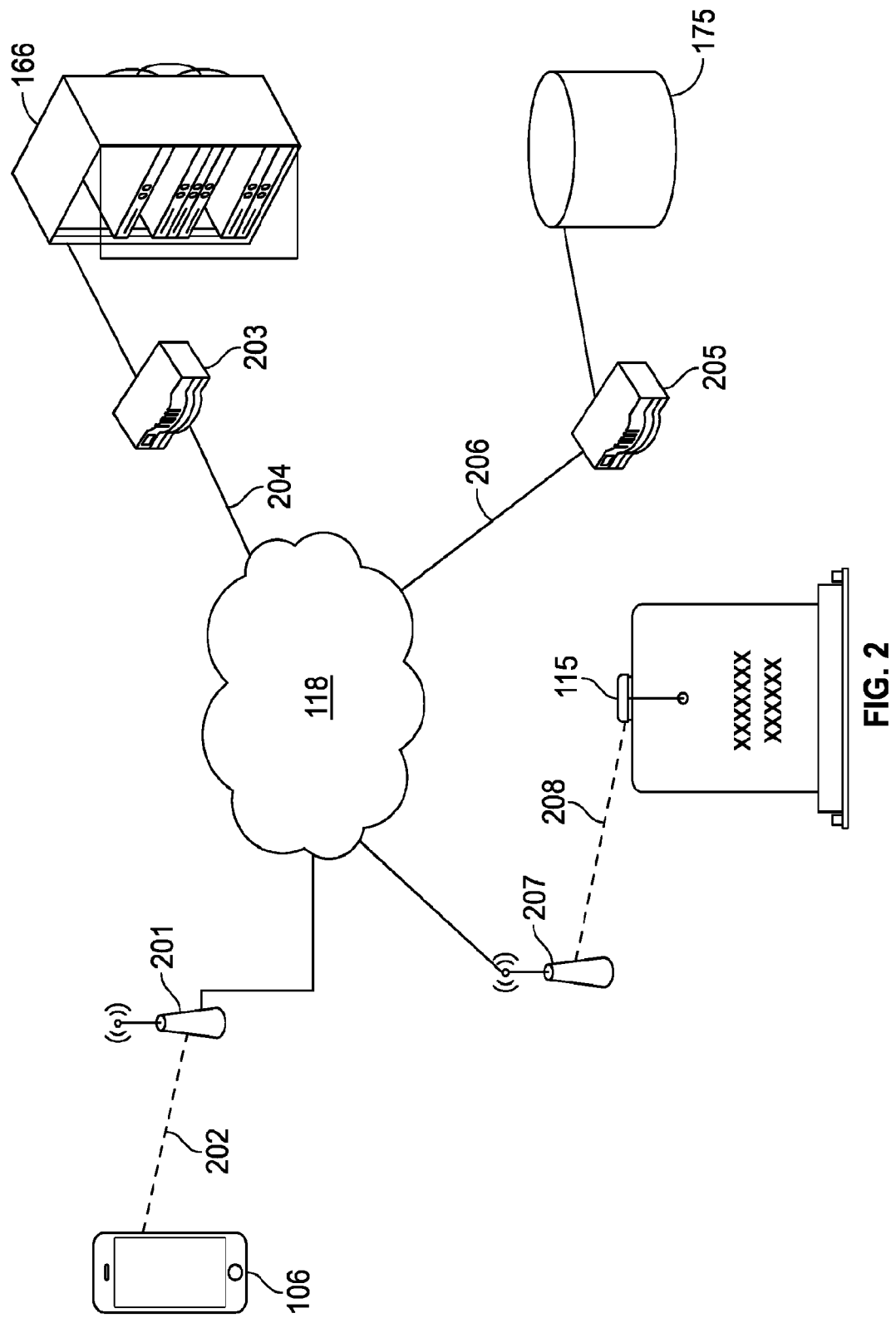
FIG. 2 depicts a schematic view of an exemplary network configured to provide graveside telepresence based on exchanging multimedia between a grave and a user's communications device remote from the grave, activating an energy emitter configured by the graveside device to physically interact with the grave responsive to the remote user's activity, and sending to the user's communication device a live indication of the interaction.

FIG. 2 depicts a schematic view of an exemplary network configured to provide graveside telepresence based on exchanging multimedia between a grave and a user's communications device remote from the grave, activating an energy emitter configured by the graveside device to physically interact with the grave responsive to the remote user's activity, and sending to the user's communication device a live indication of the interaction. In FIG. 2, according to an exemplary embodiment of the present disclosure, data may be transferred to the system, stored by the system and/or transferred by the system to users of the system across local area networks (LANs) or wide area networks (WANs). In accordance with various embodiments, the system may include numerous servers, data mining hardware, computing devices, or any combination thereof, communicatively connected across one or more LANs and/or WANs. One of ordinary skill in the art would appreciate that there are numerous manners in which the system could be configured, and embodiments of the present disclosure are contemplated for use with any configuration. Referring to FIG. 2, a schematic overview of a system in accordance with an embodiment of the present disclosure is shown. In the depicted embodiment, an exemplary system includes the exemplary graveside telepresence device 115 configured to exchange multimedia between a grave and a user's communications device remote from the grave, physically interact with the grave responsive to the remote user's activity, and send to the user's communication device a live indication of the interaction. In the illustrated embodiment, the user's mobile device 106 is a smartphone configured to exchange multimedia between a mobile device 106 user and the graveside telepresence device 115, control the graveside telepresence device 115 physical interaction with the grave, and receive a live indication of the interaction. In the depicted embodiment, the account management server 166 is a computing device configured to authenticate user access to the graveside telepresence device 115. In the depicted example, the administrative server 175 is a computing device configured with an administrative database governing payment for and use of multiple graveside telepresence networks. In the illustrated embodiment, the mobile device 106 is communicatively and operably coupled by the wireless access point 201 and the wireless link 202 with the network cloud 118 (e.g., the Internet) to send, retrieve, or manipulate information in storage devices, servers, and network components, and exchange information with various other systems and devices via the network cloud 118. In the depicted example, the illustrative system includes the router 203 configured to communicatively and operably couple the account management server 166 to the network cloud 118 via the communication link 204. In the illustrated example, the router 205 communicatively and operably couples the administrative server 175 to the network cloud 118 via the communication link 206. In the depicted embodiment, the graveside telepresence device 115 is communicatively and operably coupled with the network cloud 118 by the wireless access point 207 and the wireless communication link 208. In various examples, one or more of: the mobile device 106, the graveside telepresence device 115, the account management server 166, or the administrative server 175 may include an application server configured to store or provide access to information used by the system. In various embodiments, one or more application server may retrieve or manipulate information in storage devices and exchange information through the network cloud 118. In some examples, one or more of: the mobile device 106, the graveside telepresence device 115, the account management server 166, or the administrative server 175 may include various applications implemented as processor-executable program instructions. In some embodiments, various processor-executable program instruction applications may also be used to manipulate information stored remotely and process and analyze data stored remotely across the network cloud 118 (e.g., the Internet). According to an exemplary embodiment, as illustrated by FIG. 2, exchange of information through the network cloud 118 or other network may occur through one or more high speed connections. In some cases, high speed connections may be over-the-air (OTA), passed through networked systems, directly connected to one or more network cloud 118 or directed through one or more router. In various implementations, one or more router may be optional, and other embodiments in accordance with the present disclosure may or may not utilize one or more router. One of ordinary skill in the art would appreciate that there are numerous ways any or all of the depicted devices may connect with the network cloud 118 for the exchange of information, and embodiments of the present disclosure are contemplated for use with any method for connecting to networks for the purpose of exchanging information. Further, while this application may refer to high speed connections, embodiments of the present disclosure may be utilized with connections of any useful speed. In an illustrative example, components or modules of the system may connect to one or more of: the mobile device 106, the graveside telepresence device 115, the account management server 166, or the administrative server 175 via the network cloud 118 or other network in numerous ways. For instance, a component or module may connect to the system i) through a computing device directly connected to the network cloud 118, ii) through a computing device connected to the network cloud 118 through a routing device, or iii) through a computing device connected to a wireless access point. One of ordinary skill in the art will appreciate that there are numerous ways that a component or module may connect to a device via network cloud 118 or other network, and embodiments of the present disclosure are contemplated for use with any network connection method. In various examples, one or more of: the mobile device 106, the graveside telepresence device 115, the account management server 166, or the administrative server 175 could include a personal computing device, such as a smartphone, tablet computer, wearable computing device, cloud-based computing device, virtual computing device, or desktop computing device, configured to operate as a host for other computing devices to connect to. In some examples, one or more communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 3:
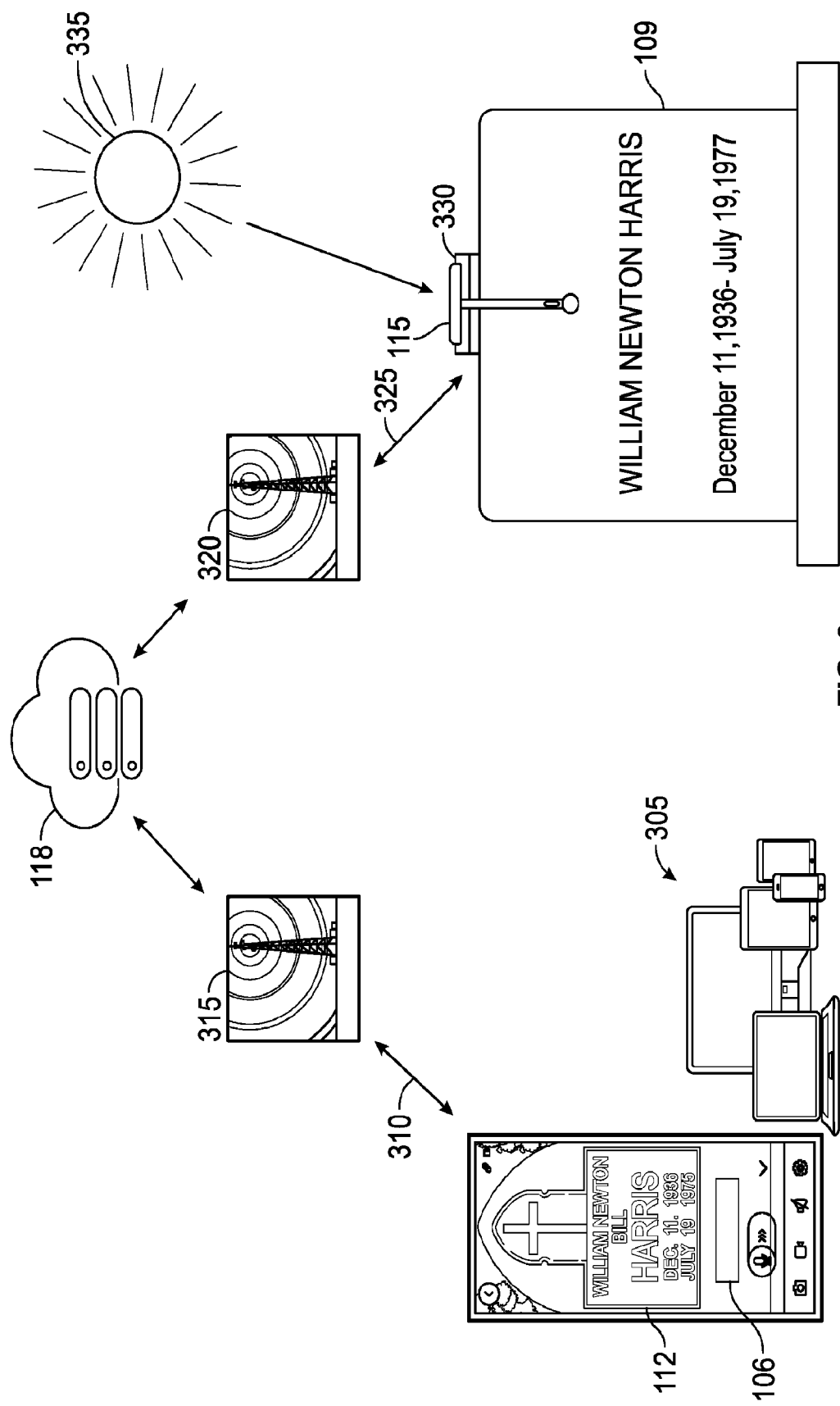
FIG. 3 depicts a network view of an exemplary graveside telepresence embodiment implementation.

FIG. 3 depicts a network view of an exemplary graveside telepresence embodiment implementation. In FIG. 3, the exemplary mobile device 106 includes the user interface 112 implemented as an embodiment GraveTime App. In the depicted embodiment, the exemplary GraveTime App permits a user to physically interact with the grave memorial 109 via the graveside telepresence device 115. In various embodiments, the graveside telepresence device 115 may include a camera. In some embodiments, the camera may be configured with an adjustable mount. Some graveside telepresence device 115 embodiments may include an infrared (IR) light. In an illustrative example, various graveside telepresence device 115 implementation designs may include a laser pointer and speaker configured to permit a remote user to physically interact with the memorial 109. Some graveside telepresence device 115 embodiments may include a microphone adapted to capture sound at the memorial, enabling the user to listen via the user interface 112 to sounds near the memorial. In the illustrated embodiment, the graveside telepresence device 115 is communicatively and operably coupled with the user interface 112 via the network cloud 118. In the illustrated example, the user computing devices 305 and the mobile device 106 are communicatively coupled with the network cloud through the user local network connection 310 and the user internet service provider 315. In some embodiments, any of the user computing devices 305 may be configured with an embodiment GraveTime App implemented in, for example, a mobile, tablet, laptop, or desktop application configuration appropriate to the respective device type. In the depicted embodiment, the graveside telepresence device 115 is communicatively and operably coupled with the network cloud 118 through the graveside internet service provider 320 and the graveside local network connection 325. In various embodiments, the graveside local network connection 325 may include, for example, 4G LTE, or WiFi. In the illustrated example, the solar panel 330 operably powers the graveside telepresence device 115 based on energy from the sun 335. In the illustrated embodiment, the power supplied through the solar panel 330 to the graveside telepresence device 115 permits a mobile device 106 user to receive live indication of the user's physical interaction with the memorial 109 without dependency on an artificial source of power at the memorial 109 site.

Figure 4:
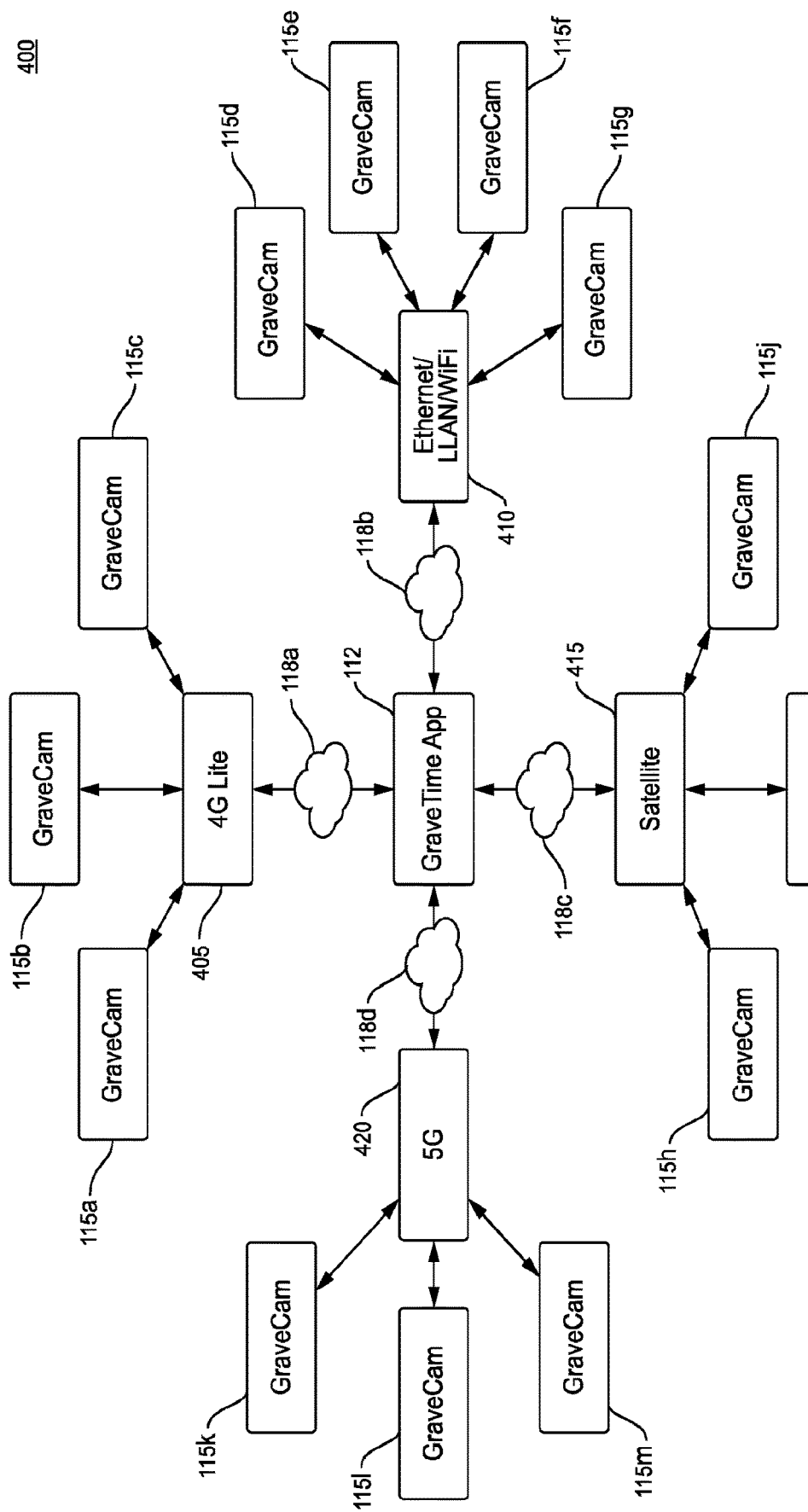
FIG. 4 depicts a network view of an exemplary distributed graveside telepresence embodiment configured with multiple graveside telepresence devices governed by an exemplary application user interface.

FIG. 4 depicts a network view of an exemplary distributed graveside telepresence embodiment configured with multiple graveside telepresence devices governed by an exemplary application user interface. In FIG. 4, the exemplary distributed graveside telepresence network 400 includes the embodiment GraveTime App implemented in the user interface 112. In various embodiments, the depicted GraveTime App may be hosted on a mobile device, a tablet, laptop, desktop computer, or a cloud server. In an illustrative example, the depicted GraveTime App may be implemented as a cloud service accessible via a web application from various types of devices or applications. The illustrative graveside telepresence network 400 includes graveside telepresence device 115 embodiment implementations in exemplary GraveCam configurations. In the depicted embodiment, the exemplary GraveTime App is communicatively and operably coupled via the depicted network structures with the depicted graveside telepresence device 115 GraveCam systems. In the illustrated example, the depicted GraveTime App is communicatively and operably coupled with the exemplary GraveCam 115a, 115b, 115c systems through the first network including the 4G LTE network 405 and the network cloud 118a. In the depicted embodiment, the illustrated GraveTime App is communicatively and operably coupled with the exemplary GraveCam 115d, 115e, 115f, 115g systems through the second network including the Ethernet LAN/WiFi network 410 and the network cloud 118b. In the illustrated embodiment, the depicted GraveTime App is communicatively and operably coupled with the exemplary GraveCam 115h, 115i, 115j systems through the third network including the satellite network 415 and the network cloud 118c. In the depicted example, the illustrated GraveTime App is communicatively and operably coupled with the exemplary GraveCam 115k, 115l, 115m systems through the fourth network including the 5G network 420 and the network cloud 118d.

Figure 5:
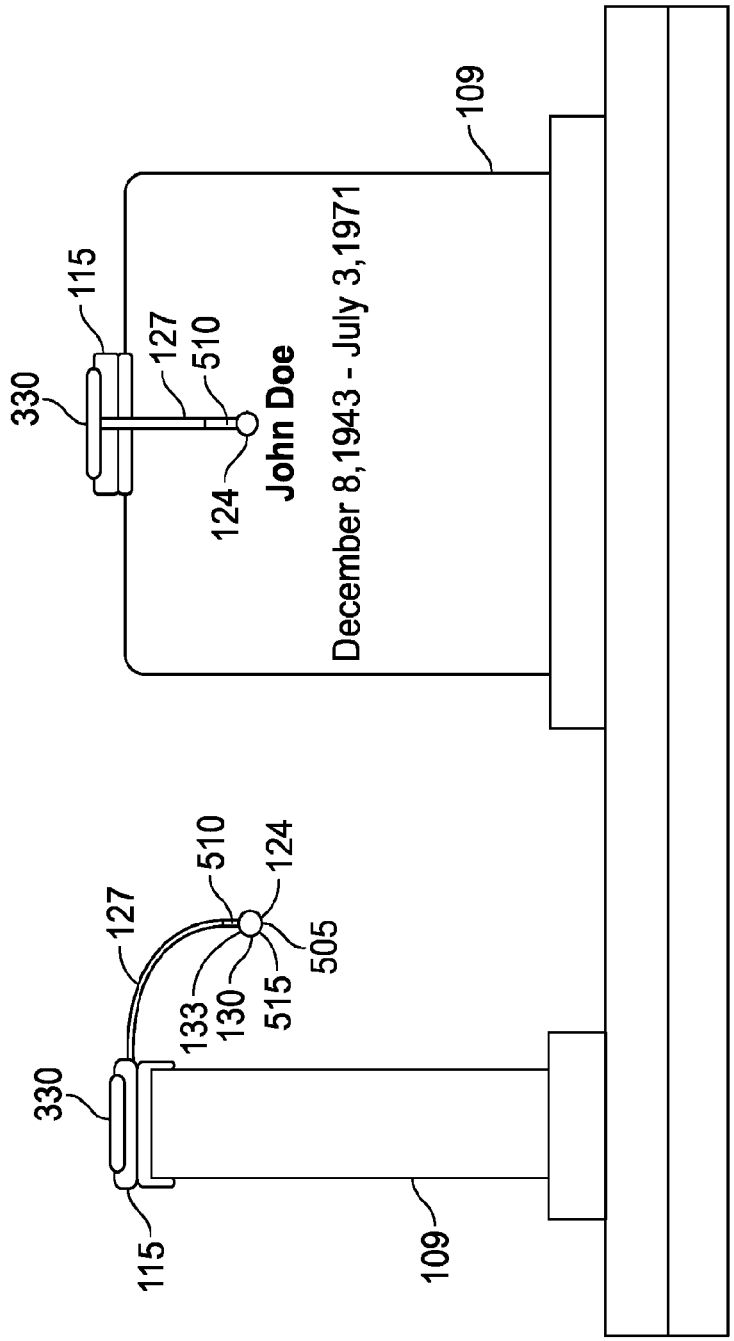
FIG. 5 depicts an illustrative memorial configured with an exemplary graveside telepresence device embodiment.

FIG. 5 depicts an illustrative memorial configured with an exemplary graveside telepresence device embodiment. In FIG. 5, the exemplary memorial 109 is configured with the embodiment graveside telepresence device 115 illustrated in an exemplary memorial-mounted configuration. In some examples, the graveside telepresence device 115 may be mounted to the memorial 109 using a spring-loaded head stone mount. In the illustrated example, the depicted graveside telepresence device 115 includes the multimedia impact module 124. In the depicted embodiment, the multimedia impact module 124 is movably coupled with the graveside telepresence device 115 by the flexible arm mount 127. In some embodiments, the flexible arm mount 127 may include a goose-neck adjustable arm. In the illustrated embodiment, the multimedia impact module 124 includes the laser pointer 130, the audio transducer 133, and the camera 505. The depicted multimedia impact module 124 is attached to the flexible arm mount 127 by the connector 510. In the depicted example, the multimedia impact module 124 also includes the microphone 515. The illustrated embodiment graveside telepresence device 115 includes the solar panel 330 configured to provide power to the graveside telepresence device 115 in various scenarios.

FIG. 6 depicts an illustrative memorial configured with an exemplary graveside telepresence device camera arm extension embodiment. In FIG. 6, the exemplary memorial 109 is configured with the embodiment graveside telepresence device 115 illustrated in an exemplary memorial-mounted configuration. In some examples, the graveside telepresence device 115 may be mounted to the memorial 109 using a spring-loaded head stone mount. In the illustrated example, the depicted graveside telepresence device 115 includes the multimedia impact module 124. In the depicted embodiment, the multimedia impact module 124 is movably coupled with the graveside telepresence device 115 by the flexible arm mount 127. In some embodiments, the flexible arm mount 127 may include a goose-neck adjustable arm. In the illustrated embodiment, the multimedia impact module 124 includes the laser pointer 130, the audio transducer 133, and the camera 505. The depicted multimedia impact module 124 is attached to the flexible arm mount 127 by the connector 510. In the illustrated embodiment, the flexible arm mount 127 is configured with the exemplary arm extension assembly 605 to provide increased range of access to the memorial 109 surface by the multimedia impact module 124. In an illustrative example, the increased range of access to the memorial 109 surface may be advantageous with larger memorials in various scenarios. In the depicted example, the arm extension assembly 605 includes the arm extender 610 removably secured by the arm extension connector 615. In some examples, the arm extension connector 615 may include a lock configured to secure the multimedia impact module 124 against theft. In the depicted example, the multimedia impact module 124 also includes the microphone 515. The illustrated embodiment graveside telepresence device 115 includes the solar panel 330 configured to provide power to the graveside telepresence device 115 in various scenarios. Some embodiments may include multiple arm extender 610 sections coupled by arm extension connector 615 embodiments configured with mixed-gender attachments, permitting extension to arbitrary lengths adaptive to various memorial 109 sizes.

Figure 7A:
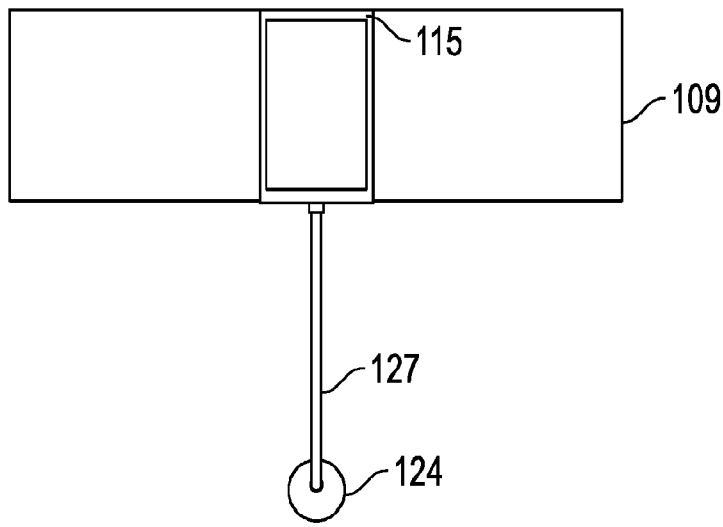
FIGS. 7A-7C depict various views of an exemplary graveside telepresence device embodiment design in an illustrative memorial-mounted configuration.
Figure 7B:
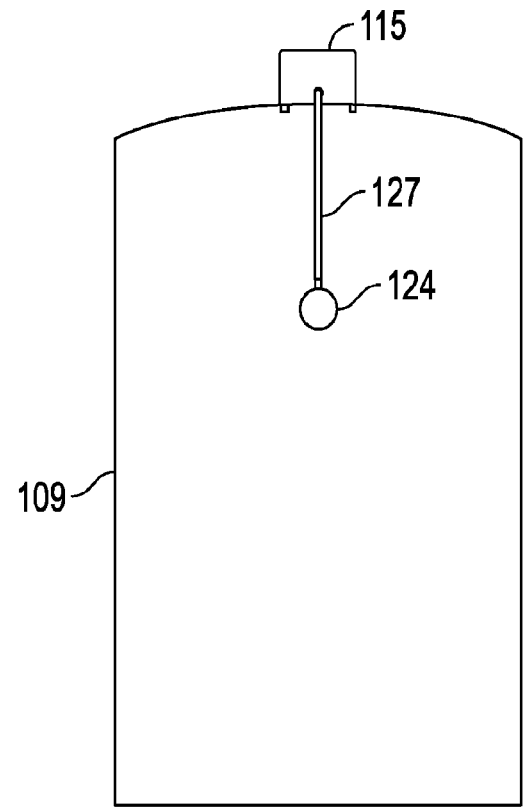
Figure 7C:
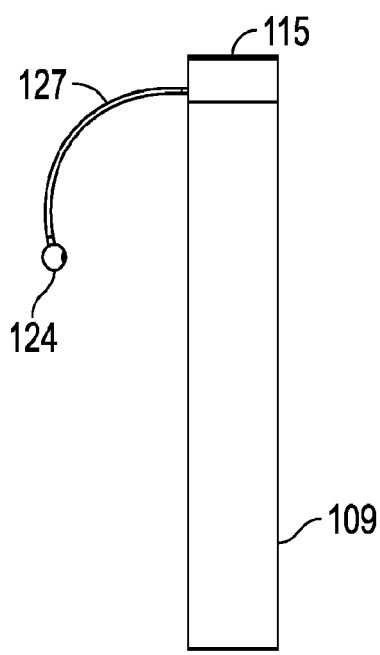

FIGS. 7A-7C depict various views of an exemplary graveside telepresence device embodiment design in an illustrative memorial-mounted configuration. In FIG. 7A, the illustrated graveside telepresence device 115 installation top view depicts the multimedia impact module 124 offset from the memorial 109 front surface by the flexible arm mount 127. In FIG. 7B, the depicted graveside telepresence device 115 installation front view illustrates the multimedia impact module 124 suspended from the graveside telepresence device 115 in front of the memorial 109 front surface by the flexible arm mount 127. In FIG. 7C, the illustrated graveside telepresence device 115 installation side view illustrates the multimedia impact module 124 displaced from the graveside telepresence device 115 memorial 109 front surface by the flexible arm mount 127.

Figure 8A:
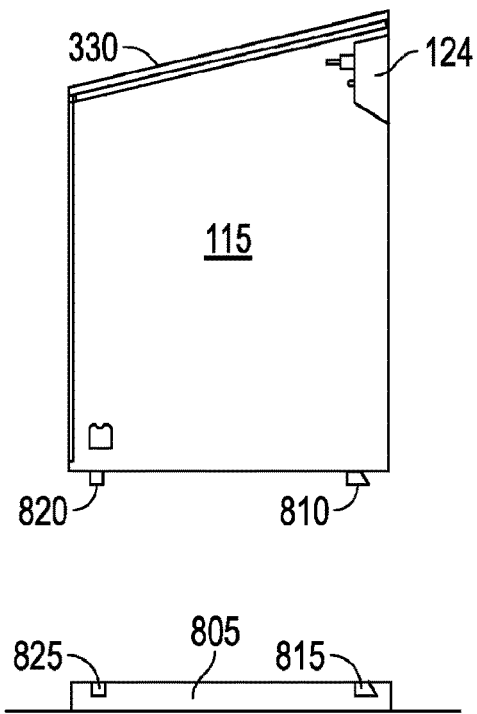
FIGS. 8A-8B depict various views of an exemplary graveside telepresence device embodiment implementation in an illustrative ground-mounted configuration.
Figure 8B:
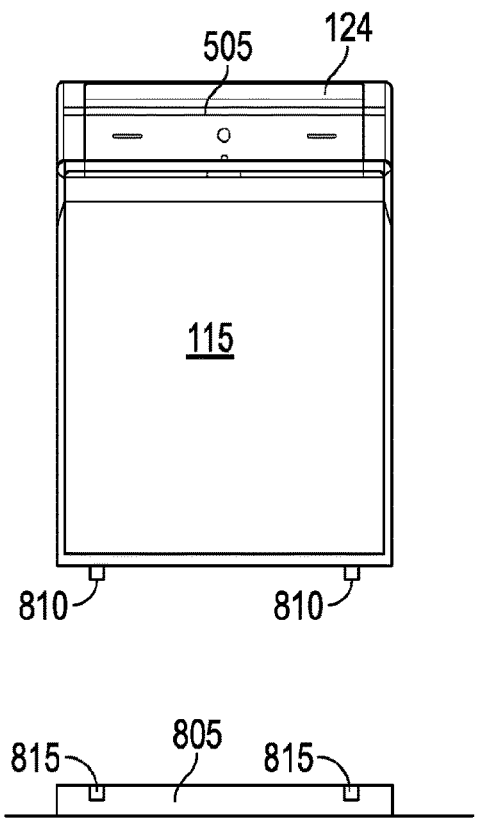

FIGS. 8A-8B depict various views of an exemplary graveside telepresence device embodiment implementation in an illustrative ground-mounted configuration. In FIG. 8A, the depicted graveside telepresence device 115 GroundCam embodiment implementation side view includes the multimedia impact module 124 and the solar panel 330. In the depicted embodiment, the graveside telepresence device 115 GroundCam side view illustrates an exemplary ground-mounted installation configuration. In the depicted example, the graveside telepresence device 115 GroundCam is configured for installation to the mounting plate 805. In the illustrated embodiment, the mounting plate 805 is configured to anchor the graveside telepresence device 115 GroundCam to the ground. In the depicted example, the GroundCam front securing pin 810 is configured to securely engage the front mounting slot 815, and the GroundCam rear securing pin 820 is configured to securely engage the rear mounting slot 825. In FIG. 8B, the graveside telepresence device 115 GroundCam front view illustrates an exemplary ground-mounted installation configuration. In the depicted embodiment, the camera 505 included in the multimedia impact module 124 is visible from the front of the graveside telepresence device 115 GroundCam. In the illustrated embodiment, the GroundCam front securing pins 810 are configured to securely engage the front mounting slots 815. In some embodiments, the mounting plate 805 may be configured with a lock adapted to secure the graveside telepresence device 115 GroundCam to the mounting plate 805, to deter theft.

Figures 58, 59:
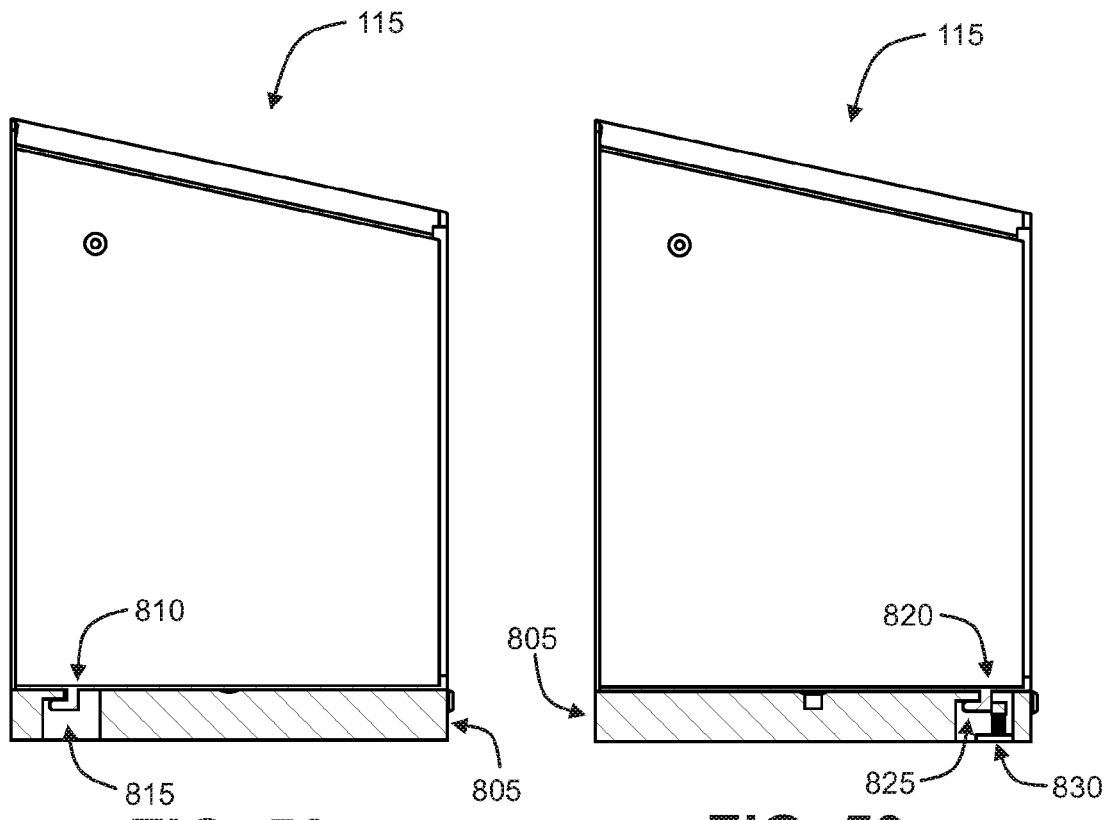
FIG. 58 is a side cross-sectional view of the telepresence device embodiment implementation of FIG. 46 in mounted configuration, showing a front securing pin of the main housing in engagement with a corresponding front mounting slot of the mounting plate.
FIG. 59 is a further side cross-sectional view of the telepresence device embodiment implementation of FIG. 46, showing the device in mounted and locked configuration with a rear securing pin of the main housing in engagement with a corresponding rear mounting slot of the mounting plate, and secured thereat by way of a mounting lock assembly.
Figure 65:
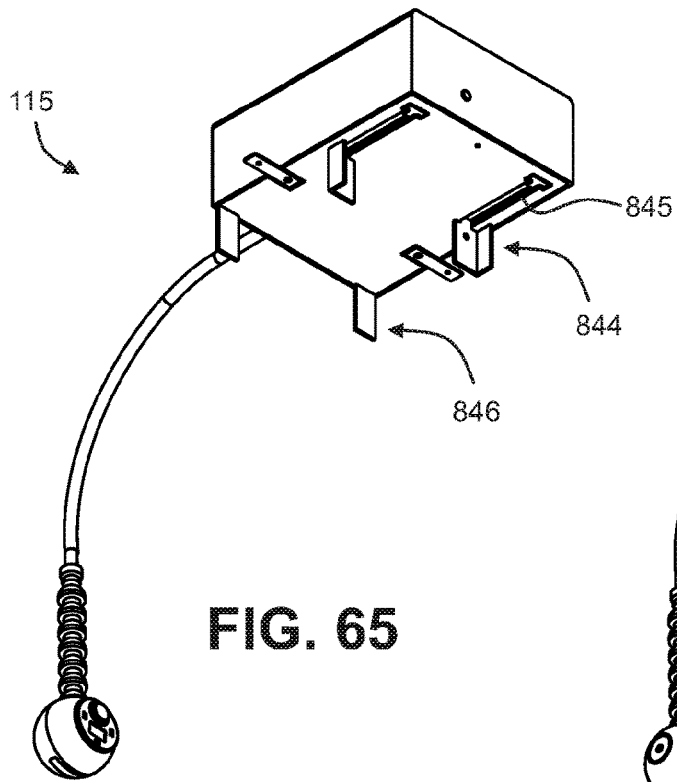
FIG. 65 is a perspective view of the MountCam-type graveside telepresence device embodiment of FIG. 60.
Figure 66:
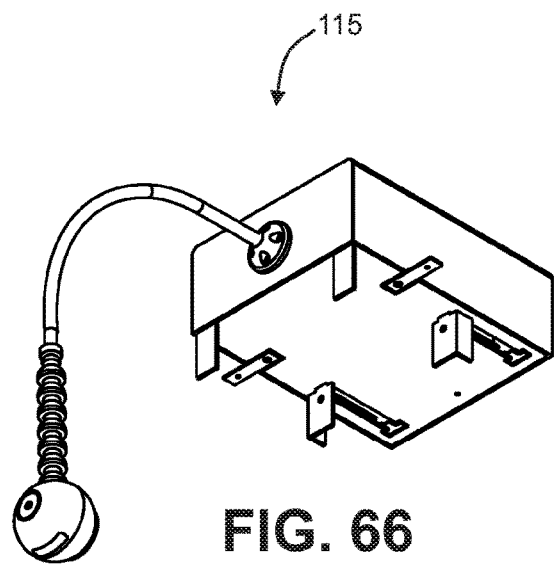
FIG. 66 is a further perspective view of the MountCam-type graveside telepresence device embodiment of FIG. 60.
Figure 67:
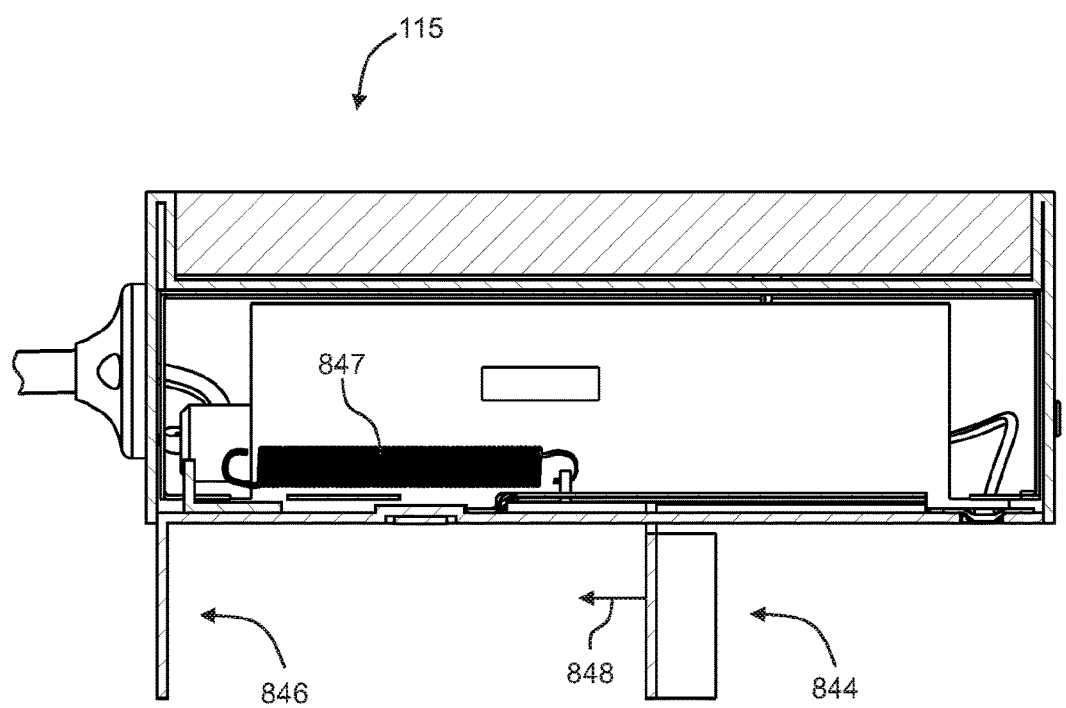
FIG. 67 is a partial cross-sectional view of the MountCam-type graveside telepresence device embodiment of FIG. 60, illustrating elements of the clamp-mounting subsystem.

FIGS. 46-51 depict various views of one exemplary telepresence device 115 implementation in a ground-mounted configuration, and illustrate additional details relating to how the device 115 may preferably be mounted to the ground 822 by way of a mounting plate 805. Certain preferred embodiments of a ground-mountable telepresence device 115 may include a main housing 850 with a front panel 852 and removable rear cover 854. One or more anchor bolts 824 may be provided and configured to extend through corresponding anchor bolt apertures 826 in the mounting plate 805 and into the ground 822, thus affixing the mounting plate 805 to the ground 822. FIGS. 53-59 depict additional details of an exemplary mounting plate 805 for use with a ground-mountable embodiment of a telepresence device 115. In particular, a mounting lock assembly 830 is shown incorporated into the mounting plate 805. A mounting lock assembly 830 may be configured to move between a locked and unlocked configuration. Referring to FIG. 59, when in the locked configuration, the mounting lock assembly 830 is configured to retain the rear securing pins 820 in their respective rear mounting slots 825 by, for example, blocking rearward movement of the rear securing pins 820 with respect to the mounting plate 805. When in an unlocked configuration, the mounting lock assembly is configured to allow the rear securing pins 820 to be removed from their respective rear mounting slots 825. A mounting lock assembly 830 may preferably include an elongated buckle element 832, a pressure plate 834, one or more spring elements 836 disposed therebetween, and a plum blossom lock (or the like) 838. The pressure plate 834 may be rigidly affixed to the mounting plate 805. The buckle element 832 is transportable between a locking position and an unlocking position. When in the unlocking position, the elongated buckle element 832 is closer to the pressure plate 834 than in the locking position. Transport of the elongated buckle element 832 to its locking position results in the mounting lock assembly 830 being in the locking configuration. The elongated buckle element 832 is resiliently biased toward the locking position by way of the spring elements 836. This resilient bias is configured to be overcome by movement of the plum blossom lock 838 from a lock orientation to an unlock orientation.

Figure 9A:
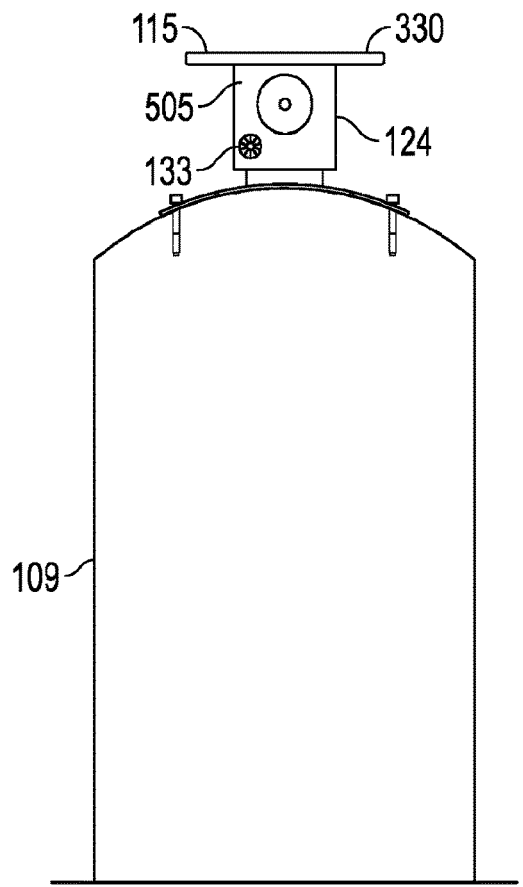
FIGS. 9A-9C depict various views of an exemplary graveside telepresence device embodiment camera design in an illustrative memorial-mounted configuration.
Figure 9B:
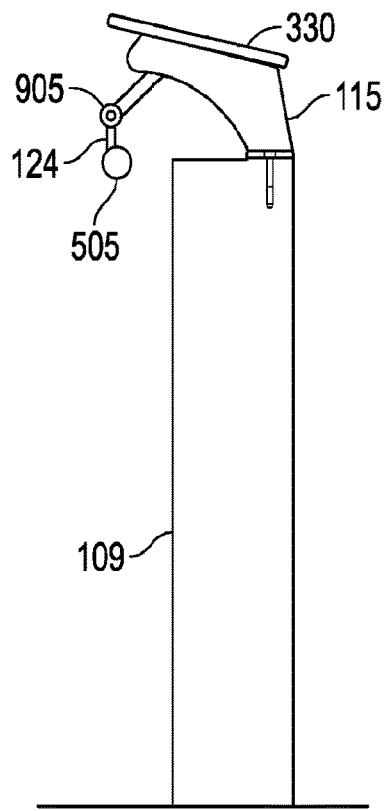
Figure 9C:
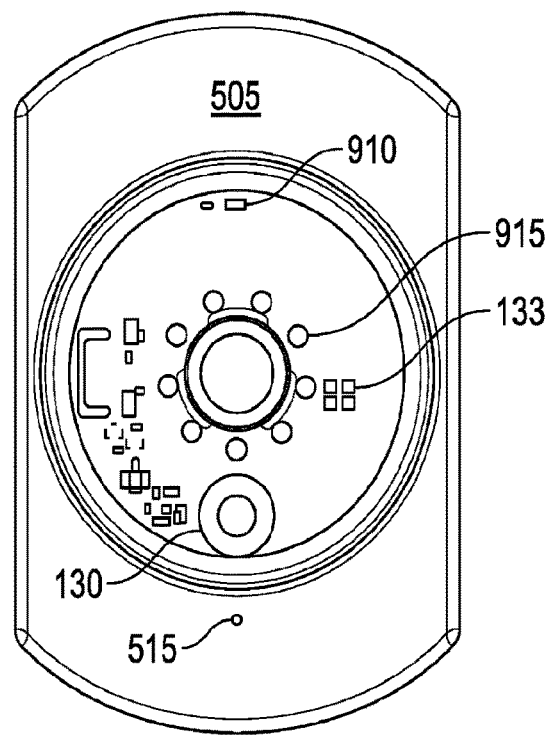

FIGS. 9A-9C depict various views of an exemplary graveside telepresence device embodiment camera design in an illustrative memorial-mounted configuration. In FIG. 9A, the depicted front view of the graveside telepresence device 115 MountCam embodiment includes the solar panel 330. In the depicted embodiment, the graveside telepresence device 115 MountCam includes the multimedia impact module 124. In the illustrated example, the graveside telepresence device 115 MountCam is mounted to the memorial 109 by a hardware fixing bracket and expansion screw. In the illustrated embodiment, the multimedia impact module 124 includes the camera 505 and the audio transducer 133. In FIG. 9B, the depicted multimedia impact module 124 is movably coupled with the graveside telepresence device 115 MountCam by the adjustable bracket 905. In FIG. 9C, the depicted camera 505 includes the laser pointer 130, audio transducer 133, microphone 515, work indicator lamp 910, and infrared light 915. Referring to FIG. 60, certain telepresence devices 115 may include a 12V charging port 840 and may include a TransFlash (TF) card 842 or the like.

FIGS. 60-67 depict various views of one exemplary embodiment of a graveside telepresence device 115 configured to be mounted to a memorial by way of a spring-clamping subassembly. The spring-clamping subassembly may include one or more spring-loaded clamp jaws 844. Each spring-loaded clamp jaw 844 may be movable along respective clamp grooves 845 between a clamping and an unclamping position. One or more static clamp jaws 846 may be rigidly affixed to the housing of the device 115. One or more clamp springs 847 may spring bias corresponding spring-loaded clamp jaws 844 toward their clamping position. When a spring-loaded clamp jaw is in its clamping position, it is closer to its corresponding static clamp jaw 846 then when it is in its unclamping position. Accordingly, Referring to FIG. 67, each spring-loaded clamp jaw 844 is configured to generate a clamping force 848 between the spring-loaded clamp jaw 844 and its corresponding status clamp jaw 846. This clamping force 848 is configured to clampingly secure the device 115 to the memorial 109.

Figure 10:
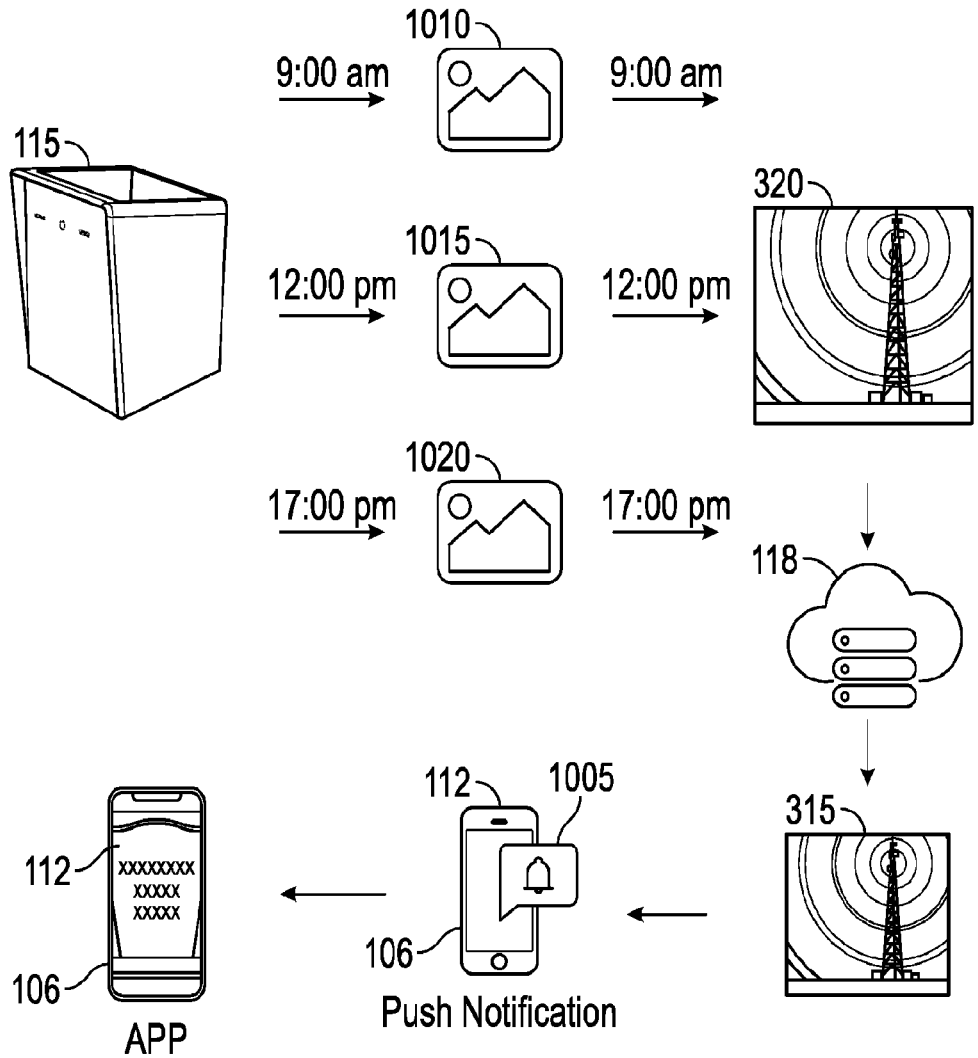
FIG. 10 depicts an exemplary graveside telepresence device embodiment in an illustrative time-lapse video scenario.

FIG. 10 depicts an exemplary graveside telepresence device embodiment in an illustrative time-lapse video scenario. In FIG. 10, the depicted embodiment graveside telepresence device 115 is scheduled to take three single images per day. In the illustrated example, the graveside telepresence device 115 is scheduled to send push notification 1005 once per day to the embodiment GraveTime App configured in the mobile device 106 user interface 112. In the depicted embodiment, the graveside telepresence device 115 is configured to take images at the first scheduled time 1010 of 9:00 AM, the second scheduled time 1015 of 12:00 PM, and the third scheduled time 1020 of 17:00 PM. In some embodiments, the graveside telepresence device 115 may send the push notification 1005 to the GraveTime App once per day after the last scheduled image is captured. In various designs, more than one push notification 1005 may be queued and sent on demand, or on a user-configurable schedule. In the illustrated embodiment, the images are transferred via the push notification 1005 to the GraveTime App diary when the GraveTime App connects. In the depicted embodiment, the graveside telepresence device 115 sends the push notification 1005 to the GraveTime App through the graveside internet service provider 320 and the network cloud 118 to the user internet service provider 315.

FIG. 11 depicts an exemplary graveside telepresence device embodiment in an illustrative geofencing scenario. In FIG. 11, the exemplary graveside telepresence device 115 is configured with a geofence to deter theft and vandalism, and provide user notification in the event the graveside telepresence device 115 is moved or stolen. In the depicted example, GPS satellite 1105 data including the graveside telepresence device 115 GPS location 1110 is saved during the setup process on the GraveTime App configured in the mobile device 106 user interface 112. In the illustrated embodiment, the graveside telepresence device 115 GPS location 1110 is saved on the graveside telepresence device 115 SD card 1115. In the depicted example, the graveside telepresence device 115 sends the GPS location 1110 to the GraveTime App via the user internet service provider 315. In the illustrated embodiment, the graveside telepresence device 115 checks the current GPS location every five minutes. In the depicted example, if the current graveside telepresence device 115 GPS location does not equal the saved GPS location 1110, the graveside telepresence device 115 sends push notification 1005 to the GraveTime App configured in the user's mobile device 106 user interface 112. In various designs, the push notification 1005 may include the current graveside telepresence device 115 GPS location. In some embodiments, the geofence notification may be sent via SMS. In various implementations, the geofence notification may be triggered only if the graveside telepresence device 115 GPS location does not equal the saved location within a safe area tolerance. In various designs, the safe area may be configurable to avoid false alarms. In an illustrative example, the geofence notification may be deactivated to permit maintenance. In various implementations, the geofence safe area may be adapted to enforce various areas based on a schedule, to permit, for example, embodiment graveside telepresence device 115 movement to various memorials within a facility without triggering a geofence notification.

Figure 12:
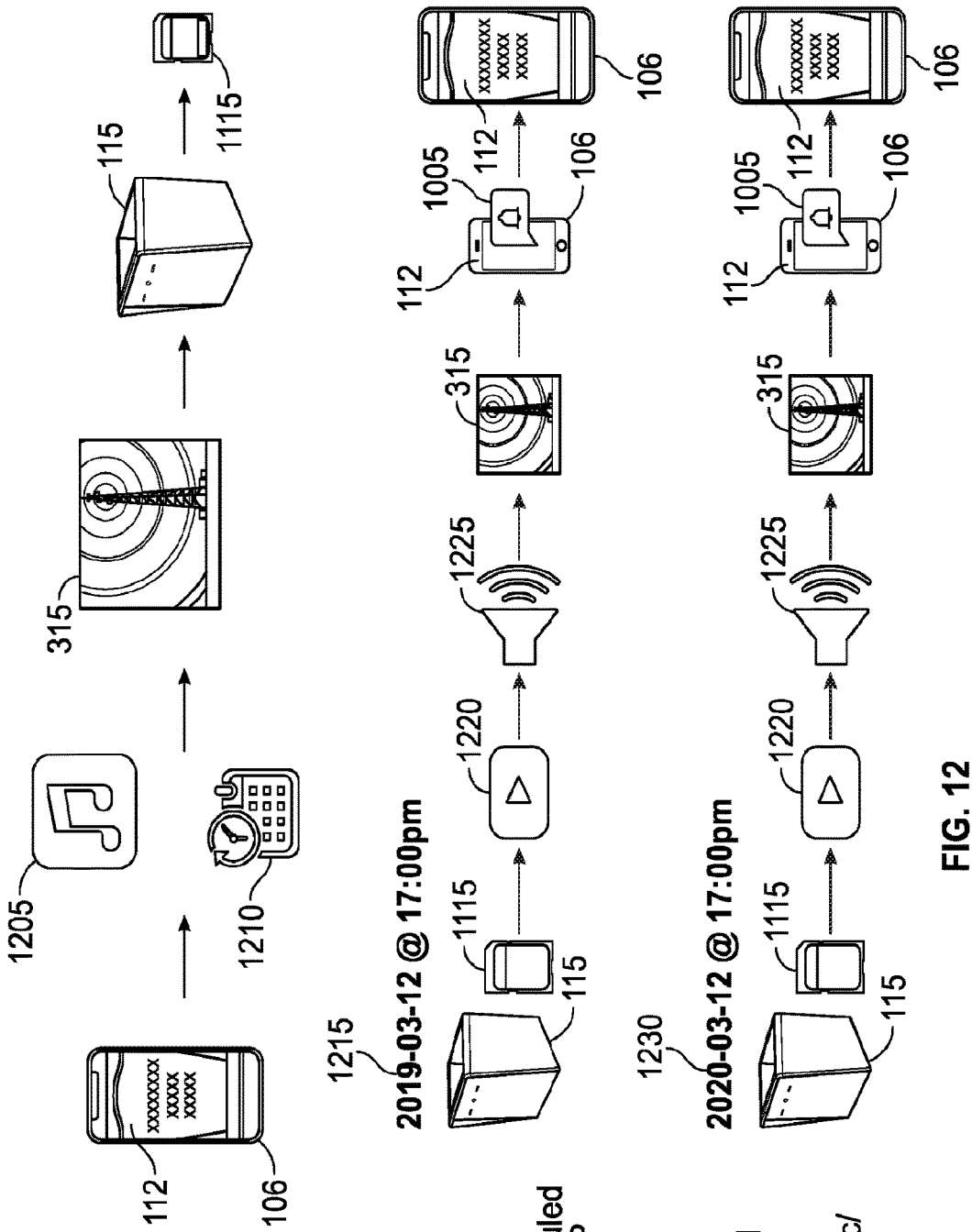
FIG. 12 depicts an exemplary graveside telepresence device embodiment in an illustrative scheduled music scenario.

FIG. 12 depicts an exemplary graveside telepresence device embodiment in an illustrative scheduled music scenario. In FIG. 12, the embodiment GraveTime App configured in the mobile device 106 user interface 112 configures the exemplary graveside telepresence device 115 to play the song 1205 on the graveside telepresence device 115 according to the schedule 1210. In the illustrated example, the schedule 1210 includes the first scheduled time and date 1215 and the second scheduled time and date 1230. In the depicted embodiment, the GraveTime App sends the song 1205 to the graveside telepresence device 115 through the user internet service provider 315. In the illustrated embodiment, the graveside telepresence device 115 stores the song 1205 to the SD card 1115. In the depicted example, the song 1205 stored on the graveside telepresence device 115 SD card 1115 will be played based on a scheduled time, and not streamed. In the illustrated example, the GraveTime App does not need to be connected for the graveside telepresence device 115 to play the song 1205. In various examples, the song 1205 may be an audio data file in MP3 format. In the depicted embodiment, a GraveTime App user configures the graveside telepresence device 115 to play the song 1205 from the SD card 1115 at the first scheduled time and date 1215 on the graveside telepresence device 115 media player 1220. In the depicted example, the song 1205 is played through the graveside telepresence device 115 speaker 1225 according to the first scheduled time and date 1215. In the illustrated embodiment, the graveside telepresence device 115 sends push notification 1005 through the user internet service provider 315 to the GraveTime App configured in the mobile device 106 user interface 112, to confirm the song 1205 was played at the first scheduled time and date 1215. In the illustrated embodiment, the GraveTime App user configures the graveside telepresence device 115 to play the song 1205 from the SD card 1115 at the second scheduled time and date 1230 on the graveside telepresence device 115 media player 1220. In the depicted example, the song 1205 is played through the graveside telepresence device 115 speaker 1225 according to the second scheduled time and date 1230. In the illustrated embodiment, the graveside telepresence device 115 sends push notification 1005 through the user internet service provider 315 to the GraveTime App configured in the mobile device 106 user interface 112, to confirm the song 1205 was played at the second scheduled time and date 1230.

Figure 13:
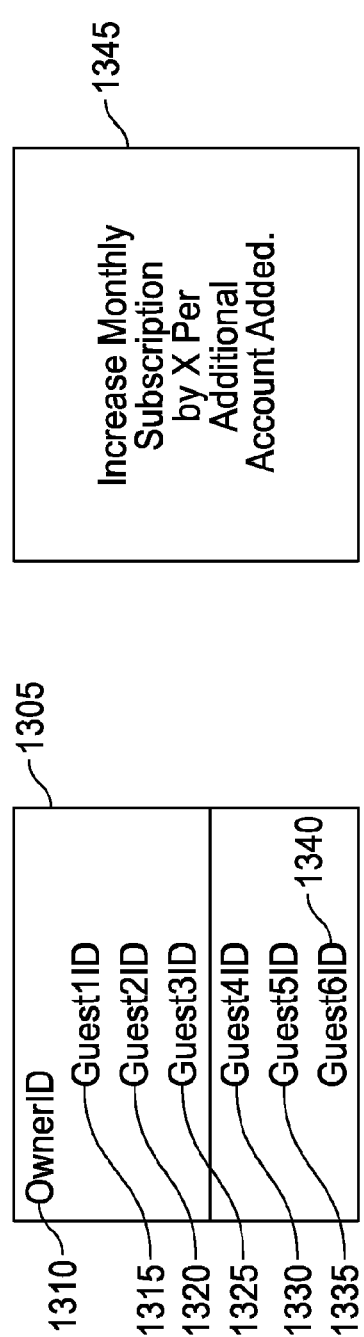
FIG. 13 depicts an exemplary user account camera invitation feature, in accordance with various graveside telepresence embodiment designs.

FIG. 13 depicts an exemplary user account camera invitation feature, in accordance with various graveside telepresence embodiment designs. In FIG. 13, the exemplary GraveTime user account 1305 includes the OwnerID 1310. In the depicted example, the account 1305 OwnerID 1310 is the master account. In the illustrated example, the account 1305 includes four additional users Guest1ID 1315, Guest2ID 1320, and Guest3ID 1325. In the illustrated account example, the master account OwnerID 1310 may add optional additional accounts, based on increasing the monthly subscription by a predetermined amount per additional account added. In some examples, the monthly subscription may be increased by a variable amount determined as a function of the number of accounts controlled by the master account OwnerID 1310. In the illustrated embodiment, the master account OwnerID 1310 has added the optional additional accounts Guest4ID 1330, Guest5ID 1335, and Guest6ID 1340.

Figure 14:
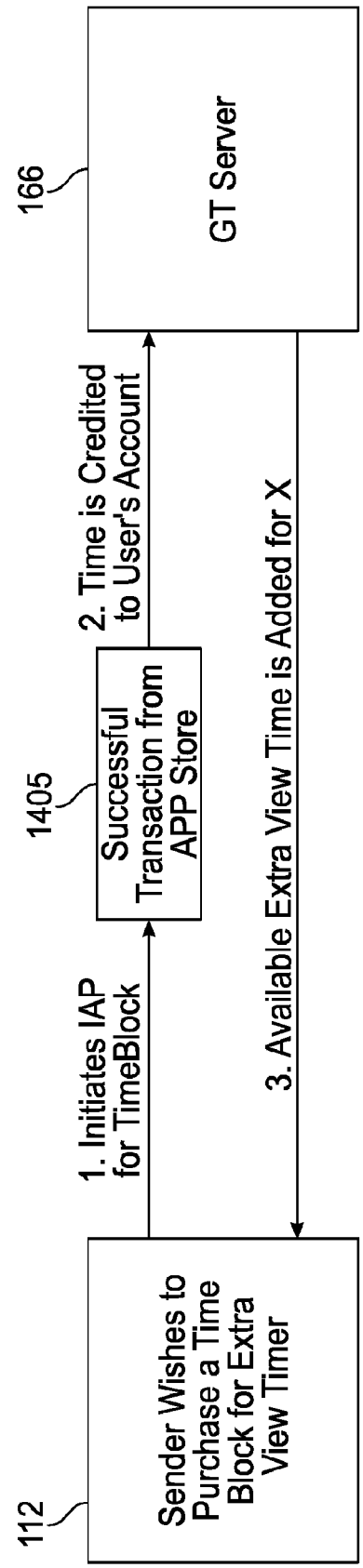
FIG. 14 depicts an exemplary user telepresence time block purchase scenario, in accordance with various graveside telepresence embodiment designs.

FIG. 14 depicts an exemplary user telepresence time block purchase scenario, in accordance with various graveside telepresence embodiment designs. In FIG. 14, an exemplary GraveTime App user wishes to purchase a time block for extra view time. In the depicted example, the user initiates an in-app time block purchase through the GraveTime App implemented in the embodiment user interface 112. In the depicted example, the user completes the successful app store transaction 1405 for the time block using the GraveTime App. In the illustrated embodiment, the additional time block purchased through the app store is credited to the user's account in the account management server 166. In the depicted example, the extra view time from the purchased time block is available to the user's account, and the user is connected until the extra view time is exhausted.

Figure 15:
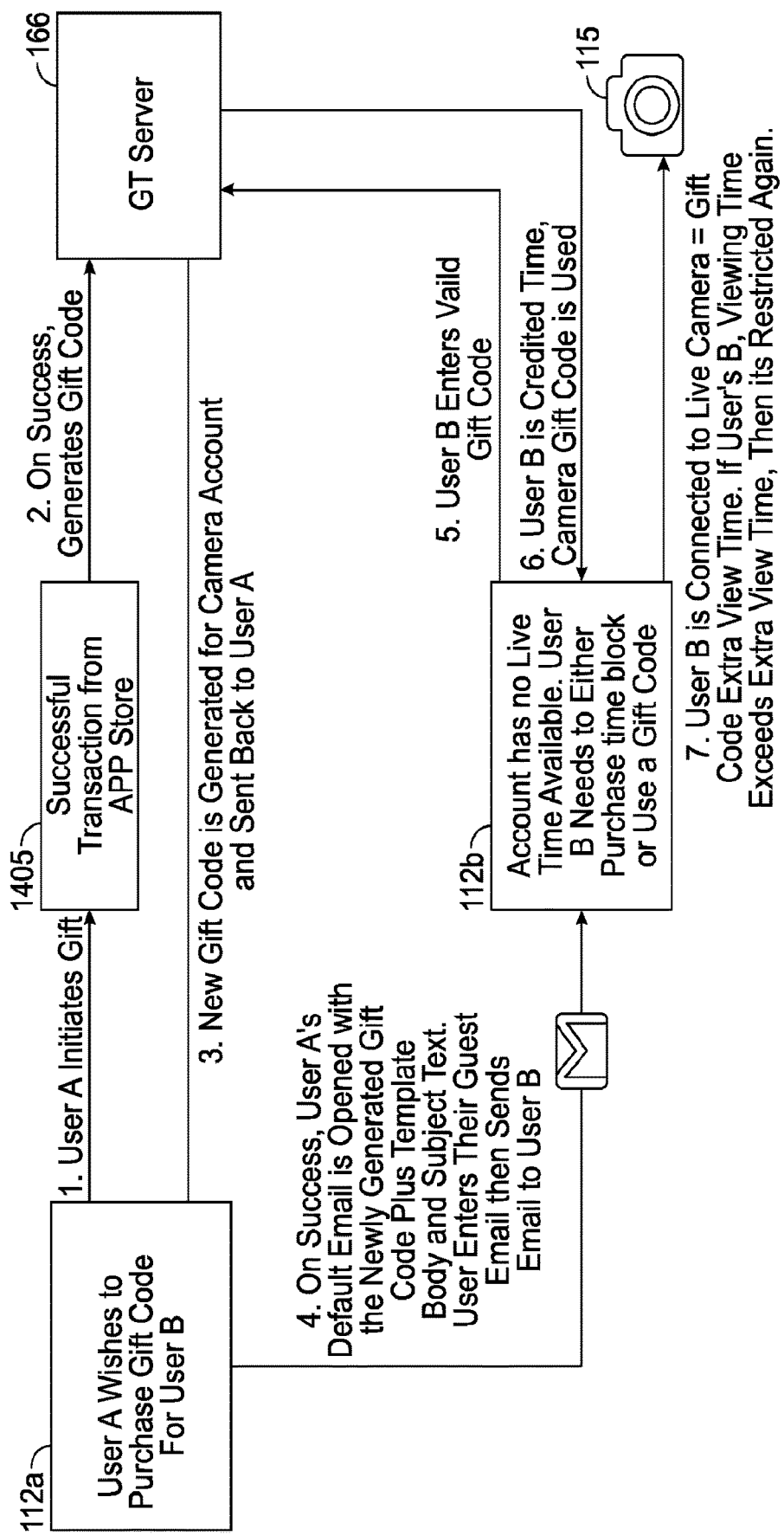
FIG. 15 depicts an exemplary multiple user telepresence time block gifting scenario, in accordance with various graveside telepresence embodiment designs.

FIG. 15 depicts an exemplary multiple user telepresence time block gifting scenario, in accordance with various graveside telepresence embodiment designs. In FIG. 15, user A wishes to purchase a viewing time gift code for user B. In the illustrated example, user B's account has no live time available, and user B needs to either purchase a time block, or use a gift code. In the depicted example, user A employs the embodiment GraveTime App user interface 112*a*, and user B employs the embodiment GraveTime App user interface 112*b*. In the illustrated example, user A initiates the gift purchase through the successful app store transaction 1405 for the viewing time gift code. In the depicted example, the account management server 166 generates the new gift code for the camera account upon the successful app store transaction 1405. In the illustrated embodiment, the account management server 166 sends the generated gift code to user A in the GraveTime App user interface 112*a*. Upon receipt of the gift code purchased by user A, the GraveTime App user interface 112*a* opens user A's default email with the new gift code, plus an email message template body and subject text. In the depicted scenario, user A may enter the guest user B's email address, and initiate sending the email to user B. In the illustrated example, user B enters the valid gift code received from user A in the GraveTime App user interface 112*b*. In the depicted embodiment, the GraveTime App user interface 112*b* sends the gift code to the account management server 166. In the illustrated example, the account management server 166 credits user B's account with the gifted viewing time purchased by user A. In the depicted example, user B is connected via the GraveTime App user interface 112b to the exemplary graveside telepresence device 115 for live extra view time. In the illustrated embodiment, if user B's viewing time exceeds the extra view time, user B's viewing will be restricted.

FIG. 16 depicts an exemplary graveside telepresence device embodiment in an illustrative time-lapse photo scenario, in accordance with various graveside telepresence embodiment designs. In FIG. 16, the depicted embodiment graveside telepresence device 115 is scheduled to take three single images per day, storing the images on the SD card 1115 and pushing the images to a server in the network cloud 118. In the illustrated example, the graveside telepresence device 115 is scheduled to send a local push notification once per day to the embodiment GraveTime App configured in the mobile device 106 user interface 112. In the depicted embodiment, the graveside telepresence device 115 is configured to take images at the first scheduled time 1605 of 9:00 AM, the second scheduled time 1610 of 12:00 PM, and the third scheduled time 1615 of 17:00 PM. In some embodiments, the graveside telepresence device 115 may send the push notification to the GraveTime App once per day after the last scheduled image is captured. In various designs, more than one push notification may be queued and sent on demand, or on a user-configurable schedule. In the illustrated embodiment, the images are transferred via the push notification to the GraveTime App diary when the GraveTime App connects. In the depicted embodiment, the graveside telepresence device 115 sends the push notification to the GraveTime App through the network cloud 118 and the user internet service provider 315. In an illustrative example, each camera owner user account should have a unique share URL for the time-lapse photos.

Figure 17:
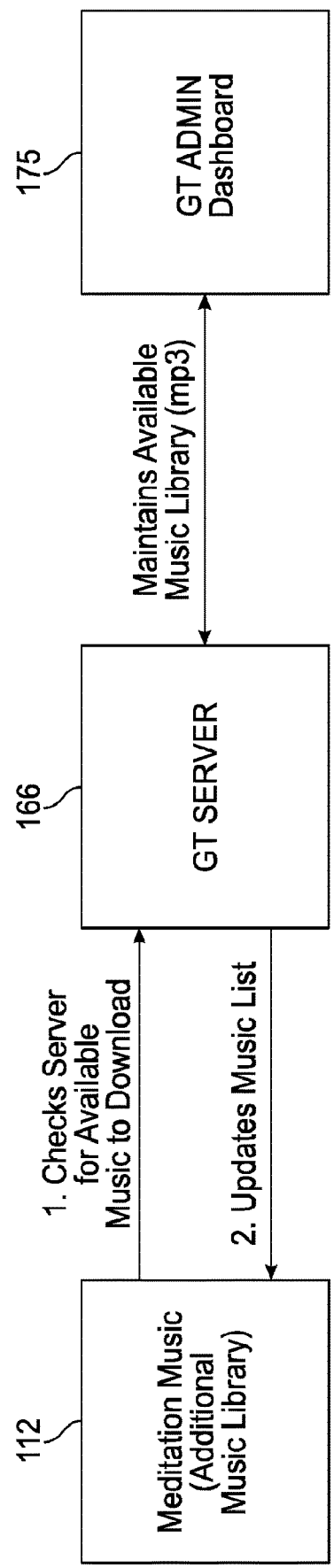
FIG. 17 depicts an exemplary meditation music library feature, in accordance with various graveside telepresence embodiment designs.

FIG. 17 depicts an exemplary meditation music library feature, in accordance with various graveside telepresence embodiment designs. In FIG. 17, the depicted embodiment GraveTime App configured in the user interface 112 checks the account management server 166 for available music to download from the available music library maintained by the administrative server 175. In the illustrated example, the account management server 166 updates the music list in the GraveTime App.

Figure 18:
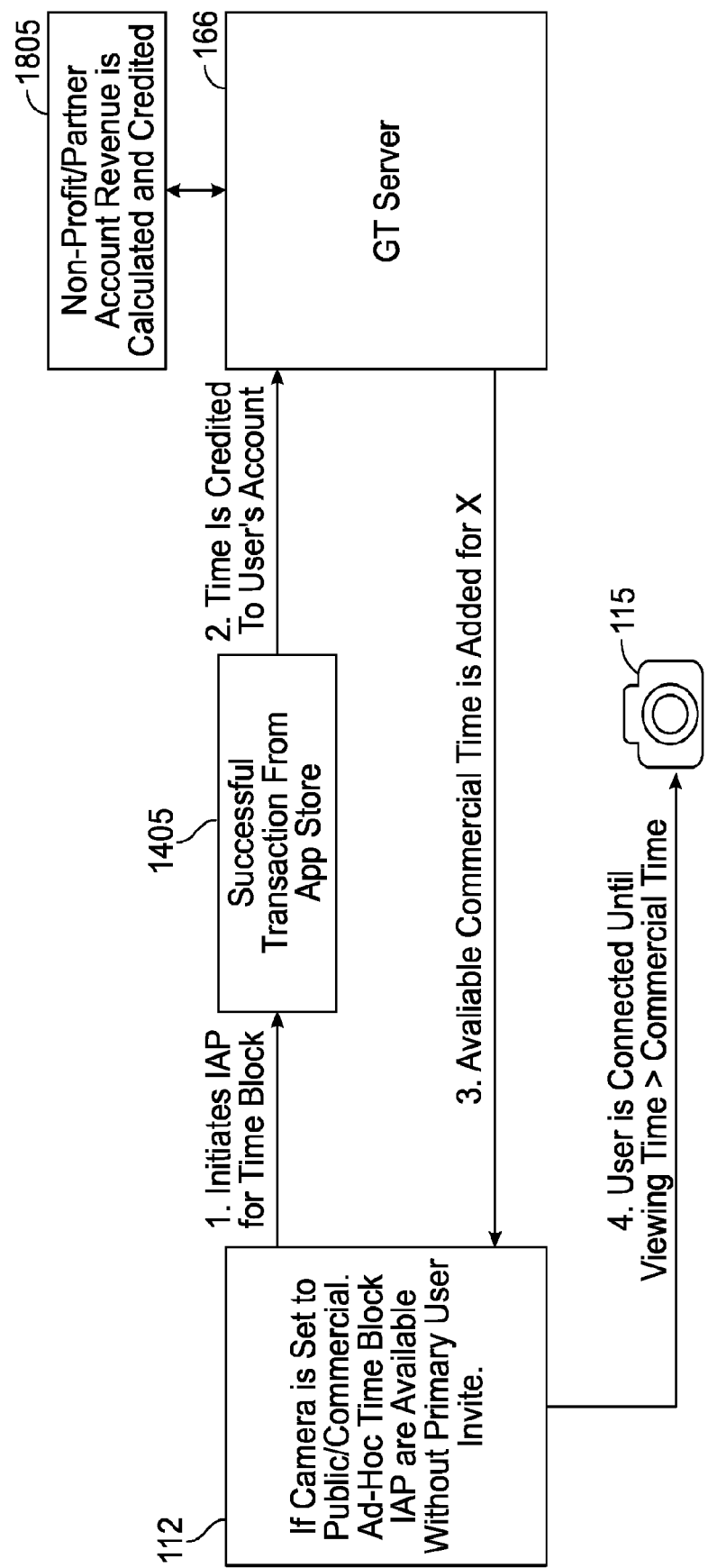
FIG. 18 depicts an exemplary fund raising feature, in accordance with various graveside telepresence embodiment designs.

FIG. 18 depicts an exemplary fund-raising feature, in accordance with various graveside telepresence embodiment designs. In FIG. 18, a user of the exemplary graveside telepresence device 115 initiates an in-app purchase of a viewing time block through the embodiment GraveTime App configured in the exemplary user interface 112. In the depicted example, upon the successful app store purchase 1405, the viewing time block is credited to the user's account in the account management server 166. In the illustrated example, the non-profit/partner account revenue 1805 is calculated and credited to the partner's account in the account management server 166. In the depicted embodiment, the available commercial time is added, and the user is connected to the graveside telepresence device 115 until the viewing time exceeds the commercial time. In an illustrative example, if the camera is set to public/commercial, ad-hoc time block in app purchase is available without an invitation from a primary user.

FIG. 19 depicts an exemplary graveside telepresence user interface in an illustrative user registration and login scenario, in accordance with various graveside telepresence embodiment designs. In FIG. 19, the exemplary GraveTime App configured in the exemplary user interface 112 includes the splash screen 1905. In various examples, the splash screen 1905 may be displayed upon launch of an embodiment GraveTime App to welcome a user. In some examples, the splash screen 1905 may be adapted with branding tailored to a specific memorial site. In the depicted example, the GraveTime App includes the login screen 1910 configured to permit the user to authenticate to the GraveTime system, register a new account, or initiate recovery from a forgotten password scenario. In the depicted example, the login screen 1910 includes a control configured to activate or deactivate an automatic login feature. In the illustrated embodiment, the GraveTime App registration screen 1915 permits the user to create a new GraveTime account based on providing a valid email address and confirming a new password.

Figure 20:
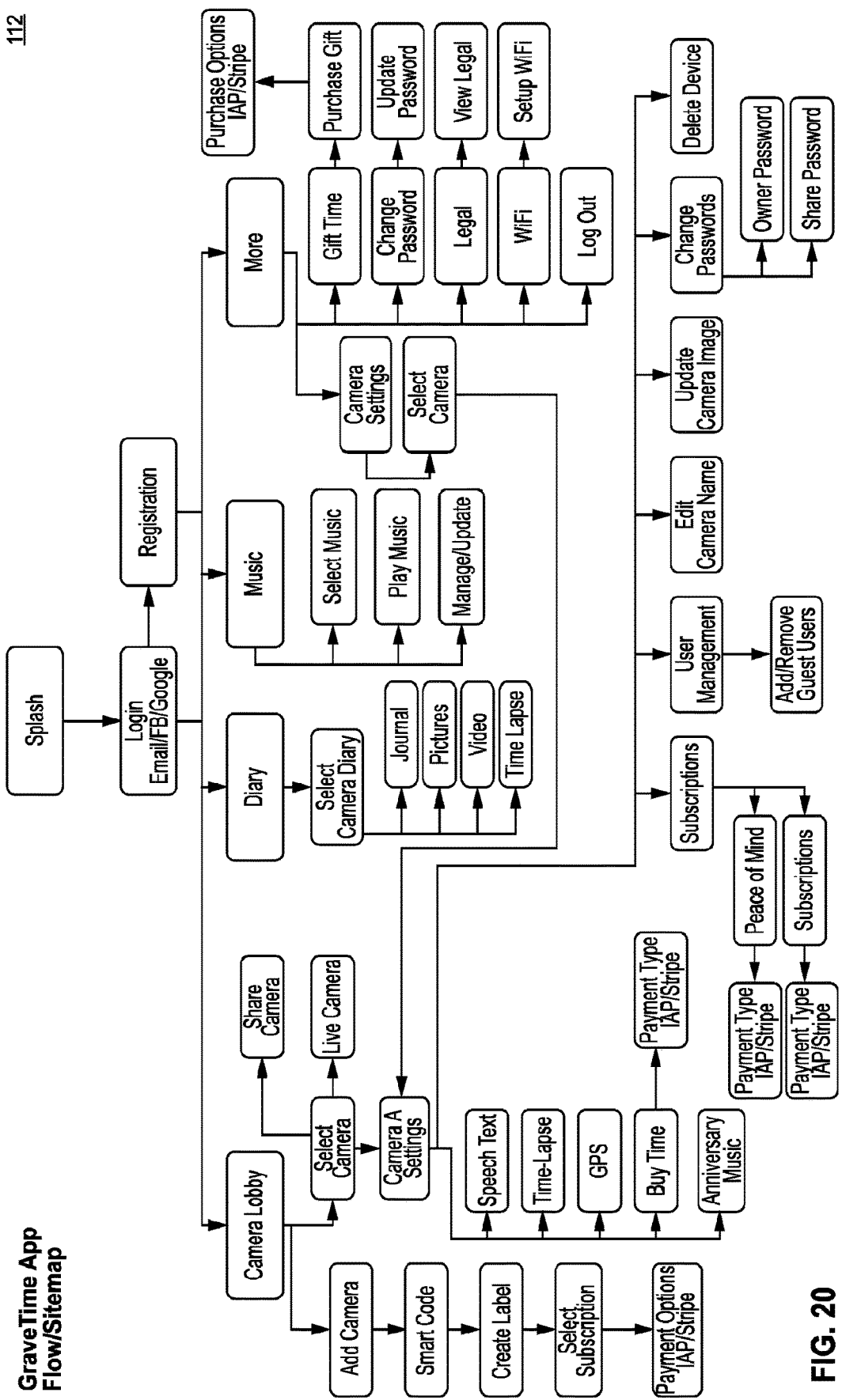
FIG. 20 depicts an exemplary graveside telepresence user interface flow map, in accordance with various graveside telepresence embodiment designs.

FIG. 20 depicts an exemplary graveside telepresence user interface flow map, in accordance with various graveside telepresence embodiment designs. In FIG. 20, the exemplary graveside telepresence user interface flow map depicts the menu layout and functional organization of an exemplary GraveTime App configured in an exemplary user interface 112, illustrated at least in FIGS. 19-34. In various examples, an embodiment GraveTime App implementation may be advantageously adapted to facilitate graveside telepresence through any of a user's mobile device, tablet, laptop, web application, command shell, or desktop computer user interface environments.

Figure 21:
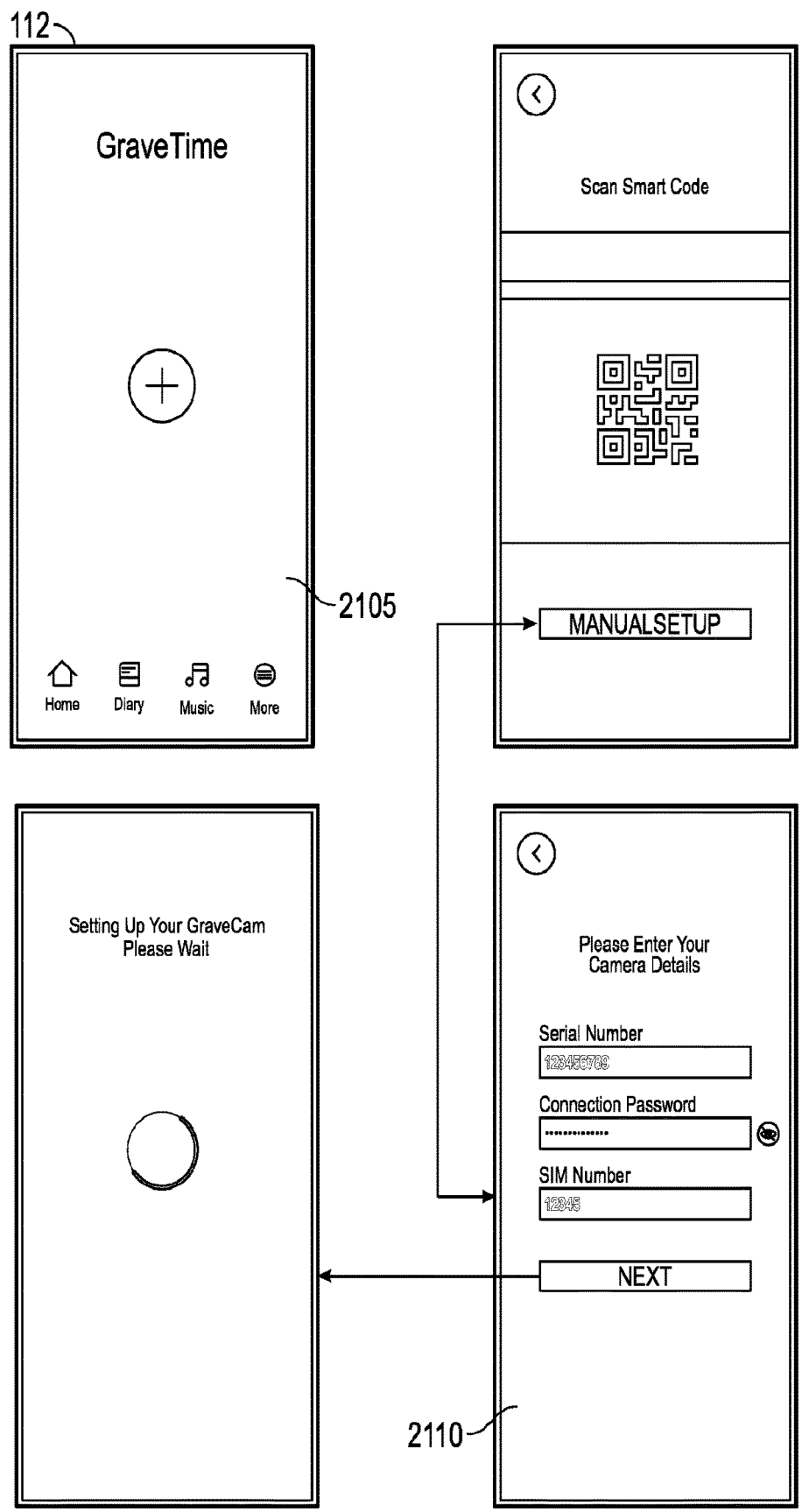
FIG. 21 depicts an exemplary graveside telepresence user interface in an illustrative camera add scenario, in accordance with various graveside telepresence embodiment designs.

FIG. 21 depicts an exemplary graveside telepresence user interface in an illustrative camera add scenario, in accordance with various graveside telepresence embodiment designs. In FIG. 21, the exemplary GraveTime App configured in the exemplary user interface 112 includes the camera add menu 2105. In the depicted example, the camera add menu 2105 is the first scene for a user after the user registers. In the illustrated example, the user may only add a new 4G camera. In various embodiments, a dynamic link may be provided to share the camera. In the depicted embodiment, the user may automatically add a camera based on scanning the smart code, or the user may select manual setup. In the depicted example, the manual camera setup screen 2110 permits the user to enter their camera details.

Figure 22A:
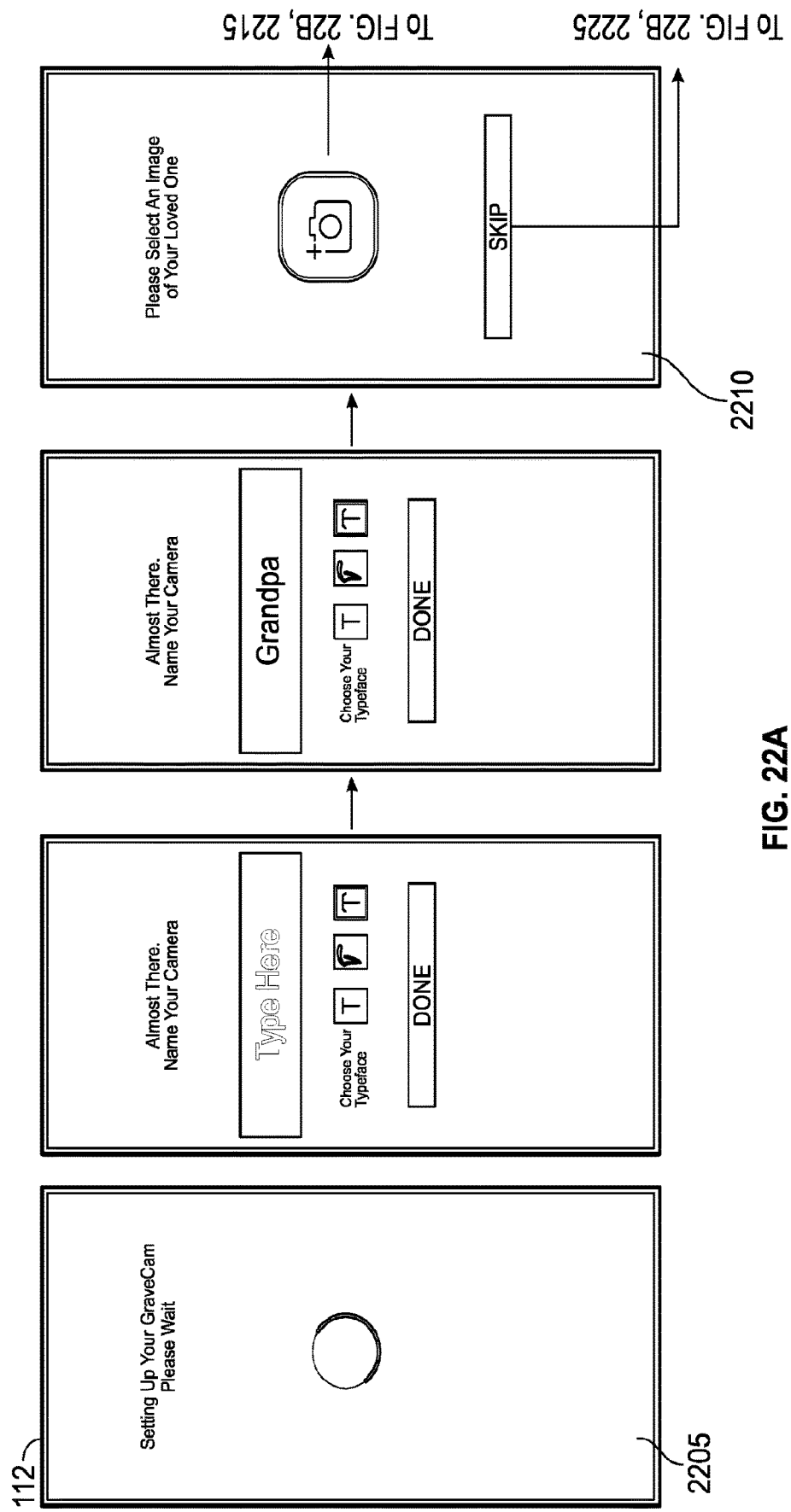
FIGS. 22A-22B together depict an exemplary graveside telepresence user interface in an illustrative camera labeling scenario, in accordance with various graveside telepresence embodiment designs.
Figure 22B:
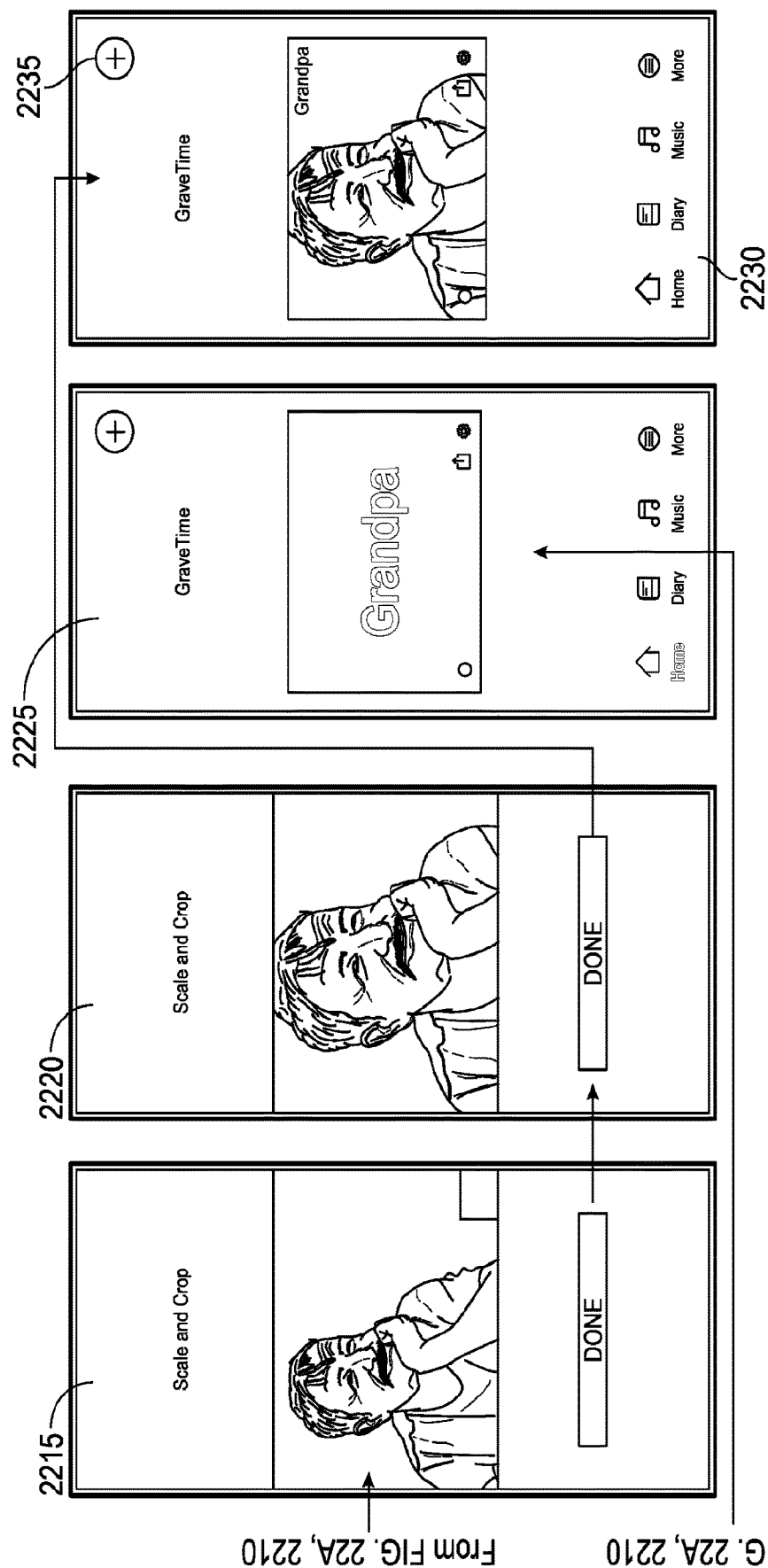

FIGS. 22A-22B together depict an exemplary graveside telepresence user interface in an illustrative camera labeling scenario, in accordance with various graveside telepresence embodiment designs. In FIG. 22A, the exemplary GraveTime App configured in the exemplary user interface 112 includes the camera label start screen 2205. In the depicted example, a user may enter a text label for their camera. In an illustrative example, the camera label entered by the user may associate the camera with the deceased person's name or relationship with the user. In the illustrated example, the user has entered the camera label "Grandpa." In various embodiments, the user may be able to customize the camera label display font. In the depicted embodiment, the photo upload screen 2210 permits the user to add a photo representative of the camera associated to the deceased person. In FIG. 22B, the exemplary GraveTime App configured in the exemplary user interface 112 includes the photo crop screen 2215 permitting the user to optionally adjust the borders of the deceased person's photo. In the depicted embodiment, the user may optionally adjust the photo scale in the photo scale screen 2220. In the illustrated example, the user-customized camera label is presented to the user in the camera label screen 2225, and the GraveTime App takes the user to the GraveTime App camera lobby 2230 screen. In the depicted embodiment, the GraveTime App camera lobby 2230 displays the user's configured cameras in addition to the camera add button 2235. In various examples, the camera add button 2235 is configured to permit the user to add a new camera to the GraveTime App camera lobby 2230.

FIG. 23 depicts an exemplary graveside telepresence user interface displaying an exemplary camera lobby feature, in accordance with various graveside telepresence embodiment designs. In FIG. 23, the exemplary GraveTime App configured in the exemplary user interface 112 includes the GraveTime App camera lobby 2230 displaying the user's cameras configured in the GraveTime App. In the depicted example, the GraveTime App camera lobby 2230 screen includes the camera add button 2235 configured to permit the user to add a new camera to the GraveTime App camera lobby 2230. In the illustrated embodiment, the exemplary GraveTime App camera lobby 2230 screen includes the camera status indicator 2305 indicating the status of the configured camera. In the depicted example, the camera settings menu button 2310 provides the user configuration access to settings for the user's cameras configured in the GraveTime App. In the illustrated example, the share camera button 2315 generates a dynamic link to the camera to be shared. In the depicted embodiment, the scrolling camera lobby 2320 presents three cameras configured in the GraveTime App, permitting the user to scroll down for access to each camera in the GraveTime App camera lobby 2230.

Figure 24:
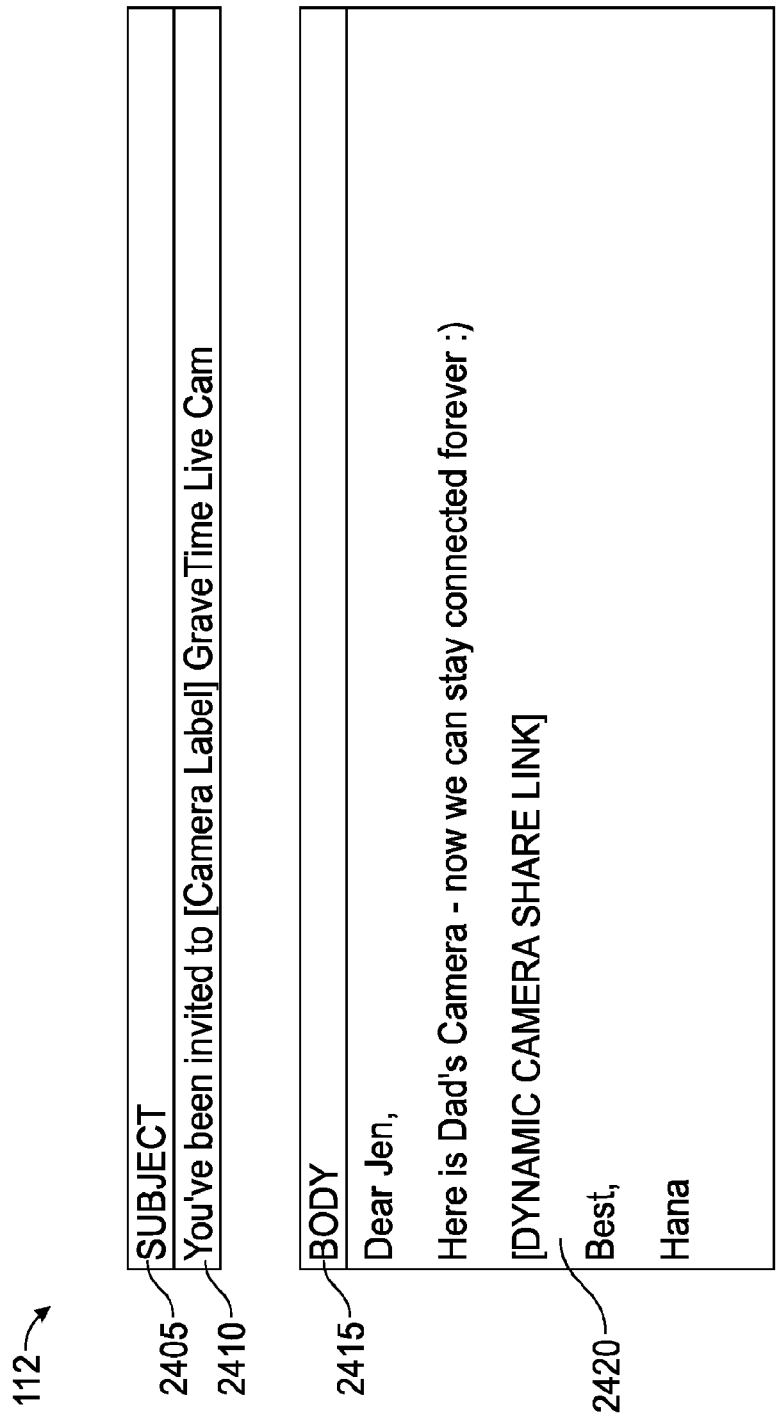
FIG. 24 depicts an exemplary graveside telepresence user interface displaying an exemplary camera text sharing feature, in accordance with various graveside telepresence embodiment designs.

FIG. 24 depicts an exemplary graveside telepresence user interface displaying an exemplary camera text sharing feature, in accordance with various graveside telepresence embodiment designs. In FIG. 24, the exemplary GraveTime App configured in the exemplary user interface 112 includes the depicted camera text sharing template configured to facilitate sharing a camera dynamic link created by the share camera button 2315, depicted in FIG. 23. The depicted exemplary camera text sharing template includes the subject 2405 and camera sharing invitation 2410. In the depicted example, the invitation body 2415 includes the user-customized message, and the dynamic camera share link 2420.

Figure 25A:
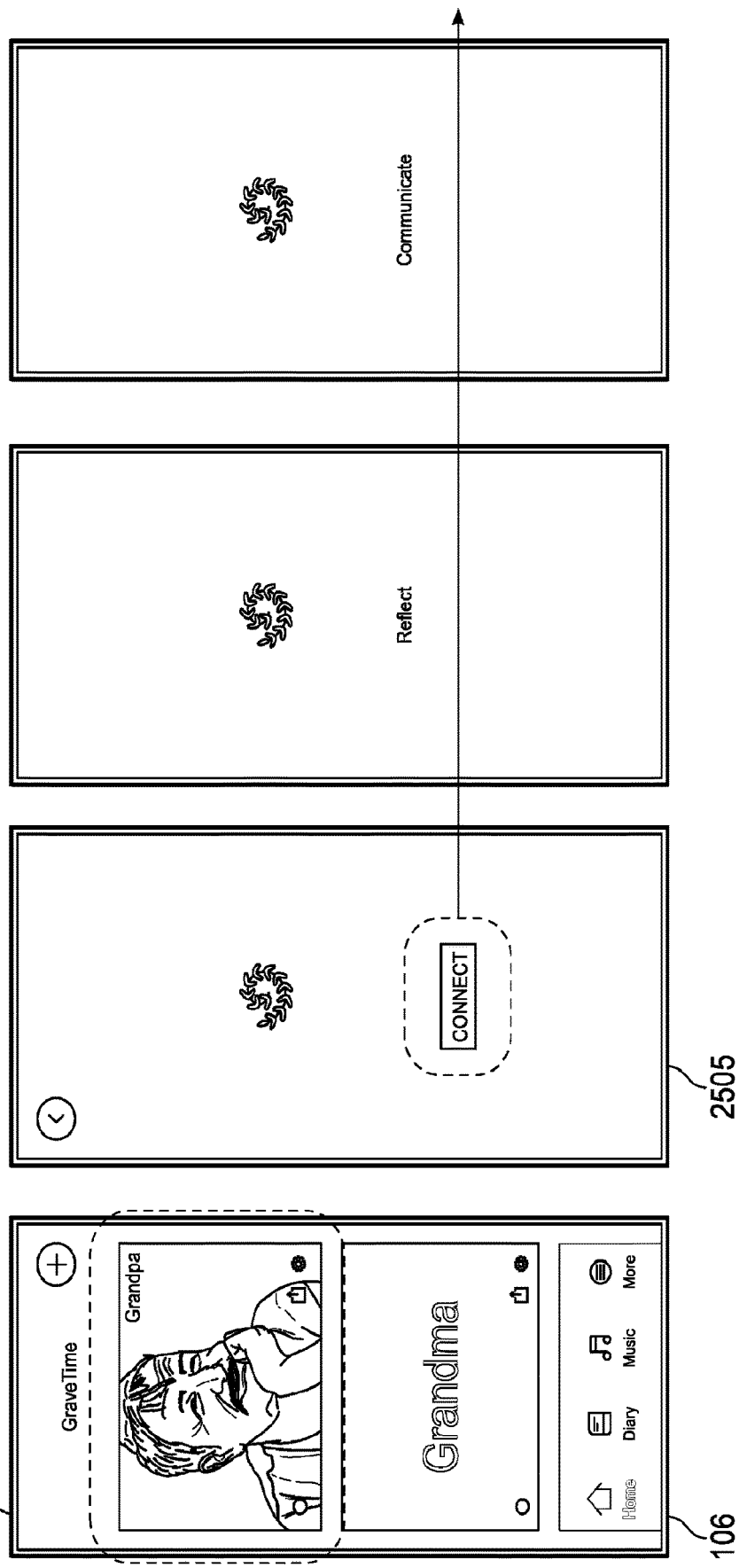
FIGS. 25A-25B together depict an exemplary graveside telepresence user interface in an illustrative camera connection scenario, in accordance with various graveside telepresence embodiment designs.
Figure 25B:
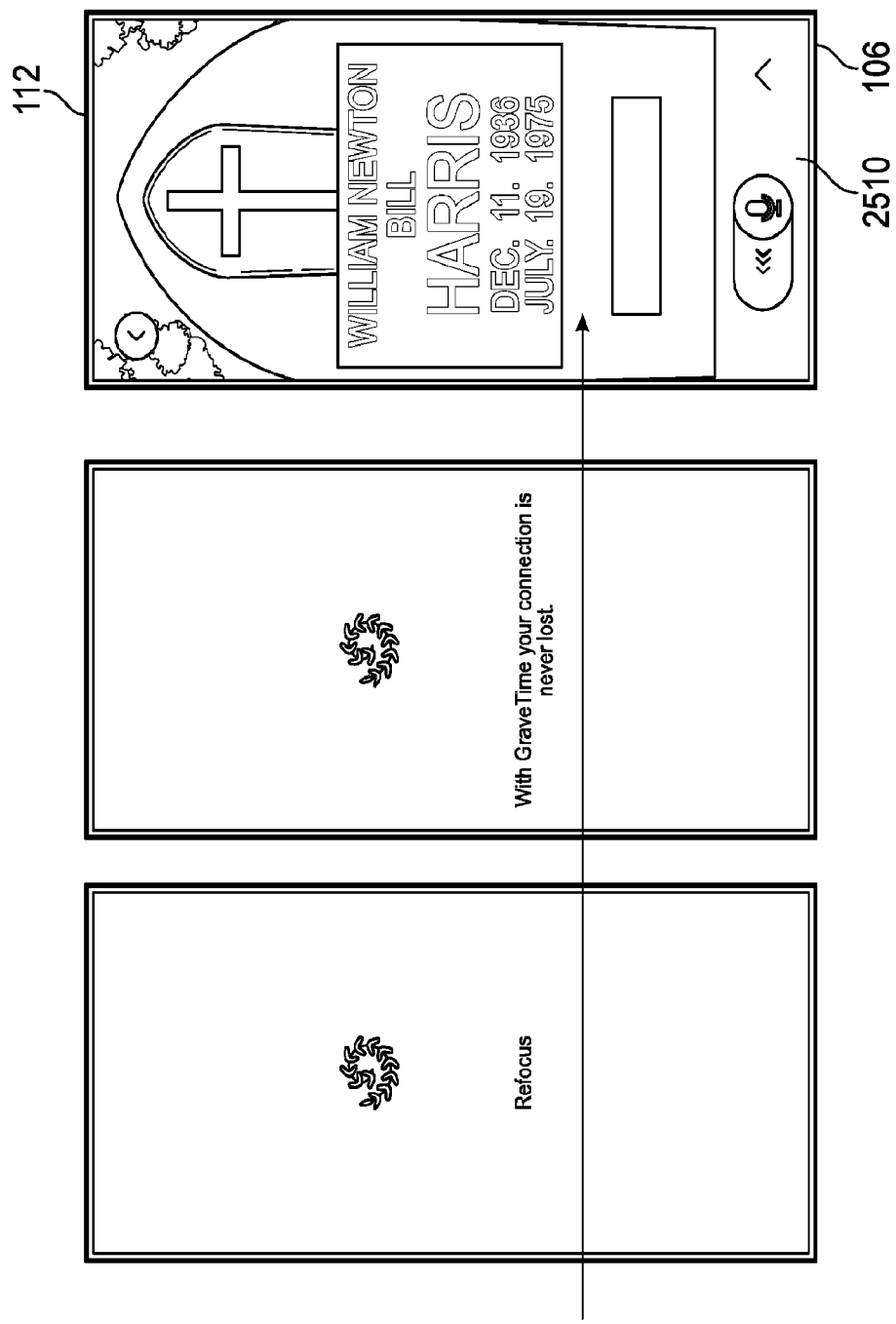

FIGS. 25A-25B together depict an exemplary graveside telepresence user interface in an illustrative camera connection scenario, in accordance with various graveside telepresence embodiment designs. In FIG. 25A, the exemplary GraveTime App configured in the exemplary user interface 112 includes the camera connection dialog 2505. In the illustrated example, the animated spinning logo loading icon presents a series of words in an alternating fade-in/fade-out display during the user-initiated camera connection process. In the depicted example, each word is randomly chosen from a list. In various examples, the list of words to be presented may be customized by a user. In some examples, the list of words to be presented may be predetermined. In various designs, the words may be presented in a customized order, or with customized timing for display of specific words, or customized delay time between specific words. In FIG. 25B, the exemplary GraveTime App configured in the exemplary user interface 112 includes the snapshot image display 2510. In the depicted embodiment, after connecting to the camera, the camera takes a snapshot image, and displays the snapshot as the snapshot image display 2510 until a live video session is available for presentation to the user in the GraveTime App. Various examples may advantageously conserve data and battery usage as a result of presenting the snapshot image display to the user until a live video session is available.

Figure 26:
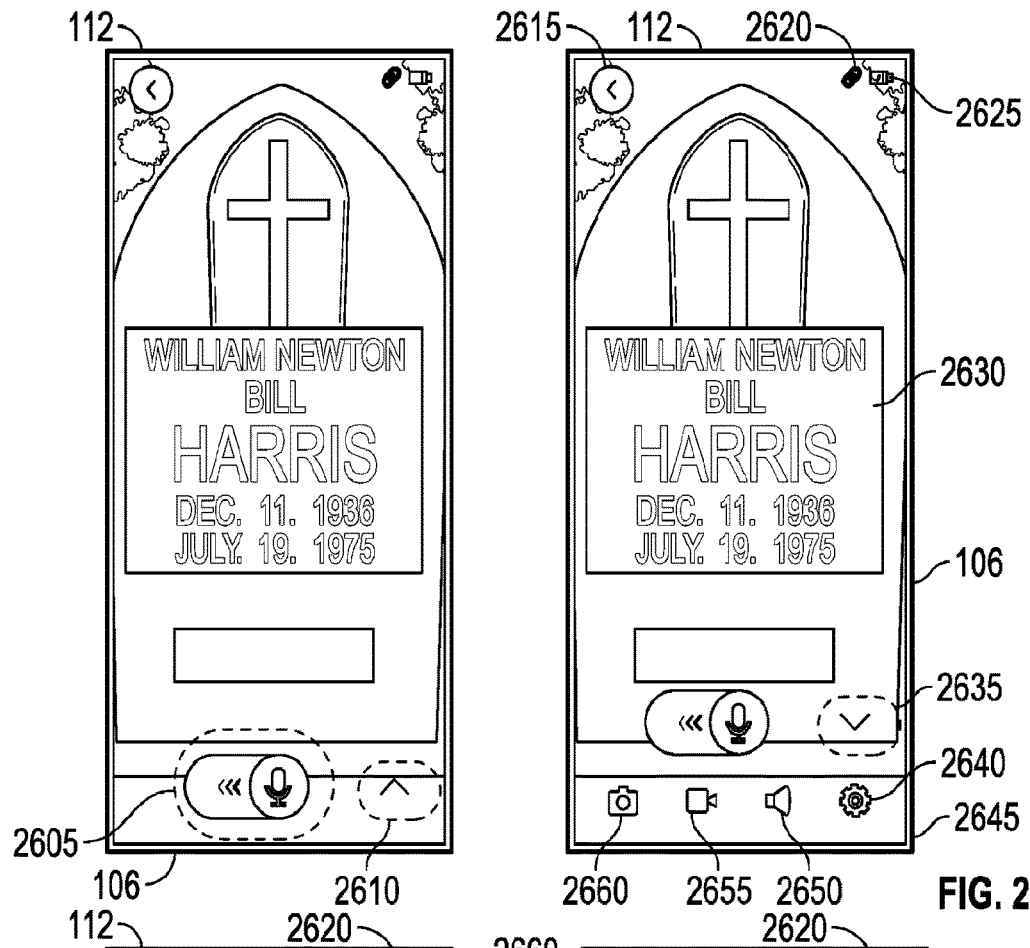
FIG. 26 depicts an exemplary graveside telepresence user interface displaying an exemplary live screen feature, in accordance with various graveside telepresence embodiment designs.

FIG. 26 depicts an exemplary graveside telepresence user interface displaying an exemplary live screen feature, in accordance with various graveside telepresence embodiment designs. In FIG. 26, the exemplary GraveTime App live screen features configured in the exemplary mobile device 106 user interface 112 include the live button 2605 configured to activate and deactivate live display. In various examples, the live button 2605 may permit a user to switch the GraveTime App display between live and delayed or previously captured video from a memorial. In the illustrated example, the GraveTime App live screen features include the open tab 2610 configured to permit the user to open the live screen controls 2645. In the depicted embodiment, the GraveTime App live screen features include the back button 2615 configured to return the GraveTime App to the menu or screen last accessed by the user. In the illustrated embodiment, the GraveTime App live screen features include the live connection indicator 2620 displaying an exemplary disconnected indication. In the depicted example, the GraveTime App live screen features include the camera battery indicator 2625 configured to display the connected camera's battery charge level. In the illustrated embodiment, the GraveTime App live screen features include the live snapshot image display 2630 presented after connecting the camera. In the depicted embodiment, the GraveTime App live screen features include the close tab button 2635 configured to close the live screen controls 2645. In the illustrated example, the GraveTime App live screen features include the camera settings button 2640, providing the user access to detailed camera settings. In the depicted embodiment, the GraveTime App live screen features include the camera MIC toggle 2650 button configured to permit the user to switch between camera and MIC. In the illustrated example, the GraveTime App live screen features include the record video button 2655 enabling the user to record video on demand, and the snapshot button 2660 permitting the user to take a snapshot, using the connected camera.

Figure 27:
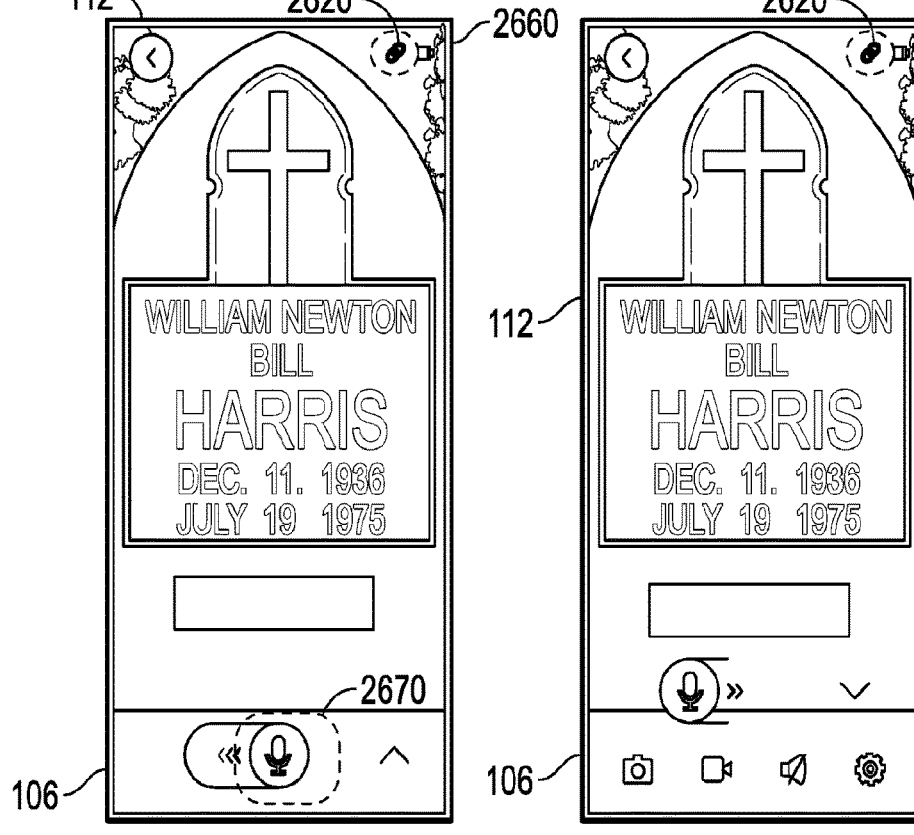
FIG. 27 depicts an exemplary graveside telepresence user interface displaying an exemplary live video feature, in accordance with various graveside telepresence embodiment designs.

FIG. 27 depicts an exemplary graveside telepresence user interface displaying an exemplary live video feature, in accordance with various graveside telepresence embodiment designs. In FIG. 27, the exemplary GraveTime App live video features configured in the exemplary mobile device 106 user interface 112 include the exemplary video mode button 2670 depicted in an illustrative live configuration. In the depicted embodiment, a user may press and hold the video mode button 2670 for live video. In an illustrative example, upon the user's release of the video mode button 2670, the live video stops. In the illustrated example, the GraveTime App live video features include the live connection indicator 2620 displaying an exemplary disconnected indication. In an illustrative example, when connected and showing live video, the live connection indicator 2620 may show the exemplary connected indication 2665. In some examples, the connected indication 2665 displayed by the live connection indicator 2620 may include a connected icon. In some implementations, when disconnected, a disconnected icon may be shown on the live connection indicator 2620. In some designs, the live connection indicator 2620 may display an indication of graveside telepresence status, as described with reference to FIGS. 1, and FIGS. 40-43. In some embodiments, the live connection indicator 2620 may display continuous indication of the status of the user's physical interaction with a memorial remote from the user, as described with reference to FIGS. 1, and FIGS. 40-43.

Figure 28:
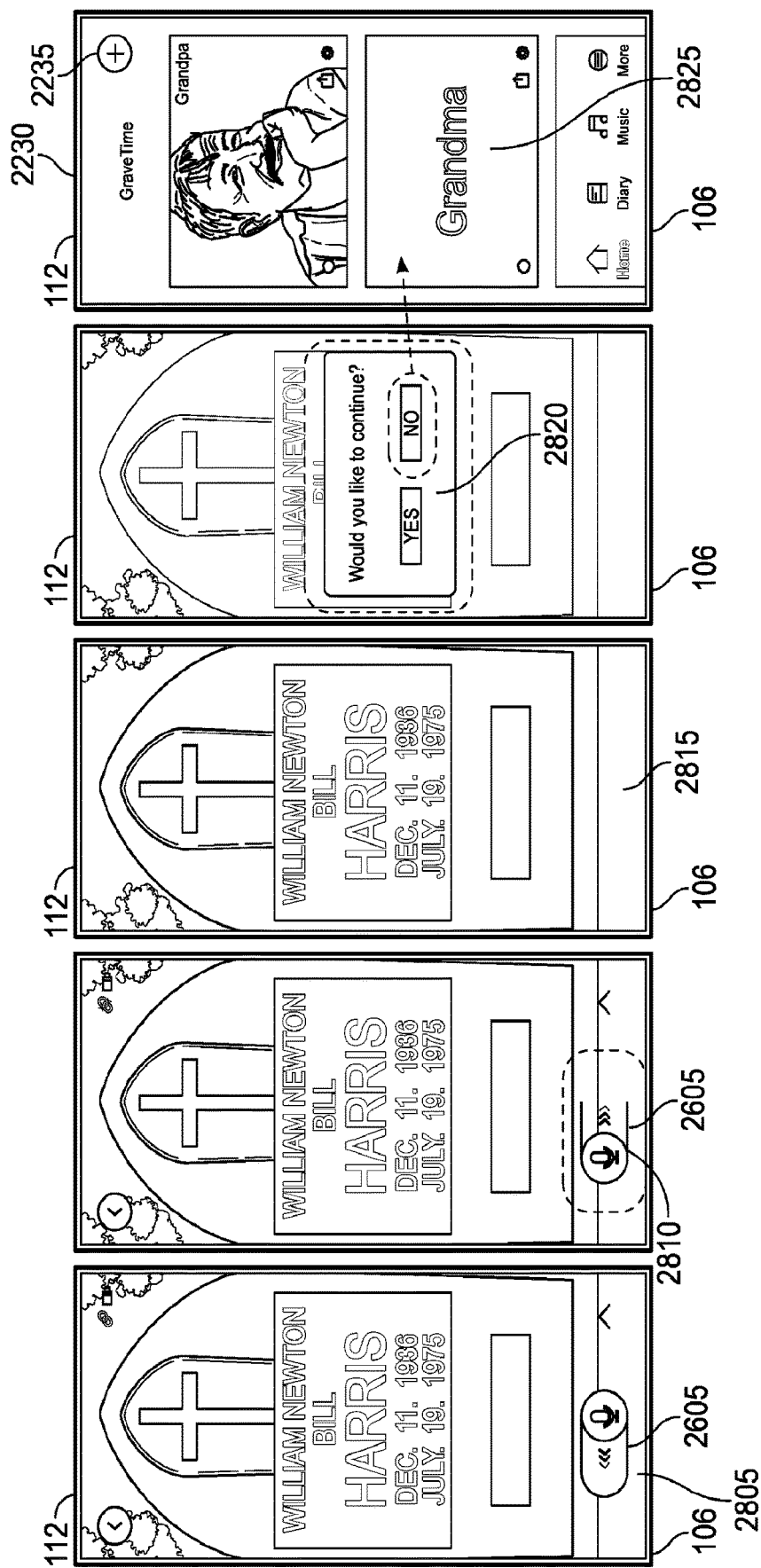
FIG. 28 depicts an exemplary graveside telepresence user interface in an illustrative five minute live video lock scenario, in accordance with various graveside telepresence embodiment designs.

FIG. 28 depicts an exemplary graveside telepresence user interface in an illustrative five-minute live video lock scenario, in accordance with various graveside telepresence embodiment designs. In FIG. 28, the exemplary GraveTime App configured in the exemplary mobile device 106 user interface 112 includes the live video lock button 2805 configured to lock video in live display mode for a predetermined five-minute time period. In some examples, the live video lock button 2805 may be configured to lock video in live display mode for a period of time configurable by a user. In the illustrated example, the GraveTime App live video features include the live button 2605 configured in an illustrative live video mode, with the live video lock button 2805 in an exemplary locked live video mode 2810. In the illustrated example, the user slides the live video lock button 2805 to the left to activate the locked live video mode 2810 for five minutes. In an illustrative example, the user will not have to press and hold to view live video. In the illustrated embodiment, when the user moves the live button to the left, all other buttons disappear, revealing the live video display 2815. In an illustrative example, if the user taps the screen, the buttons reappear. In the depicted embodiment, the alert window 2820 opens after five minutes, and the user may select to continue for another five minutes, or select not to continue. In the illustrated example, if the user selects not to continue, or if the user does not respond for sixty seconds, the user is returned to the user camera display 2825 presented by the GraveTime App camera lobby 2230, depicted in FIG. 22.

Figure 29:
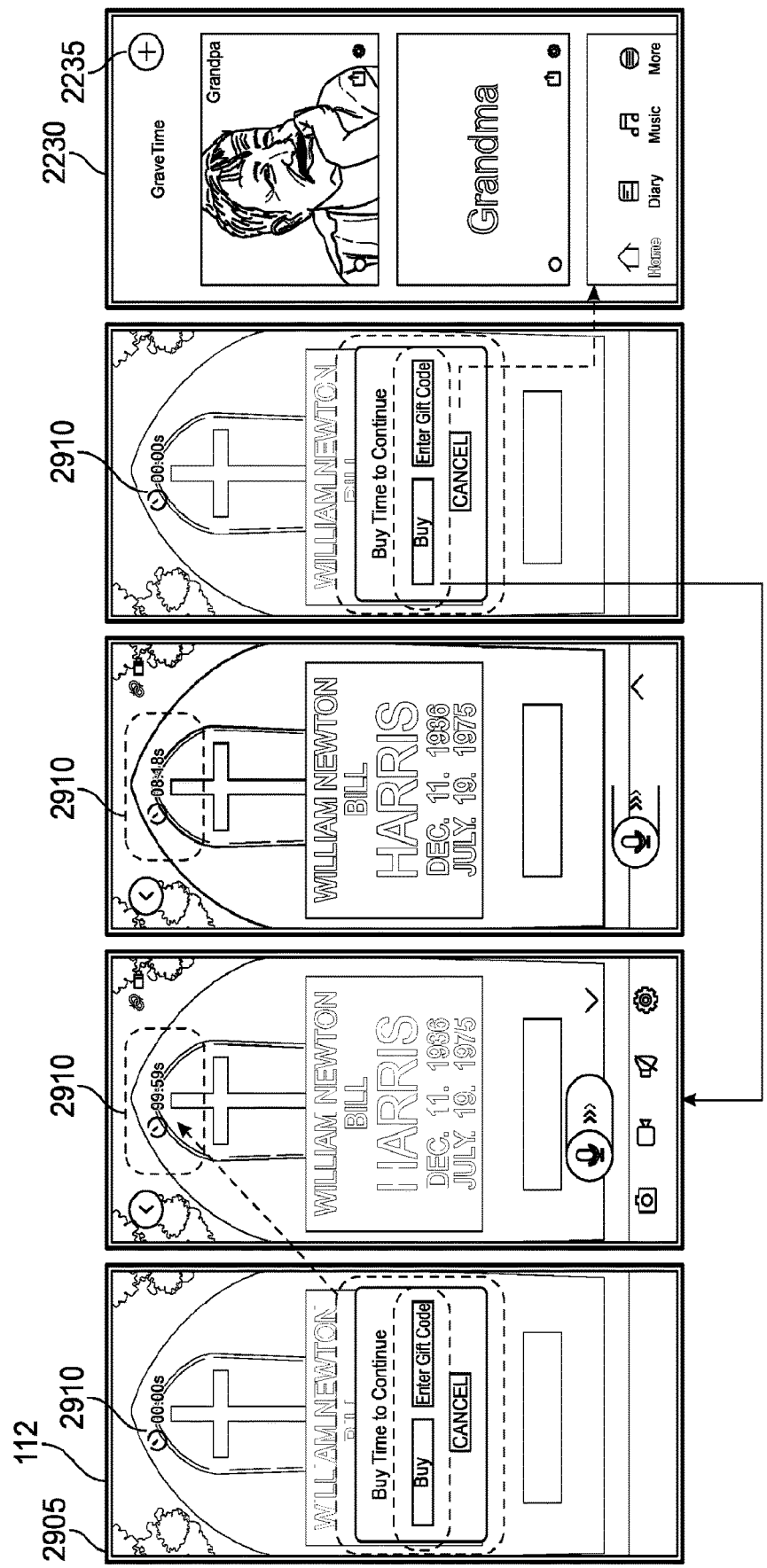
FIG. 29 depicts an exemplary graveside telepresence user interface in an illustrative additional time purchase scenario, in accordance with various graveside telepresence embodiment designs.

FIG. 29 depicts an exemplary graveside telepresence user interface in an illustrative additional time purchase scenario, in accordance with various graveside telepresence embodiment designs. In FIG. 29, the exemplary GraveTime App configured in the exemplary user interface 112 includes the illustrative additional time purchase dialog 2905. In an illustrative example, if a user is on the peace of mind plan, or if the user's camera is set to public, users will be able to purchase time blocks through the additional time purchase dialog 2905. In the illustrated embodiment, the additional time purchase dialog 2905 implemented in the user interface 112 includes the countdown display 2910 indicating the remaining live time. In the illustrated embodiment, if the user selects to buy time or enter a gift code, the GraveTime App connects the user to their camera for the additional time purchased, otherwise, the user is returned to the GraveTime App camera lobby 2230. In the depicted embodiment, the camera add button 2235 is configured to permit the user to add a new camera to the GraveTime App camera lobby 2230.

Figure 30:
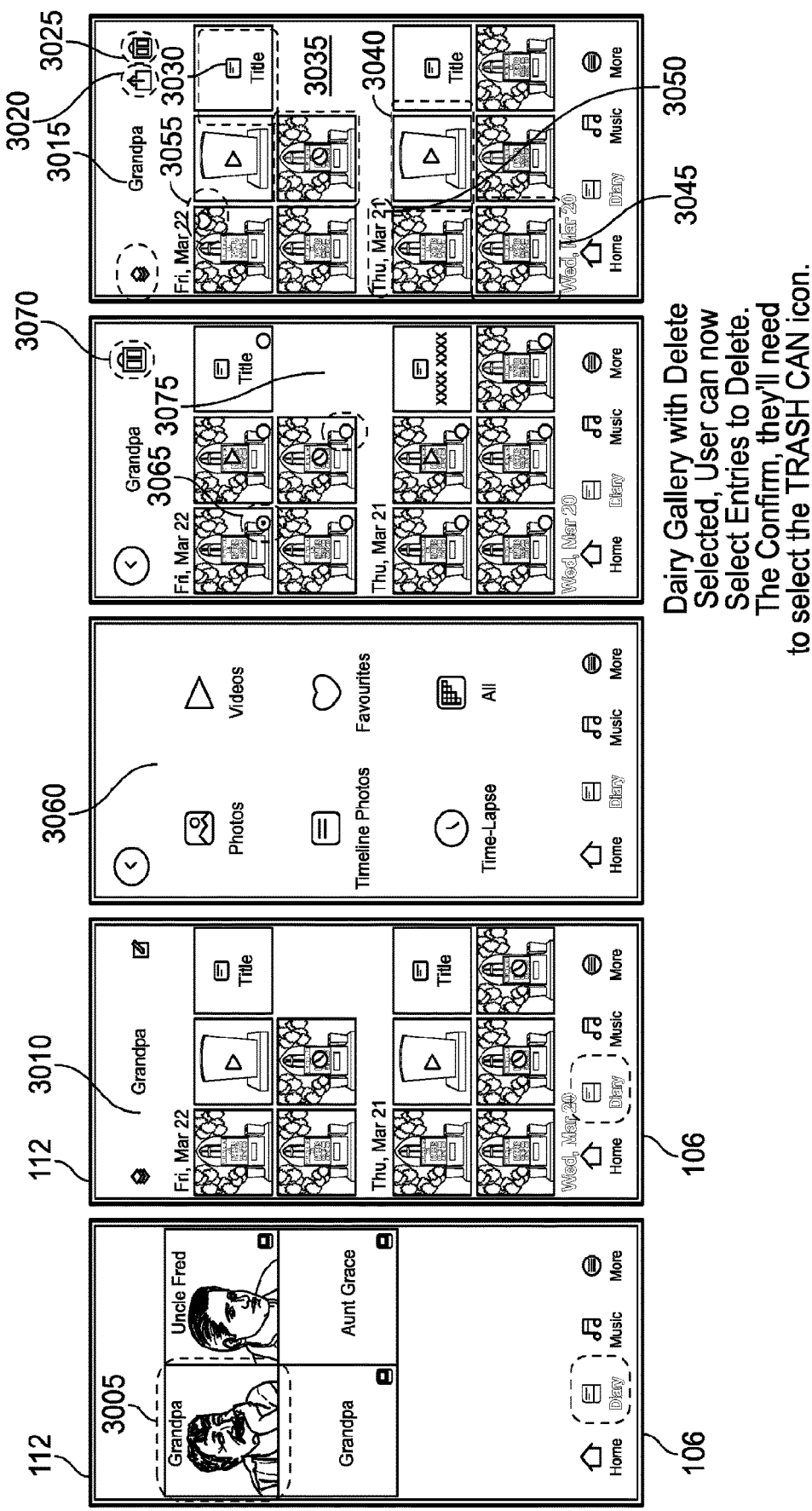
FIG. 30 depicts an exemplary graveside telepresence user interface displaying an exemplary diary section feature, in accordance with various graveside telepresence embodiment designs.

FIG. 30 depicts an exemplary graveside telepresence user interface displaying an exemplary diary section feature, in accordance with various graveside telepresence embodiment designs. In FIG. 30, the exemplary GraveTime App configured in the exemplary mobile device 106 user interface 112 includes the initial diary 3005 created for each camera when the camera is added by a user. In the illustrated embodiment, one or more diary entry 3010 may be included in the diary 3005. In the depicted example, each diary 3005 is associated to the camera diary name 3015 configured in the user's account. In the depicted embodiment, the exemplary camera diary section features include the add new text note entry button 3020 and the delete multiple entries button 3025, configured to permit the user's creation and management of the diary. In the illustrated example, the exemplary camera diary section includes the saved text note/transcription 3030, created by the user in the camera diary. In the depicted embodiment, the exemplary camera diary section includes the diary entry 3010 saved time-lapse video 3035 and the diary entry 3010 saved video 3040. In the illustrated example, the exemplary camera diary section includes the diary entry 3010 saved images 3045, 3050. In the depicted example, the exemplary camera diary section includes the save as favorite for filter button 3055 and the filter options screen 3060. In the illustrated example, the exemplary camera diary section includes the selected entries 3065. In the depicted example, the exemplary camera diary section includes the delete selected entries button 3070. In various examples, the user may be presented with a popup to confirm deletion. In the illustrated example, the unselected entries 3075 are not marked for deletion.

Figure 31:
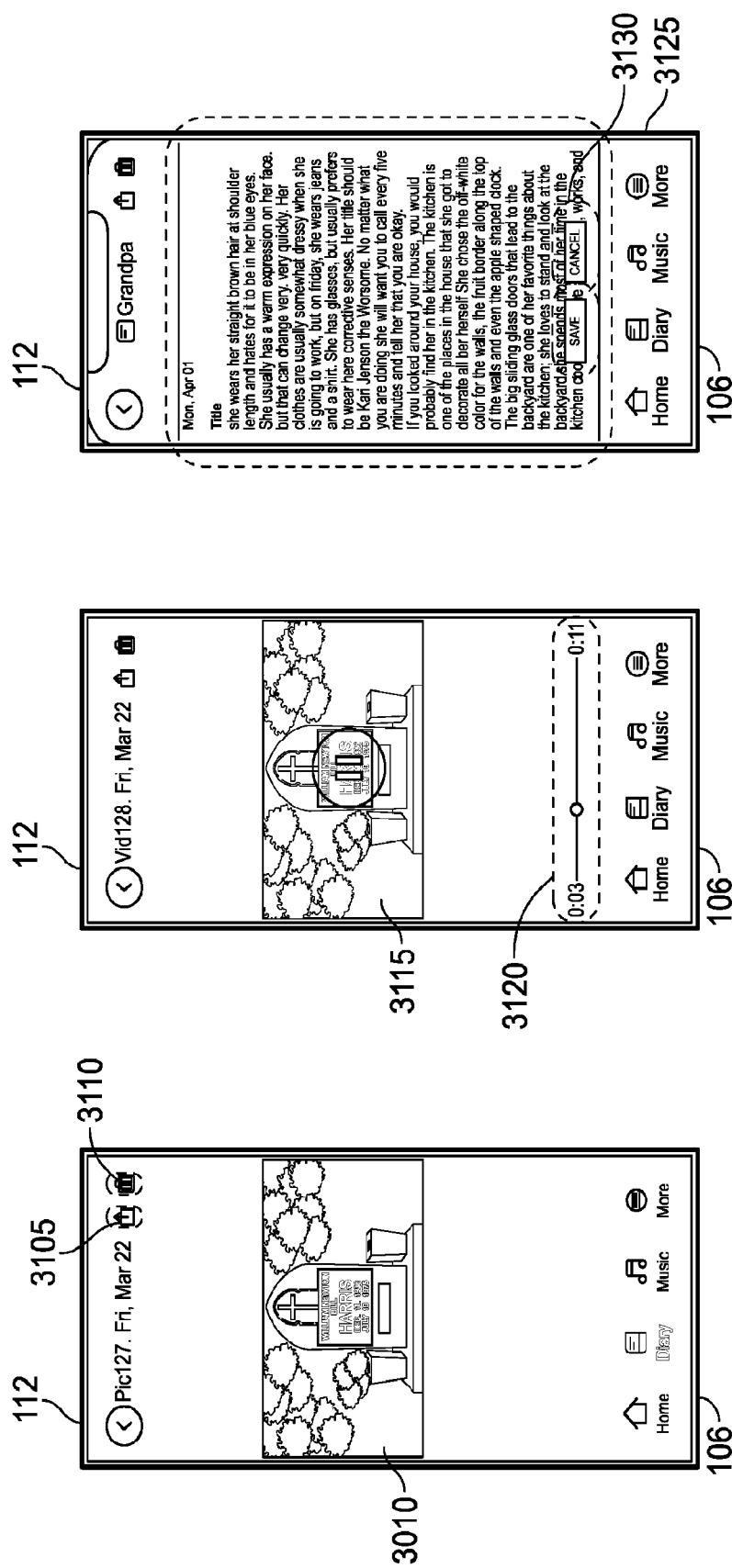
FIG. 31 depicts an exemplary graveside telepresence user interface in an illustrative diary entry scenario, in accordance with various graveside telepresence embodiment designs.

FIG. 31 depicts an exemplary graveside telepresence user interface in an illustrative diary entry scenario, in accordance with various graveside telepresence embodiment designs. In FIG. 31, the exemplary GraveTime App configured in the exemplary mobile device 106 user interface 112 includes the share by mail or text button 3105. In the illustrated example, the exemplary camera diary entry features include the delete entry button 3110. In various examples, activating the delete entry button 3110 may cause the GraveTime App to prompt the user to confirm diary entry 3010 deletion before continuing. In the depicted example, the exemplary camera diary entry features include the diary video control 3115 configured to play or pause video when tapped by the user. In the illustrated embodiment, the exemplary camera diary entry features include the video track 3120 configured to represent the playing time and remaining time position of the current video. In the illustrated example, the user may select the diary entry controls 3125 to save or cancel diary entry editing, or double tap the text editor panel 3130 to edit diary entry text or title.

Figure 32:
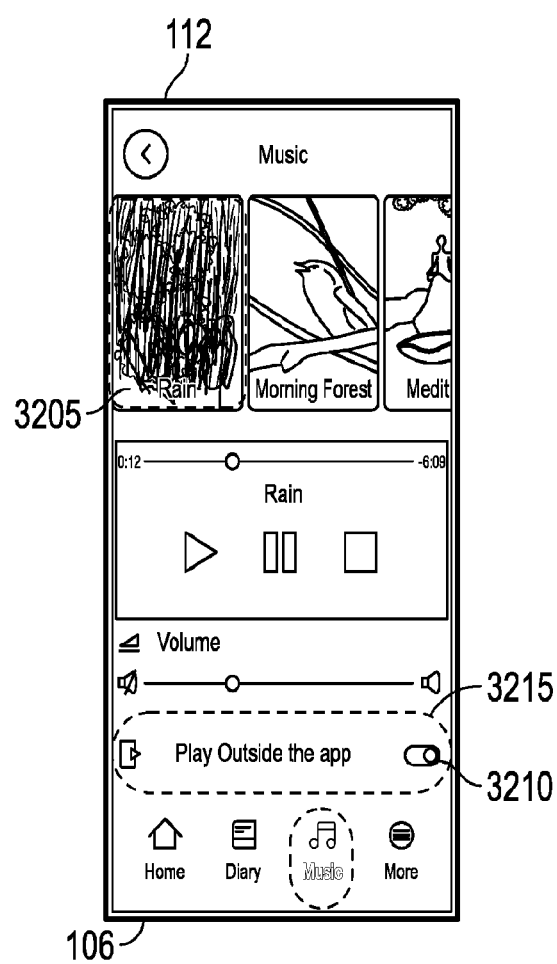
FIG. 32 depicts an exemplary graveside telepresence user interface displaying an exemplary meditation music section feature, in accordance with various graveside telepresence embodiment designs.

FIG. 32 depicts an exemplary graveside telepresence user interface displaying an exemplary meditation music section feature, in accordance with various graveside telepresence embodiment designs. In FIG. 32, the exemplary GraveTime App configured in the exemplary mobile device 106 user interface 112 includes the music selection 3205. In various examples, the GraveTime App may be preloaded with multiple songs. In the depicted example, the exemplary meditation music section features include the music mode selection button 3210. In an illustrative example, when the user navigates to the music section, the app will check for new music available, and the user may tap to select music to play from the available gallery. In various examples, the music may be streamed from a cloud server, or played from the user's device. In an illustrative example, if not downloaded to the user's device, the user may download before playing the music. In the illustrated example, the exemplary meditation music section features include the play outside app button 3215 depicted in an illustrative activated configuration. In an illustrative example, the exemplary GraveTime App may continue to play music when the GraveTime App is in the background, when the play outside app button 3215 is activated.

Figure 33A:
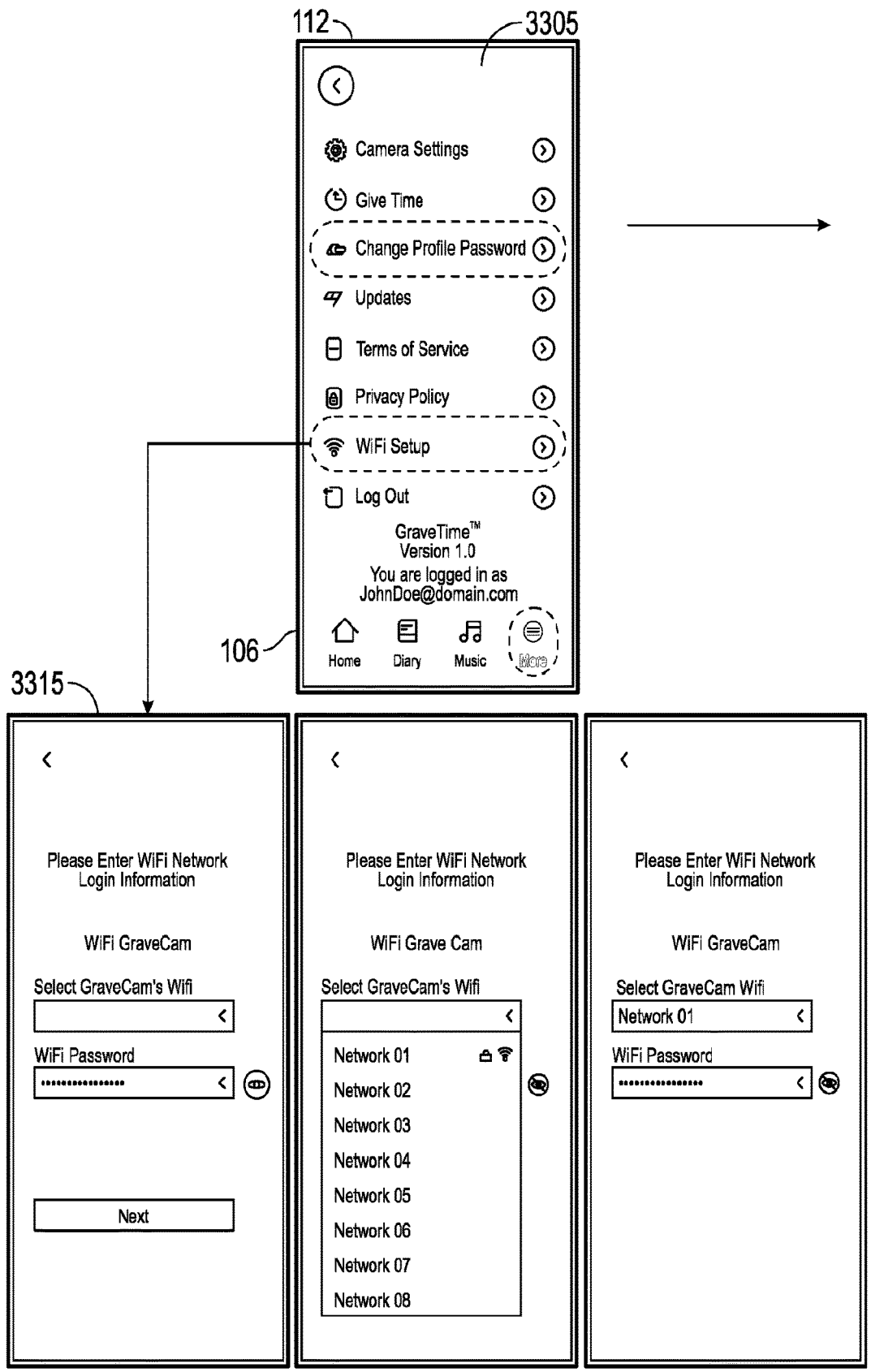
FIGS. 33A-33B together depict an exemplary graveside telepresence user interface displaying exemplary settings management features, in accordance with various graveside telepresence embodiment designs.
Figure 33B:
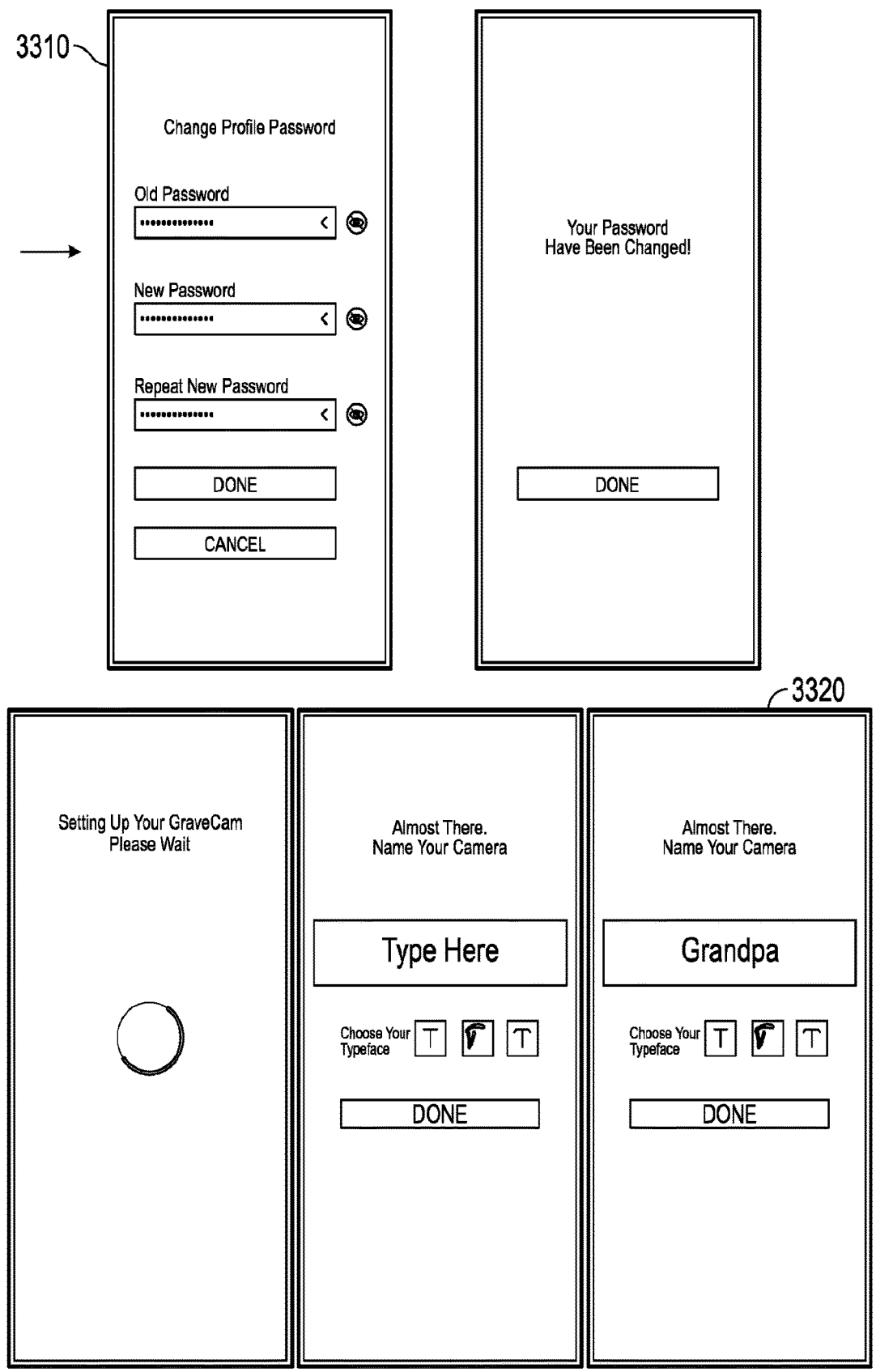

FIGS. 33A-33B together depict an exemplary graveside telepresence user interface displaying exemplary settings management features, in accordance with various graveside telepresence embodiment designs. In FIG. 33A, the exemplary GraveTime App configured in the exemplary mobile device 106 user interface 112 includes the main settings screen 3305. In the illustrated example, the exemplary settings management features include the WiFi setup screen 3315. In FIG. 33B, the illustrated settings management features include the change profile password screen 3310 and the camera name screen 3320.

Figure 34A:
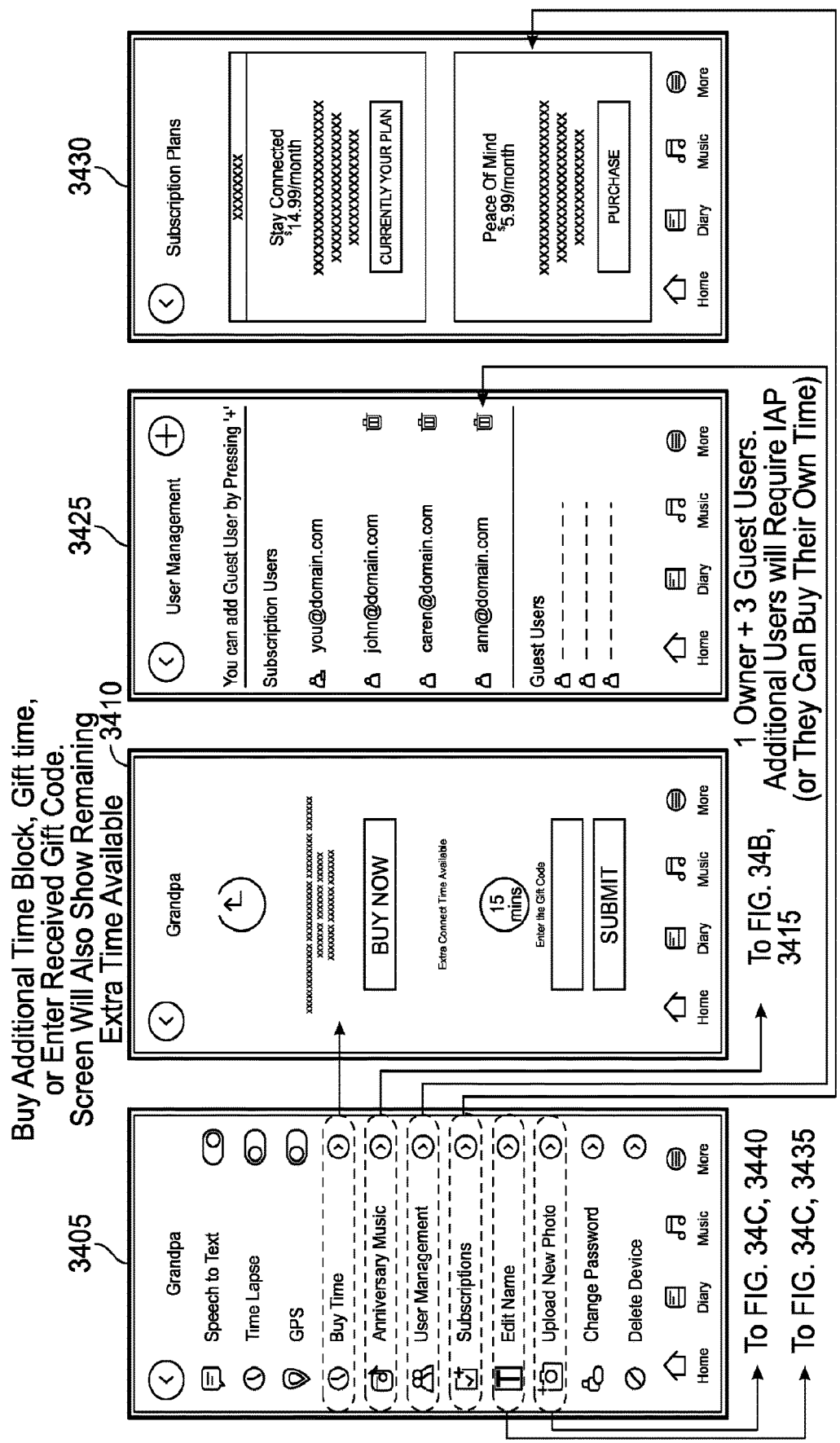
FIGS. 34A-34C together depict an exemplary graveside telepresence user interface displaying exemplary camera settings management features, in accordance with various graveside telepresence embodiment designs.
Figure 34B:
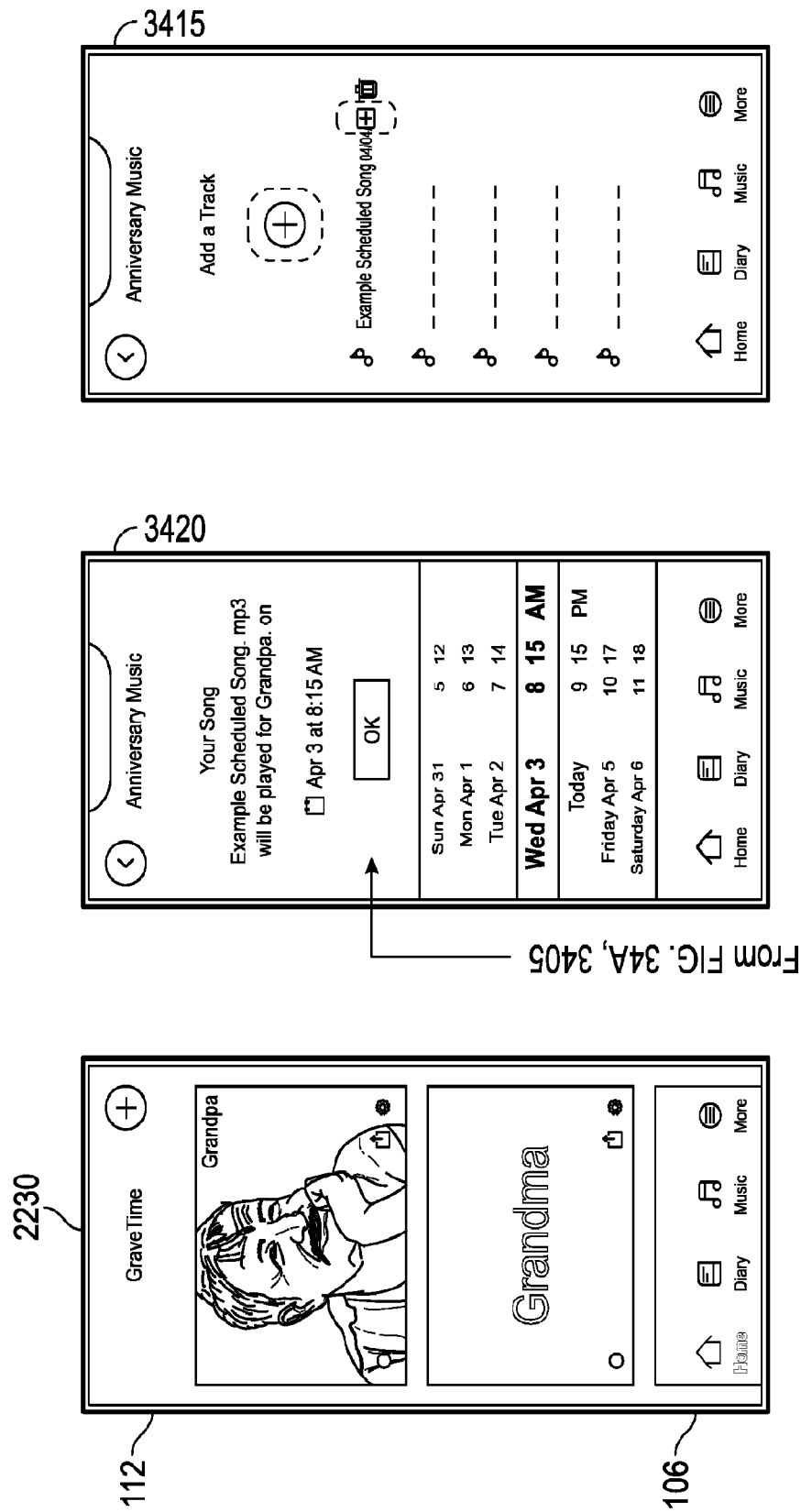
Figure 34C:
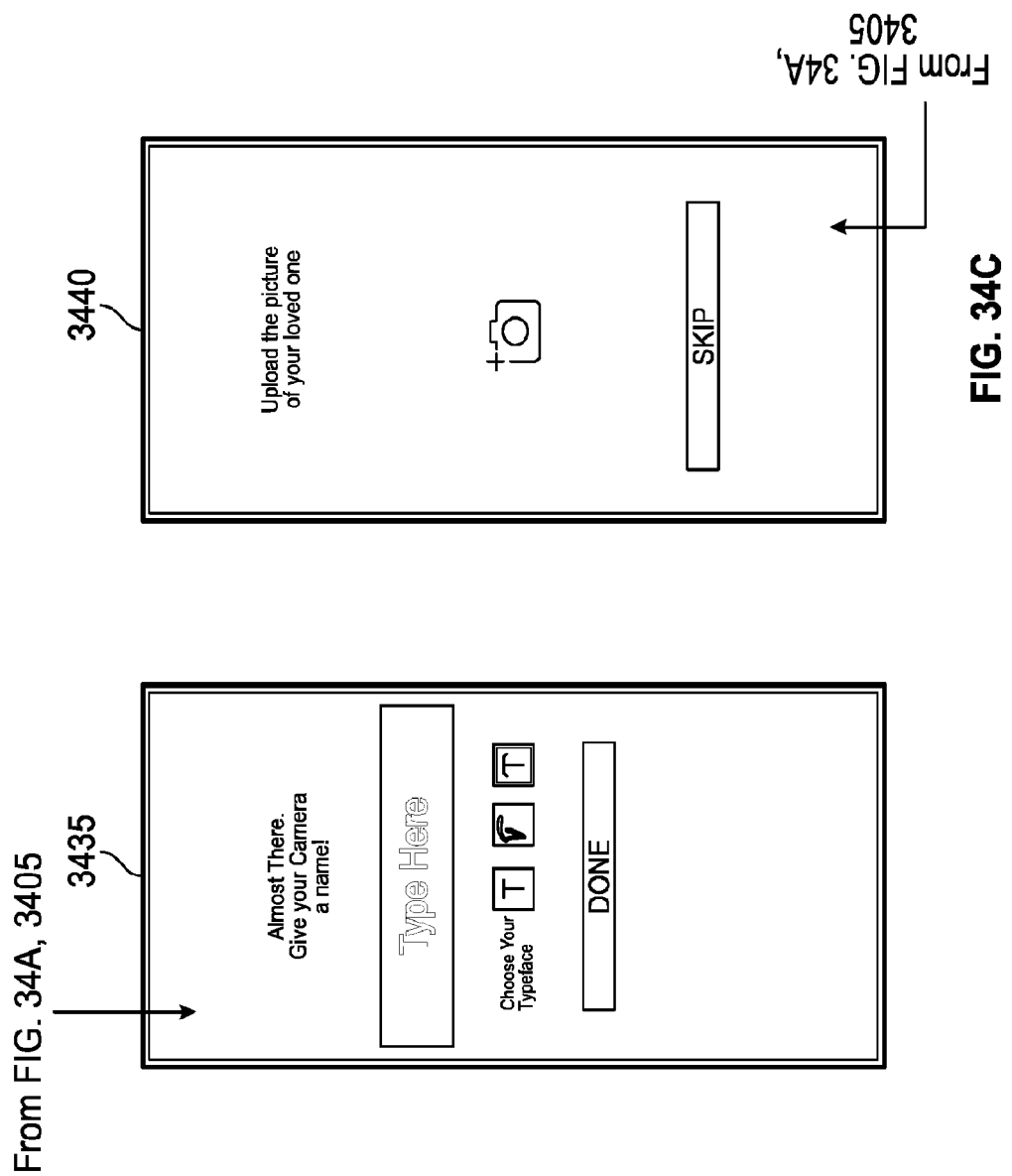

FIGS. 34A-34C together depict an exemplary graveside telepresence user interface displaying exemplary camera settings management features, in accordance with various graveside telepresence embodiment designs. In FIG. 34A, the exemplary GraveTime App configured in the exemplary user interface 112 includes the camera setting menu 3405. From the exemplary camera setting menu 3405, a user may access the purchase time screen 3410 to buy additional time blocks, purchase gift time, or buy a gift code. The purchase time screen 3410 may also show remaining time available. From the exemplary camera setting menu 3405, a user may access the user management screen 3425 and the subscription plans screen 3430. In FIG. 34B, the exemplary GraveTime App configured in the exemplary user interface 112 includes the anniversary music selection screen 3415 and the anniversary music schedule screen 3420, accessible from the camera setting menu 3405, depicted in FIG. 34A. In FIG. 34C, the exemplary GraveTime App configured in the exemplary user interface 112 includes the camera name screen 3435, photo upload screen 3440, and the photo edit screen, accessible from the camera setting menu 3405, depicted in FIG. 34A. The user may also switch to the camera lobby 2230, from the camera setting menu 3405, depicted in FIG. 34A.

FIG. 35 depicts the top level of an exemplary graveside telepresence administrative dashboard user interface flow map, in accordance with the exemplary administrative server 175 depicted by FIG. 1.

Figure 36A:
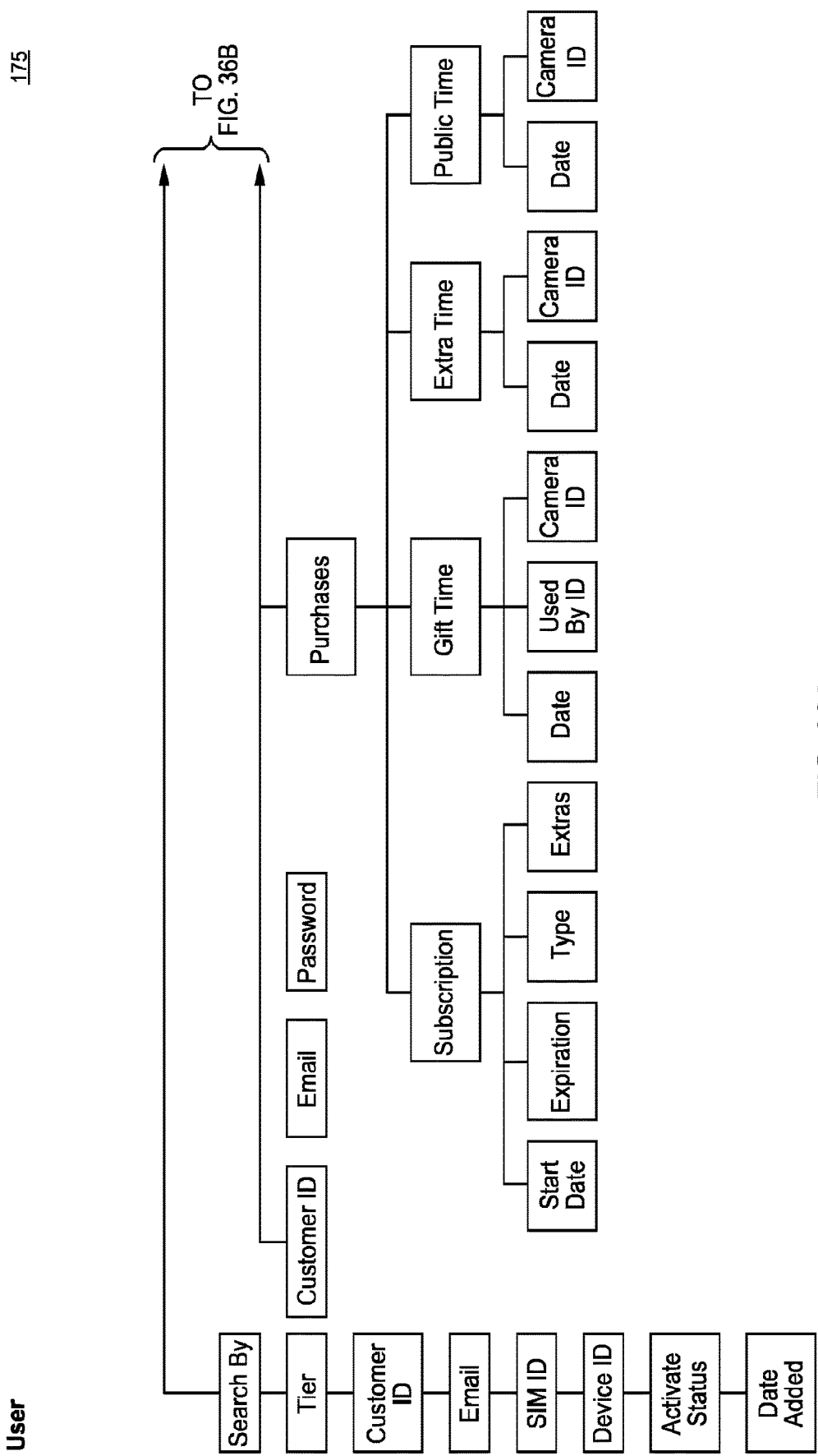
FIGS. 36A-36C together depict the User level of the exemplary graveside telepresence administrative dashboard flow map depicted by FIG. 35.
Figure 36B:
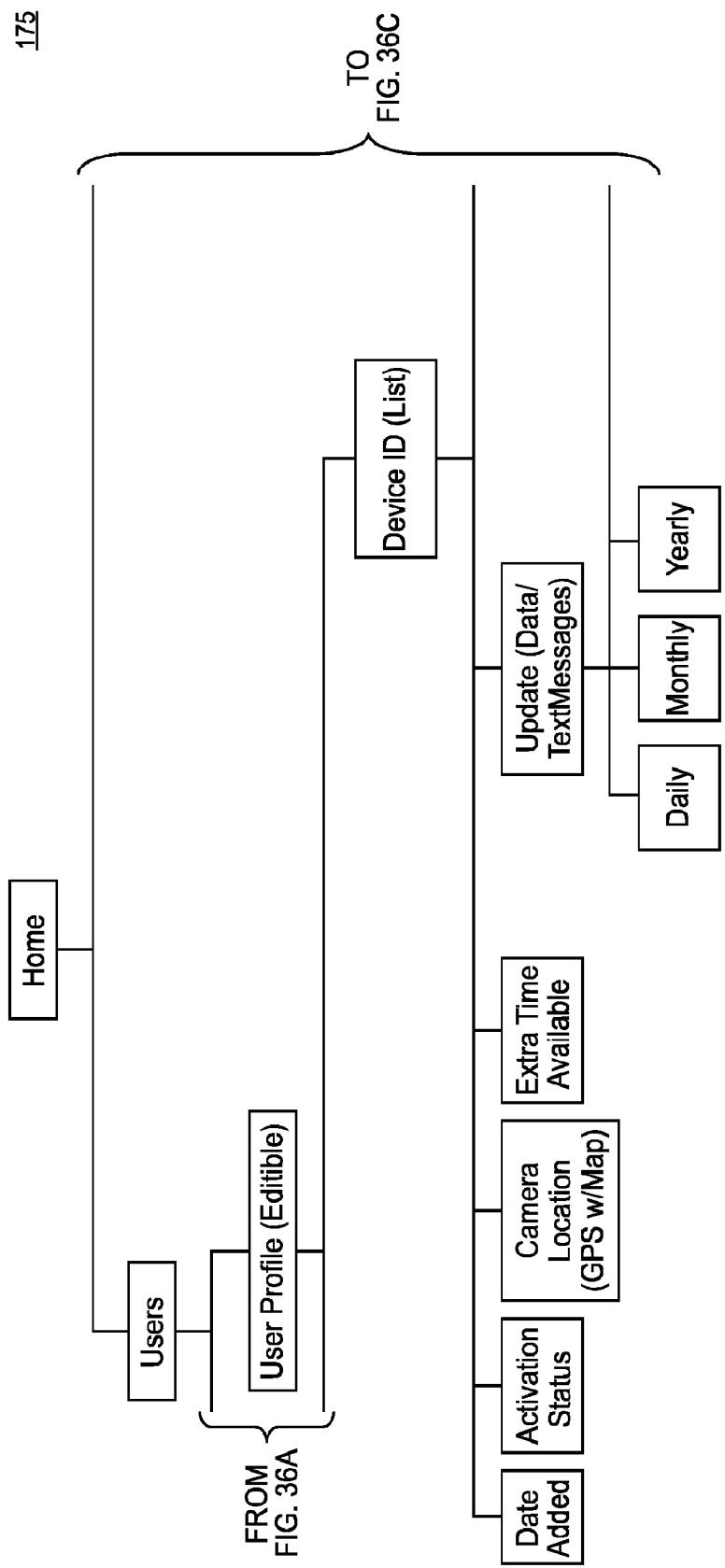
Figure 36C:
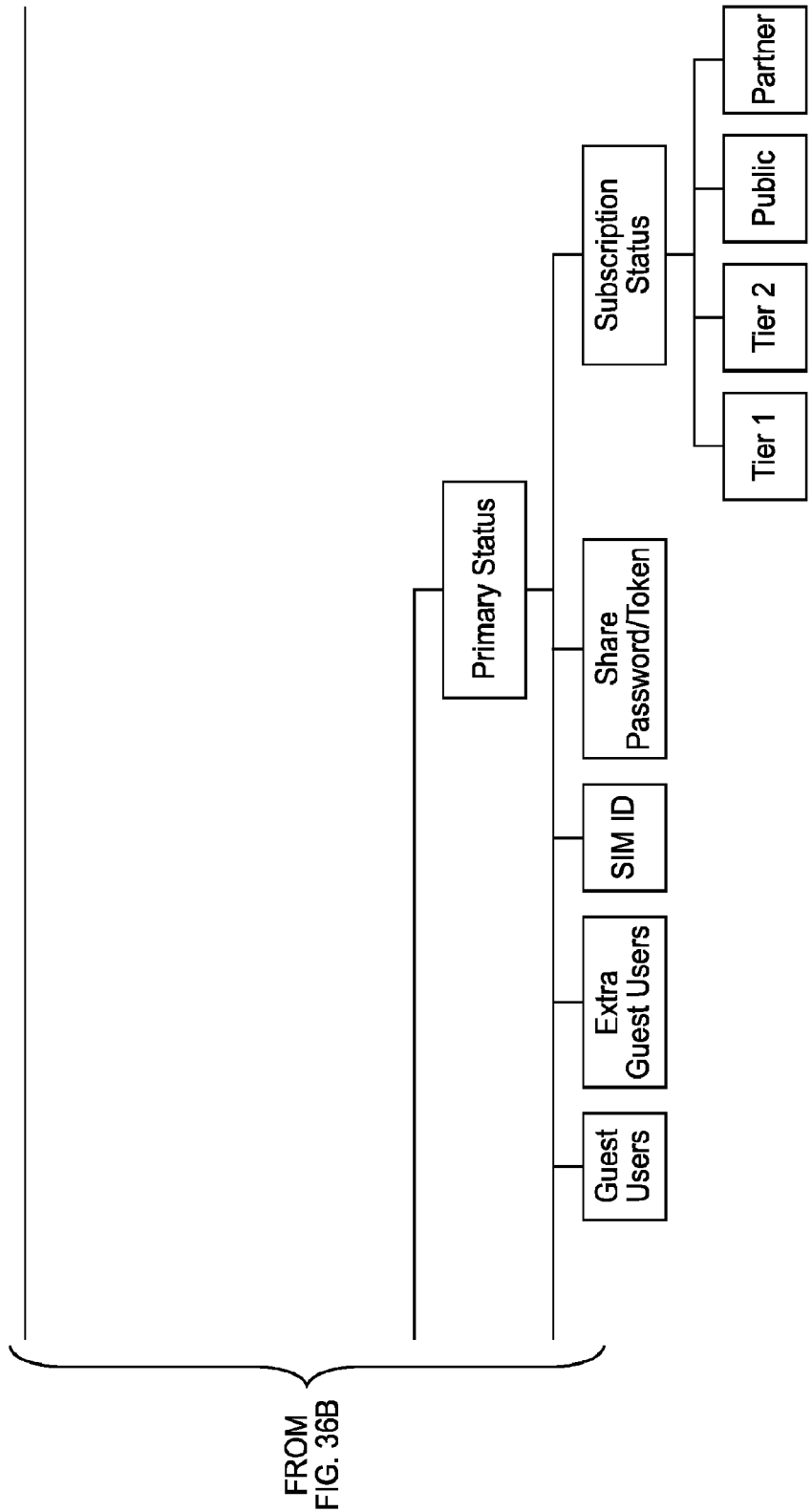

FIGS. 36A-36C together depict the User level of the exemplary graveside telepresence administrative dashboard flow map depicted by FIG. 35.

Figure 37A:
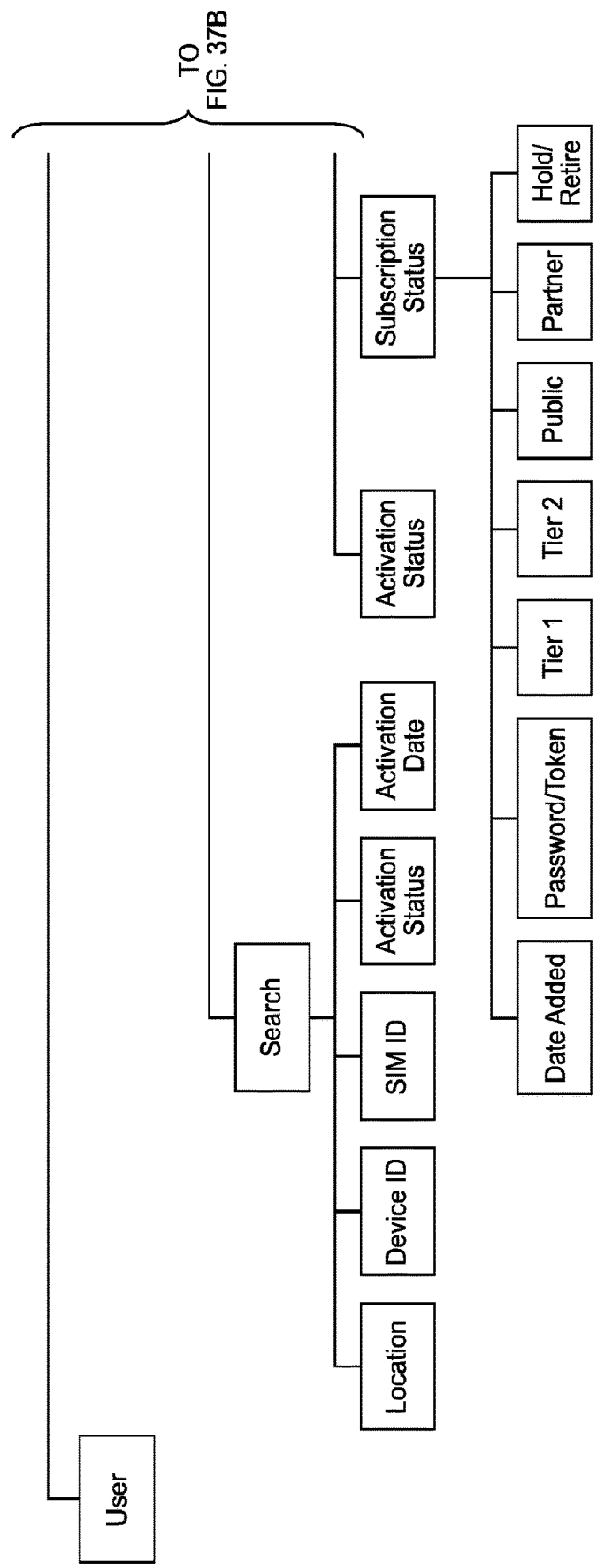
FIGS. 37A-37C together depict the Camera level of the exemplary graveside telepresence administrative dashboard flow map depicted by FIG. 35.
Figure 37B:
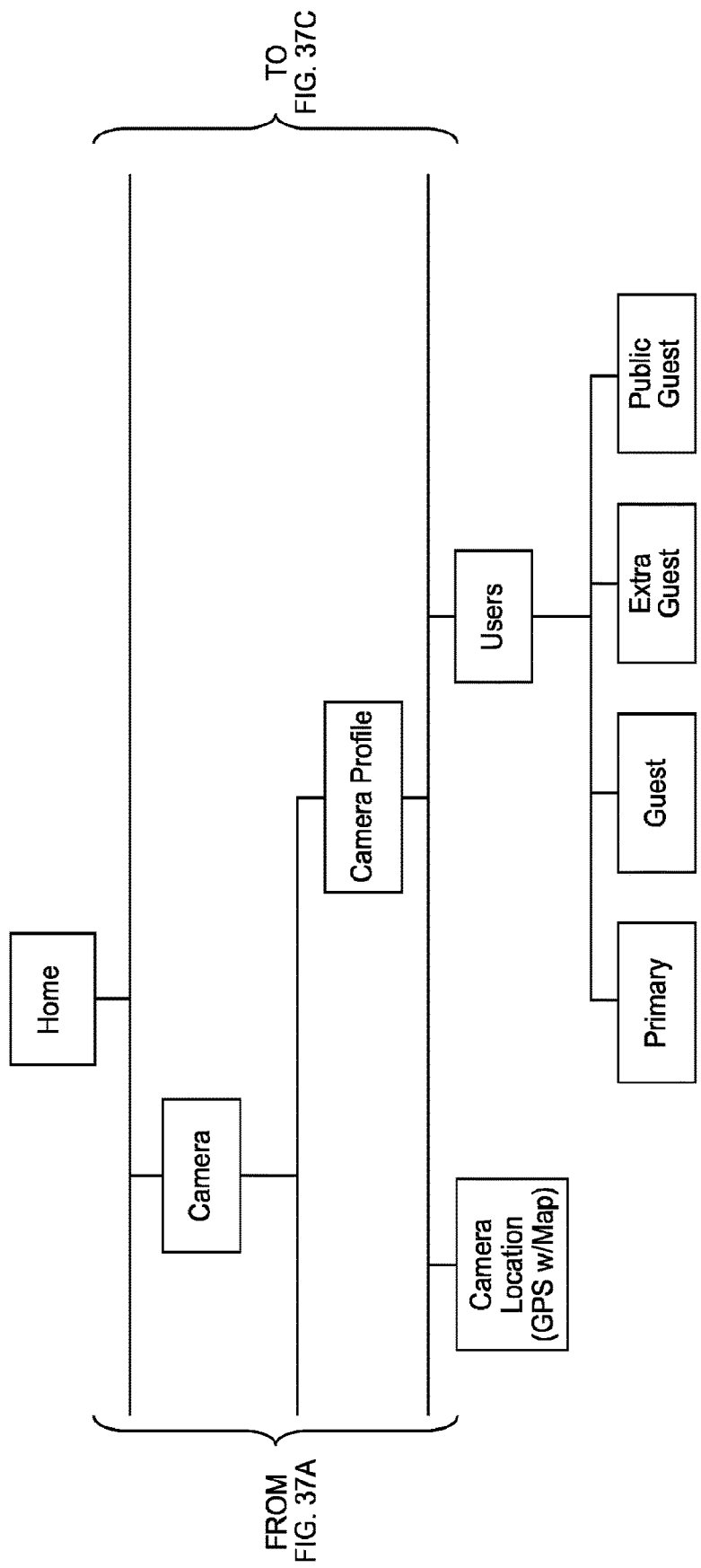
Figure 37C:
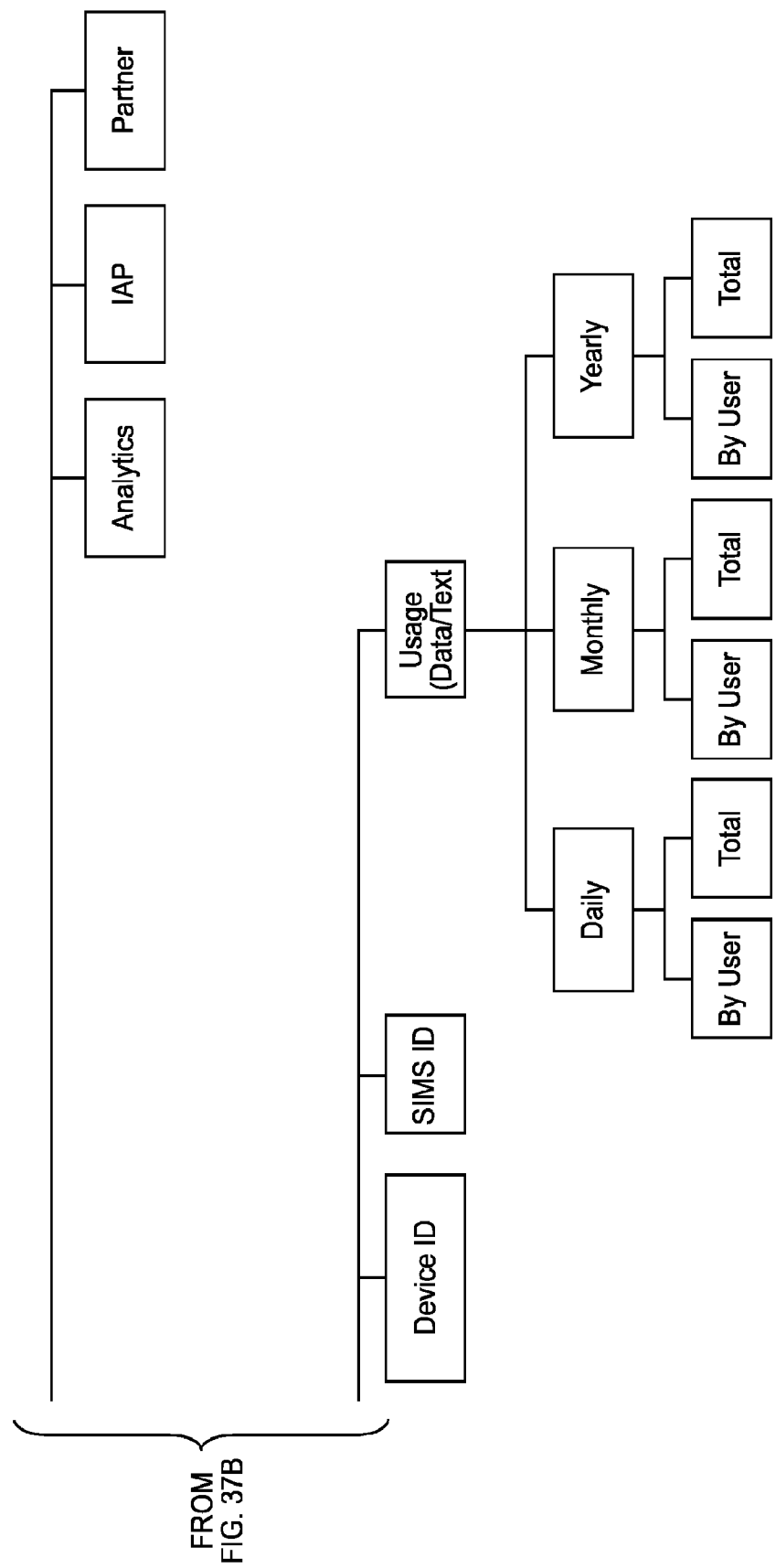

FIGS. 37A-37C together depict the Camera level of the exemplary graveside telepresence administrative dashboard flow map depicted by FIG. 35.

Figure 38A:
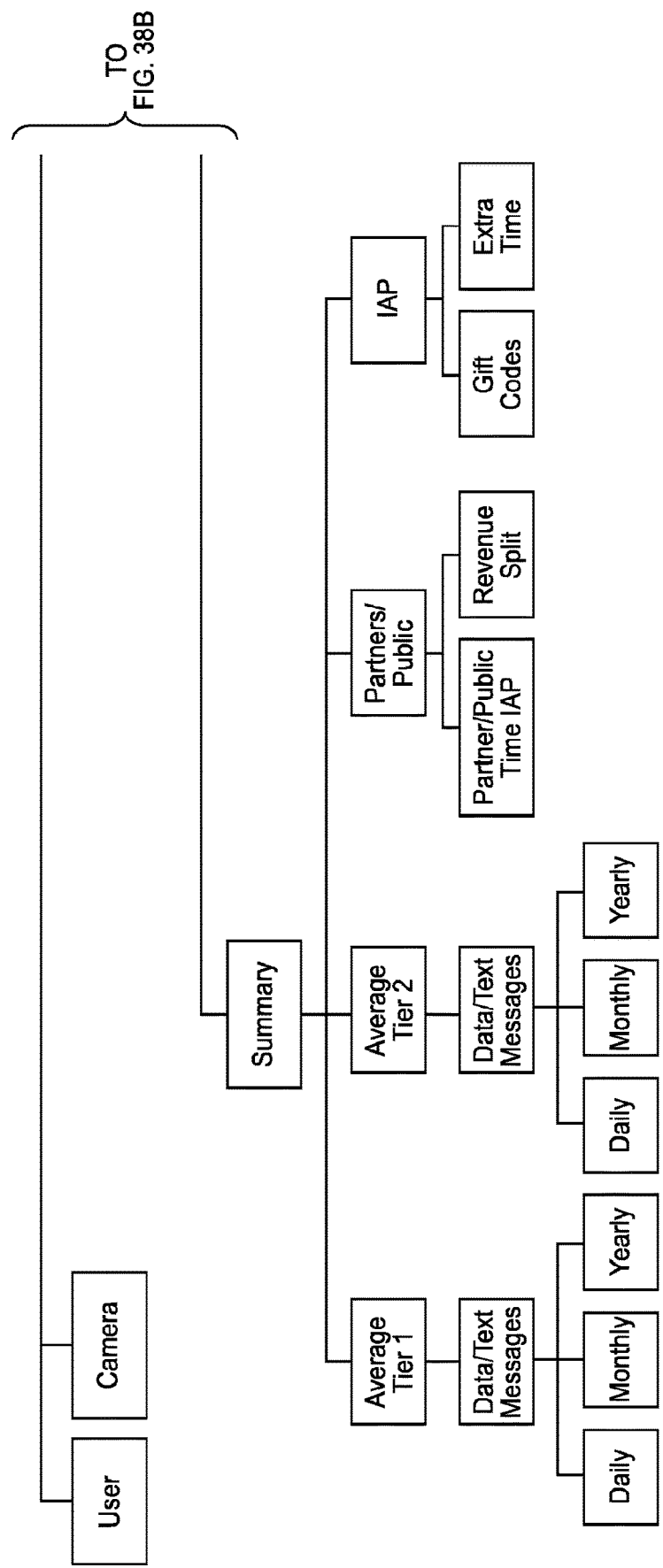
FIGS. 38A-38C together depict the Analytics level of the exemplary graveside telepresence administrative dashboard flow map depicted by FIG. 35.
Figure 38B:
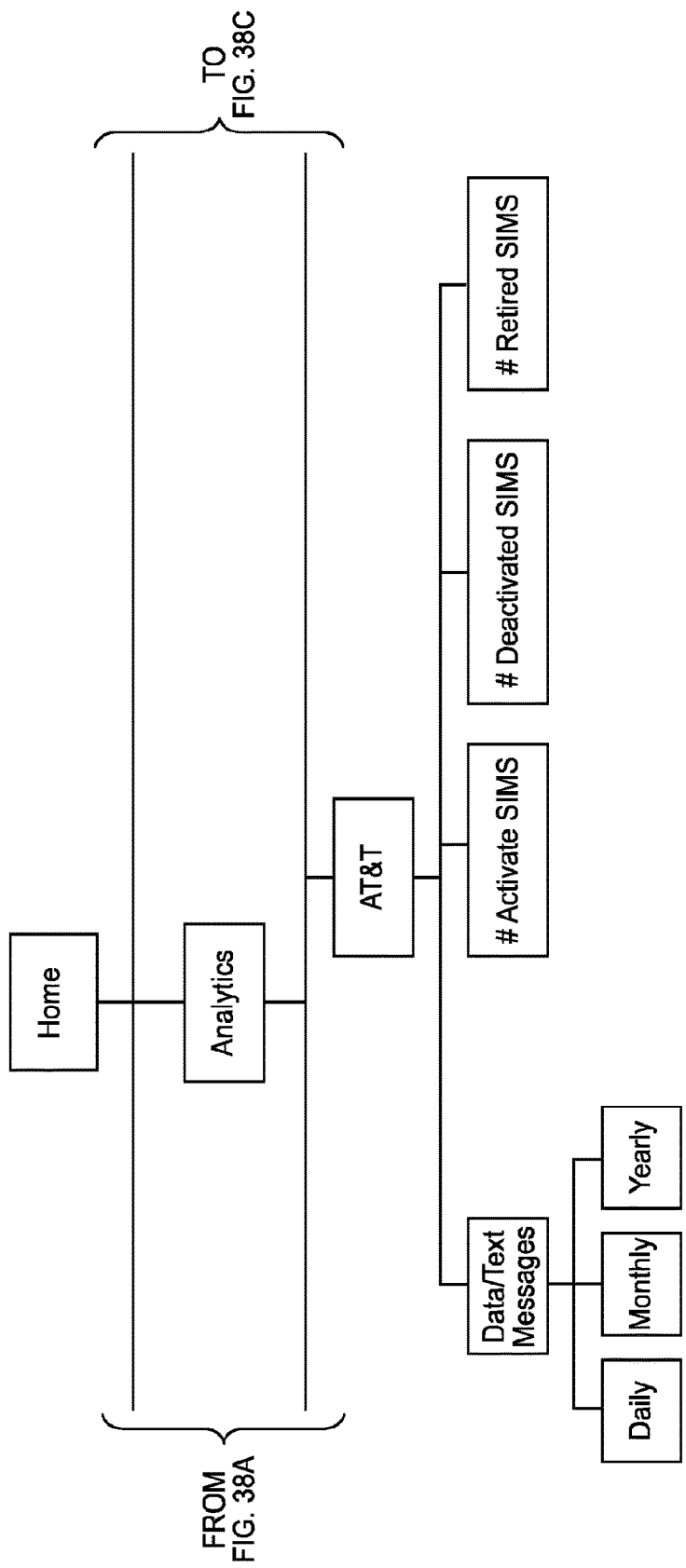
Figure 38C:
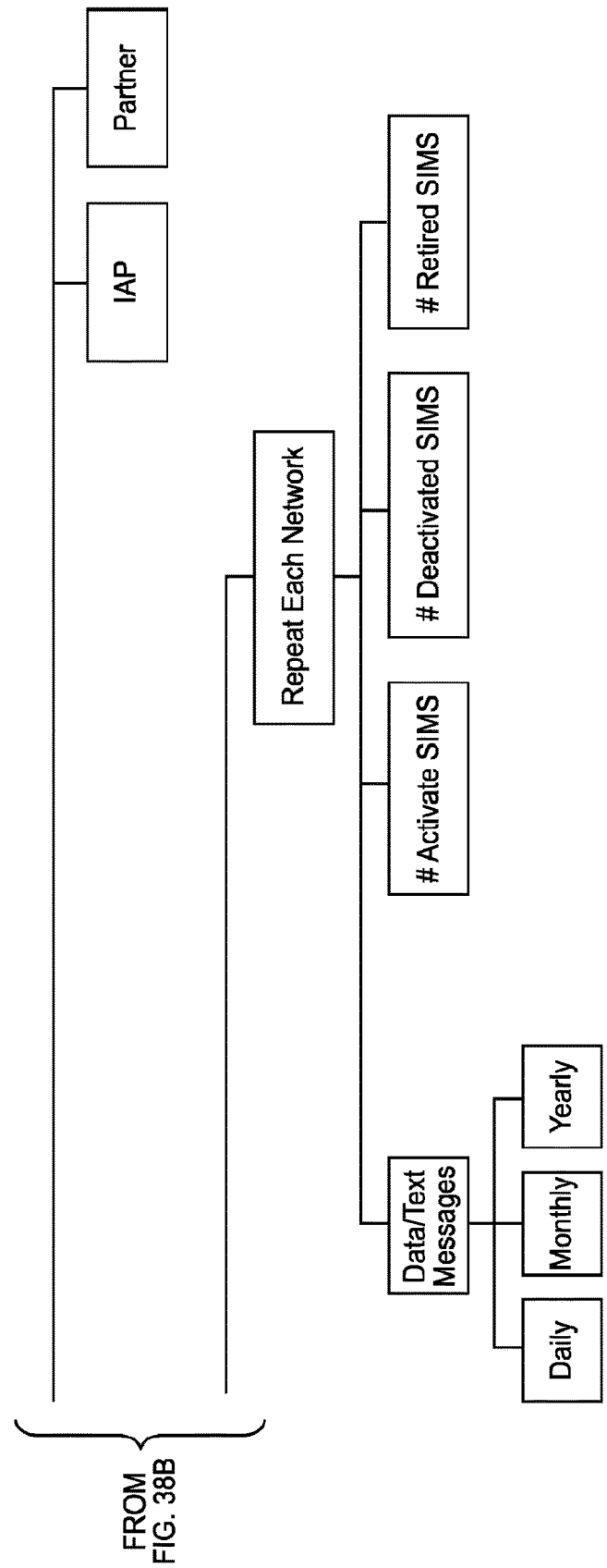

FIGS. 38A-38C together depict the Analytics level of the exemplary graveside telepresence administrative dashboard flow map depicted by FIG. 35.

Figure 39A:
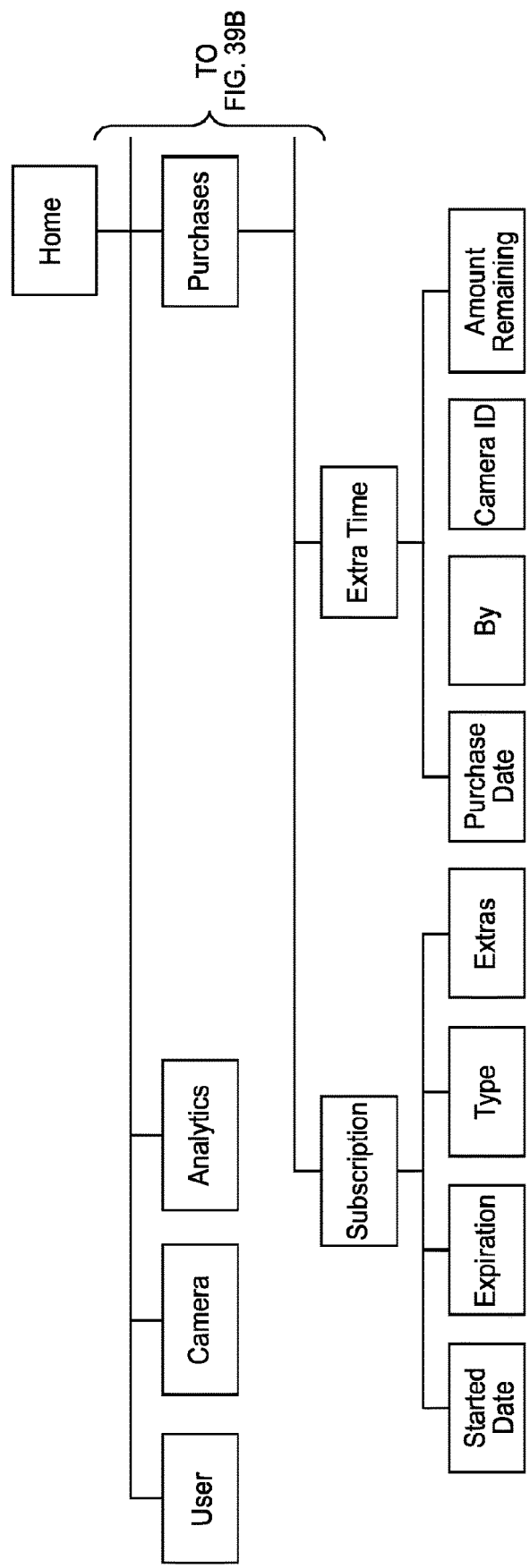
FIGS. 39A-39B together depict the IAP (In App Purchase) and Partner levels of the exemplary graveside telepresence administrative dashboard flow map depicted by FIG. 35.
Figure 39B:
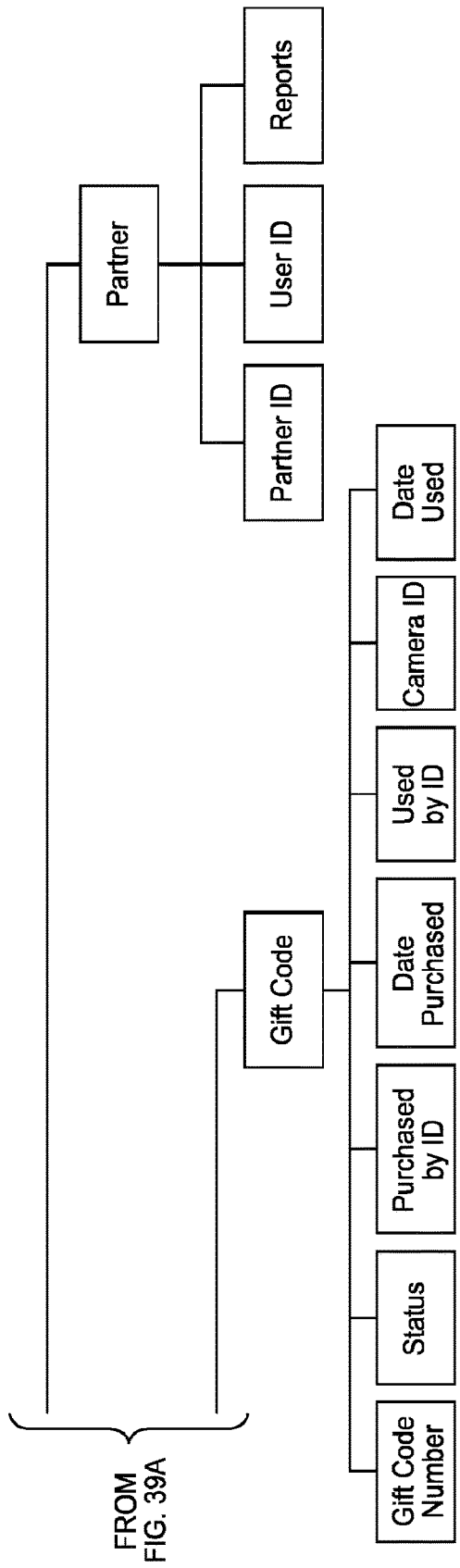

FIGS. 39A-39B together depict the IAP (In App Purchase) and Partner levels of the exemplary graveside telepresence administrative dashboard flow map depicted by FIG. 35.

Figure 40:
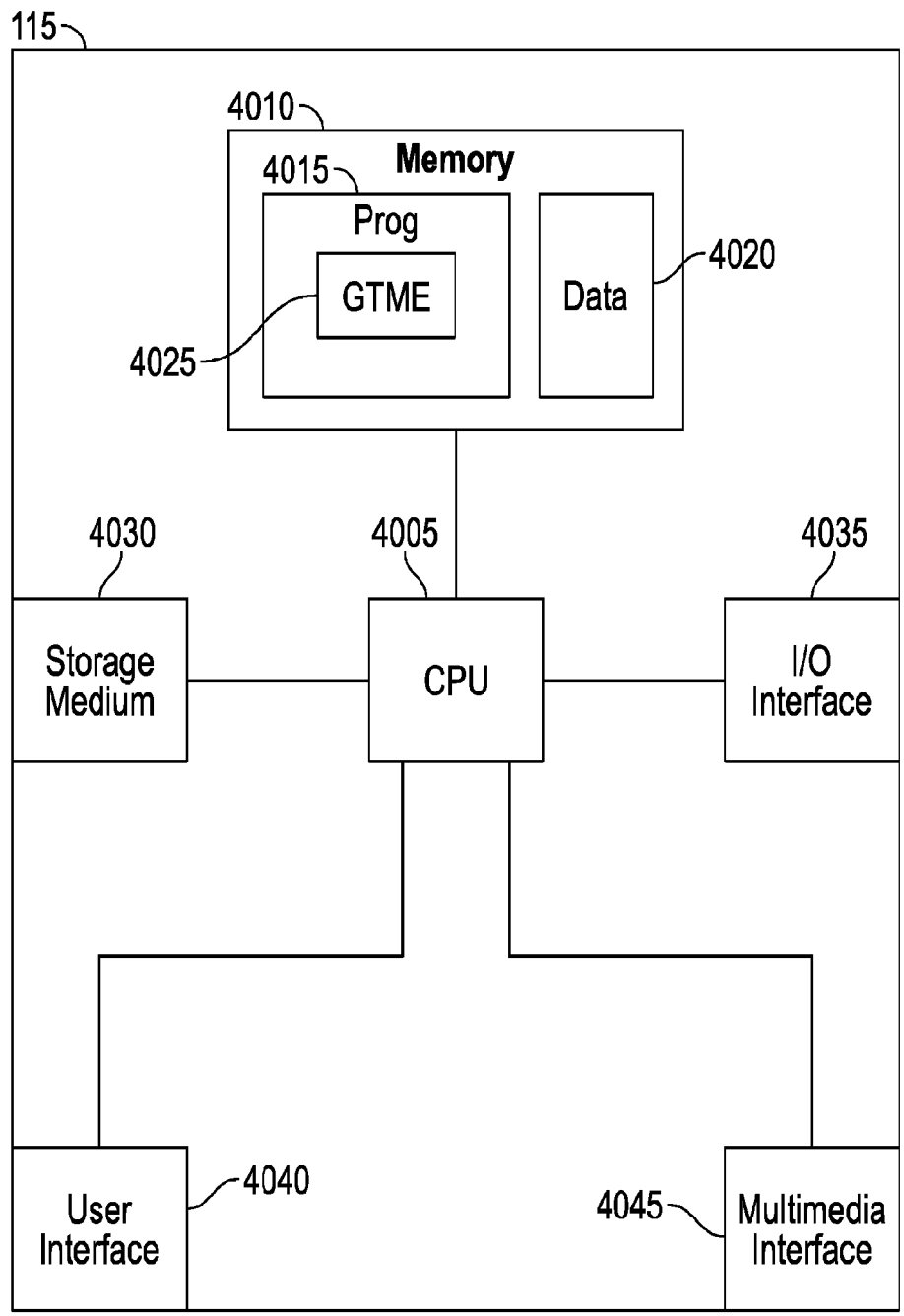
FIG. 40 depicts a structural view of an exemplary graveside telepresence device configured to exchange multimedia between a grave and a user's communications device remote from the grave, activate an energy emitter configured by the graveside device to physically interact with the grave responsive to the remote user's activity, and send to the user's communication device a live indication of the interaction.

FIG. 40 depicts a structural view of an exemplary graveside telepresence device configured to exchange multimedia between a grave and a user's communications device remote from the grave, activate an energy emitter configured by the graveside device to physically interact with the grave responsive to the remote user's activity, and send to the user's communication device a live indication of the interaction. In FIG. 40, the block diagram of the exemplary graveside telepresence device 115 includes processor 4005 and memory 4010. The processor 4005 is in electrical communication with the memory 4010. The depicted memory 4010 includes program memory 4015 and data memory 4020. The depicted program memory 4015 includes processor-executable program instructions implementing the GTME (GraveTime Management Engine) 4025. In some embodiments, the illustrated program memory 4015 may include processor-executable program instructions configured to implement an OS (Operating System). In various embodiments, the OS may include processor executable program instructions configured to implement various operations when executed by the processor 4005. In some embodiments, the OS may be omitted. In some embodiments, the illustrated program memory 4015 may include processor-executable program instructions configured to implement various Application Software. In various embodiments, the Application Software may include processor executable program instructions configured to implement various operations when executed by the processor 4005. In some embodiments, the Application Software may be omitted. In the depicted embodiment, the processor 4005 is communicatively and operably coupled with the storage medium 4030. In various implementations, the storage medium 4030 may be an SD card. In some designs, the SD card may be removable. In the depicted embodiment, the processor 4005 is communicatively and operably coupled with the I/O (Input/Output) interface 4035. In the depicted embodiment, the I/O interface 4035 includes a network interface. In various implementations, the network interface may be a wireless network interface. In some designs, the network interface may be a Wi-Fi interface. In some embodiments, the network interface may be a Bluetooth interface. In an illustrative example, the graveside telepresence device 115 may include more than one network interface. In some designs, the network interface may be a wireline interface. In some implementations, the network interface may be omitted. In some embodiments, the I/O interface 4035 may include a laser pointer adapted to emit light energy, wherein the laser pointer is operably and communicatively coupled with the processor 4005, and wherein the laser pointer orientation in three dimensional space is governed by a pan and tilt apparatus operably and communicatively coupled with the laser pointer and the processor 4005. In the depicted embodiment, the processor 4005 is communicatively and operably coupled with the user interface 4040. In various implementations, the user interface 4040 may be adapted to receive input from a user or send output to a user. In some embodiments, the user interface 4040 may be adapted to an input-only or output-only user interface mode. In various implementations, the user interface 4040 may include an imaging display. In some embodiments, the user interface 4040 may include an audio interface. In some designs, the audio interface may include an audio input. In various designs, the audio interface may include an audio output. In some implementations, the user interface 4040 may be touch-sensitive. In some designs, the graveside telepresence device 115 may include an accelerometer operably coupled with the processor 4005. In various embodiments, the graveside telepresence device 115 may include a GPS module operably coupled with the processor 4005. In an illustrative example, the graveside telepresence device 115 may include a magnetometer operably coupled with the processor 4005. In some embodiments, the user interface 4040 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 4005 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, object tracking, optical flow, or anomaly detection. In various implementations, the depicted memory 4010 may contain processor executable program instruction modules configurable by the processor 4005 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, object tracking, optical flow, or anomaly detection. In some embodiments, the input sensor array may include audio sensing subsystems or modules configurable by the processor 4005 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 4010 may contain processor executable program instruction modules configurable by the processor 4005 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 4005 is communicatively and operably coupled with the multimedia interface 4045. In the illustrated embodiment, the multimedia interface 4045 includes interfaces adapted to input and output of audio, video, and image data. In some embodiments, the multimedia interface 4045 may include one or more still image camera or video camera. In various designs, the multimedia interface 4045 may include one or more microphone. In some implementations, the multimedia interface 4045 may include a wireless communication means configured to operably and communicatively couple the multimedia interface 4045 with a multimedia data source or sink external to the graveside telepresence device 115. In some embodiments, the multimedia interface 4045 may include a low frequency audio transducer adapted to emit sound energy constrained to a frequency range below the lower limit of the human-audible frequency range. In an illustrative example, the low frequency audio transducer may be a low frequency speaker. In some designs, the multimedia interface 4045 may include a high frequency audio transducer adapted to emit sound energy constrained to a frequency range above the upper limit of the human-audible frequency range. In an illustrative example, the high frequency audio transducer may be an ultrasonic audio transducer. In an illustrative example, the high frequency audio transducer may be a high frequency speaker. In various designs, the multimedia interface 4045 may include interfaces adapted to send, receive, or process encoded audio or video. In various embodiments, the multimedia interface 4045 may include one or more video, image, or audio encoder. In various designs, the multimedia interface 4045 may include one or more video, image, or audio decoder. In various implementations, the multimedia interface 4045 may include interfaces adapted to send, receive, or process one or more multimedia stream. In various implementations, the multimedia interface 4045 may include a GPU. In some embodiments, the multimedia interface 4045 may be omitted. Useful examples of the illustrated graveside telepresence device 115 include, but are not limited to, personal computers, servers, tablet PCs, smartphones, or other computing devices. In some embodiments, multiple graveside telepresence device 115 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description.

In some embodiments, an exemplary graveside telepresence device 115 design may be realized in a distributed implementation. In an illustrative example, some graveside telepresence device 115 designs may be partitioned between a client device, such as, for example, a phone, and, a more powerful server system, as depicted, for example, in FIG. 2. In various designs, a graveside telepresence device 115 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary graveside telepresence device 115 may be configured to operate on a device with less processing power, such as, for example, various gaming consoles, which may not have sufficient processor power, or a suitable CPU architecture, to adequately support graveside telepresence device 115. Various embodiment designs configured to operate on a such a device with reduced processor power may work in conjunction with a more powerful server system.

Figure 41:
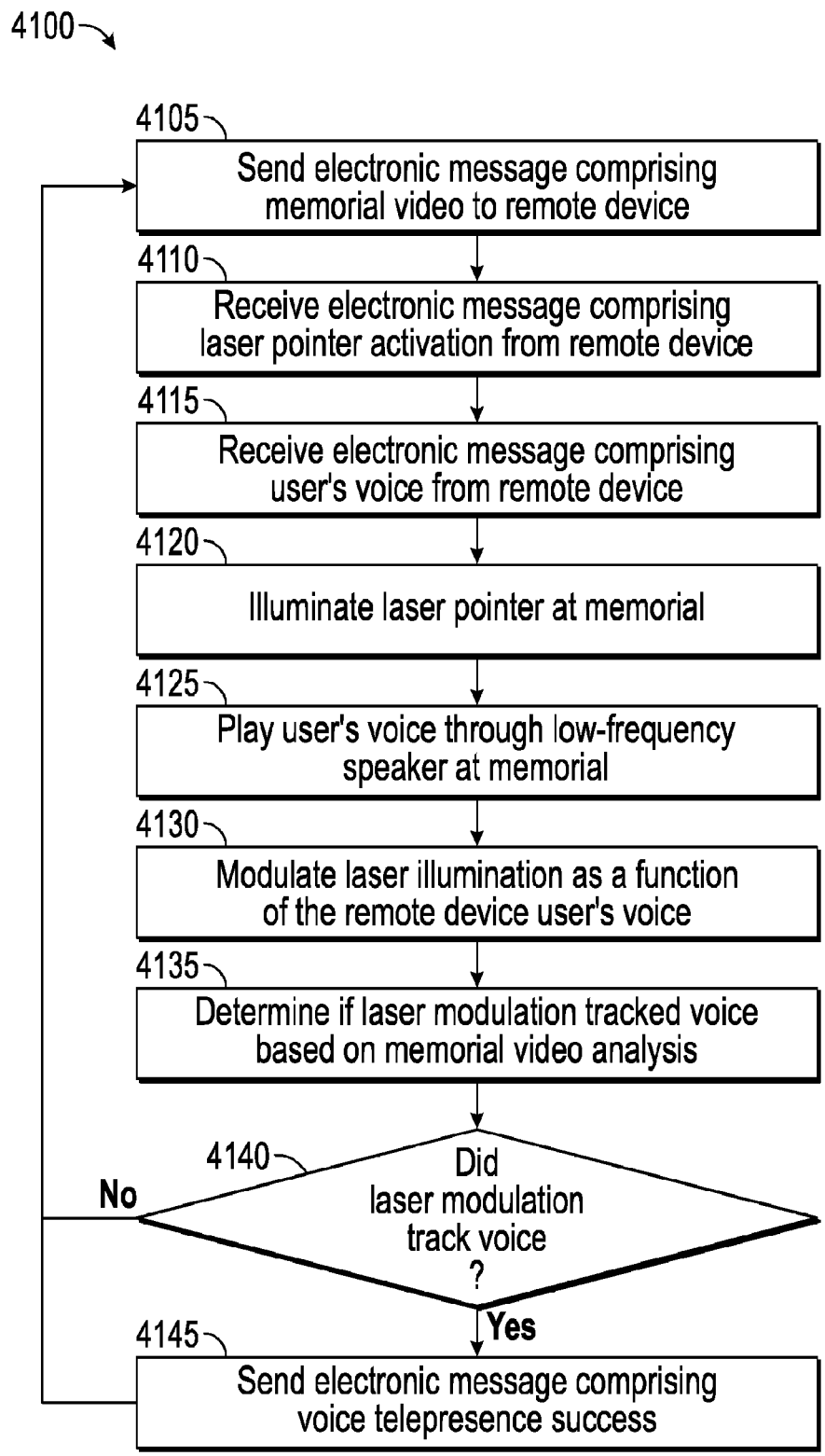
FIG. 41 depicts an exemplary process flow of an embodiment GTME (GraveTime Management Engine).

FIG. 41 depicts an exemplary process flow of an embodiment GTME (GraveTime Management Engine). The method depicted in FIG. 41 is given from the perspective of the GTME (GraveTime Management Engine) 4025 implemented via processor-executable program instructions executing on the graveside telepresence device 115 processor 4005, depicted in FIG. 40. In the illustrated embodiment, the GTME 4025 executes as program instructions on the processor 4005 configured in the GTME 4025 host graveside telepresence device 115, depicted in at least FIG. 1, FIG. 2, and FIG. 40. In some embodiments, the GTME 4025 may execute as a cloud service communicatively and operatively coupled with system services, hardware resources, or software elements local to and/or external to the GTME 4025 host graveside telepresence device 115. The depicted method 4100 begins at step 4105 with the processor 4005 sending an electronic message comprising memorial video to a remote device. In some embodiments, the memorial video sent to the remote device may be video captured by the graveside telepresence device 115, depicted in at least FIG. 1, FIG. 2, and FIG. 40. In some designs, the video may include pre-recorded or time-lapse video that was captured at a prior time or another location. Various implementations may send video to the remote device according to a predetermined schedule. In various embodiments, the remote device may be, for example, the mobile device 106, depicted in at least FIG. 1, FIG. 2, and FIG. 42. In various exemplary scenarios, the remote device may be a tablet, desktop computer, or an autonomous computer application executing as a cloud service. Then, the method continues at step 4110 with the processor 4005 receiving an electronic message comprising laser pointer activation from a remote device. In various examples, the remote device sending the electronic message comprising laser pointer activation may be the mobile device 106. In some examples, the remote device may be a tablet, desktop computer, or an autonomous computer application executing as a cloud service. In some designs, the message comprising laser pointer activation may include one or more command 147, depicted in FIG. 1. Then, the method continues at step 4115 with the processor 4005 receiving an electronic message comprising a user's voice from a remote device. In some embodiments, the electronic message comprising the user's voice may include one or more user multimedia 142, depicted in FIG. 1. Then, the method continues at step 4120 with the processor 4005 illuminating the laser pointer at a memorial. In some embodiments, the processor 4005 may activate the laser pointer to illuminate a spot on the memorial surface with laser light directed at the memorial. Then, the method continues at step 4125 with the processor 4005 playing the user's voice through a low-frequency speaker at the memorial. In some examples, before playing the user's voice at the memorial, the processor 4005 may spectrum-shift the user's voice to a frequency range above or below a human-audible frequency range. Such spectrum-shifting of the user's voice by the processor 4005 to an inaudible frequency range may enhance the user's privacy by rendering the user's voice inaudible to living persons in the vicinity of the memorial. Then, the method continues at step 4130 with the processor 4005 modulating the laser illumination as a function of the remote device user's voice. In some examples, the processor 4005 may turn the laser pointer illumination off and on as a function of an energy detector configured in the graveside telepresence device 115 to sense the level of sound pressure generated by the low-frequency speaker. Then, the method continues at step 4135 with the processor 4005 determining if the laser modulation tracked the user's voice, based on the processor 4005 analyzing audio and video captured at the memorial by the graveside telepresence device 115. In some embodiments, the processor 4005 may identify laser pointer illumination on and off events as a function of time, based on video image processing analysis of memorial video captured by the graveside telepresence device 115. In an illustrative example, the processor 4005 may compare vocal audio energy extrema, determined as a function of the user's voice, with the laser pointer illumination on and off events, identified as a function of video analysis, to determine if the laser modulation tracked the user's voice based on the comparison. Then, the method continues at step 4140 with the processor 4005 performing a test to determine if the laser modulation tracked the user's voice, based on the memorial audio and video analysis performed by the processor 4005 at step 4135. Upon a determination by the processor 4005 at step 4140 the laser modulation did not track the user's voice, the method continues at step 4105 with the processor 4005 sending an electronic message comprising memorial video to a remote device. Upon a determination by the processor 4005 at step 4140 the laser modulation tracked the user's voice, the method continues at step 4145 with the processor 4005 sending an electronic message comprising telepresence success. In various examples, the electronic message comprising telepresence success sent by the processor 4005 may include one or more graveside telepresence indication 160, depicted in FIG. 1. In some embodiments, the processor 4005 may send the graveside telepresence indication 160 to the mobile device 106, depicted in at least FIG. 1, FIG. 2, and FIG. 42. In an illustrative example, the processor 4005 may send the graveside telepresence indication 160 as a confirmation of live interaction with a memorial, based on physical measurement at the memorial. Such physical live interaction confirmation may improve the sense of realism associated to a user's interaction with a loved one's memorial. In some embodiments, a continuous interaction indication sent by the processor 4005 to the remote user's mobile device may improve the remote user's sense of presence at the memorial. In various implementations, the method 4100 may repeat.

Figure 42:
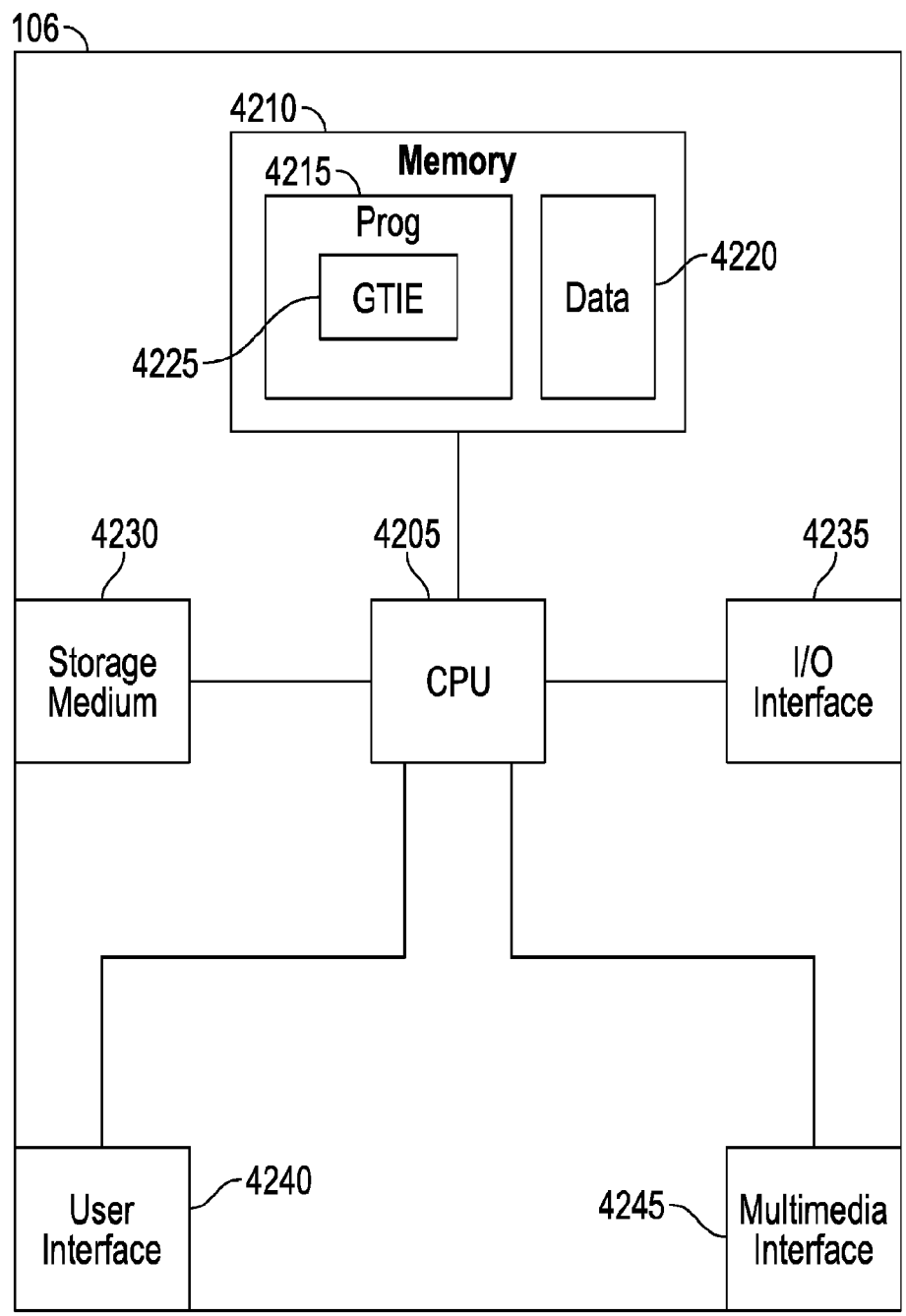
FIG. 42 depicts a structural view of an exemplary mobile device configured to physically interact with a memorial, and receive a live indication of the interaction.

FIG. 42 depicts a structural view of an exemplary mobile device configured to physically interact with a memorial, and receive a live indication of the interaction. In FIG. 42, the block diagram of the exemplary mobile device 106 includes processor 4205 and memory 4210. The processor 4205 is in electrical communication with the memory 4210. The depicted memory 4210 includes program memory 4215 and data memory 4220. The depicted program memory 4215 includes processor-executable program instructions implementing the GTIE (GraveTime Interface Engine) 4225. In some embodiments, the illustrated program memory 4215 may include processor-executable program instructions configured to implement an OS (Operating System). In various embodiments, the OS may include processor executable program instructions configured to implement various operations when executed by the processor 4205. In some embodiments, the OS may be omitted. In some embodiments, the illustrated program memory 4215 may include processor-executable program instructions configured to implement various Application Software. In various embodiments, the Application Software may include processor executable program instructions configured to implement various operations when executed by the processor 4205. In some embodiments, the Application Software may be omitted. In the depicted embodiment, the processor 4205 is communicatively and operably coupled with the storage medium 4230. In the depicted embodiment, the processor 4205 is communicatively and operably coupled with the I/O (Input/Output) interface 4235. In the depicted embodiment, the I/O interface 4235 includes a network interface. In various implementations, the network interface may be a wireless network interface. In some designs, the network interface may be a Wi-Fi interface. In some embodiments, the network interface may be a Bluetooth interface. In an illustrative example, the mobile device 106 may include more than one network interface. In some designs, the network interface may be a wireline interface. In some designs, the network interface may be omitted. In the depicted embodiment, the processor 4205 is communicatively and operably coupled with the user interface 4240. In various implementations, the user interface 4240 may be adapted to receive input from a user or send output to a user. In some embodiments, the user interface 4240 may be adapted to an input-only or output-only user interface mode. In various implementations, the user interface 4240 may include an imaging display. In some embodiments, the user interface 4240 may include an audio interface. In some designs, the audio interface may include an audio input. In various designs, the audio interface may include an audio output. In some implementations, the user interface 4240 may be touch-sensitive. In some designs, the mobile device 106 may include an accelerometer operably coupled with the processor 4205. In various embodiments, the mobile device 106 may include a GPS module operably coupled with the processor 4205. In an illustrative example, the mobile device 106 may include a magnetometer operably coupled with the processor 4205. In some embodiments, the user interface 4240 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 4205 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 4210 may contain processor executable program instruction modules configurable by the processor 4205 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 4205 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, audio spectrum shifting, or anomaly detection. In various implementations, the depicted memory 4210 may contain processor executable program instruction modules configurable by the processor 4205 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, audio spectrum shifting, or anomaly detection. In the depicted embodiment, the processor 4205 is communicatively and operably coupled with the multimedia interface 4245. In the illustrated embodiment, the multimedia interface 4245 includes interfaces adapted to input and output of audio, video, and image data. In some embodiments, the multimedia interface 4245 may include one or more still image camera or video camera. In various designs, the multimedia interface 4245 may include one or more microphone. In some implementations, the multimedia interface 4245 may include a wireless communication means configured to operably and communicatively couple the multimedia interface 4245 with a multimedia data source or sink external to the mobile device 106. In various designs, the multimedia interface 4245 may include interfaces adapted to send, receive, or process encoded audio or video. In various embodiments, the multimedia interface 4245 may include one or more video, image, or audio encoder. In various designs, the multimedia interface 4245 may include one or more video, image, or audio decoder. In various implementations, the multimedia interface 4245 may include interfaces adapted to send, receive, or process one or more multimedia stream. In various implementations, the multimedia interface 4245 may include a GPU. In some embodiments, the multimedia interface 4245 may be omitted. Useful examples of the illustrated mobile device 106 include, but are not limited to, personal computers, servers, tablet PCs, smartphones, or other computing devices. In some embodiments, multiple mobile device 106 implementations may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary mobile device 106 design may be realized in a distributed implementation. In an illustrative example, some mobile device 106 designs may be partitioned between a client device, such as, for example, a phone, and, a more powerful server system, as depicted, for example, in FIG. 2. In various designs, a mobile device 106 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary mobile device 106 may be configured to operate on a device with less processing power, such as, for example, various gaming consoles, which may not have sufficient processor power, or a suitable CPU architecture, to adequately support mobile device 106. Various embodiment designs configured to operate on a such a device with reduced processor power may work in conjunction with a more powerful server system.

Figure 43:
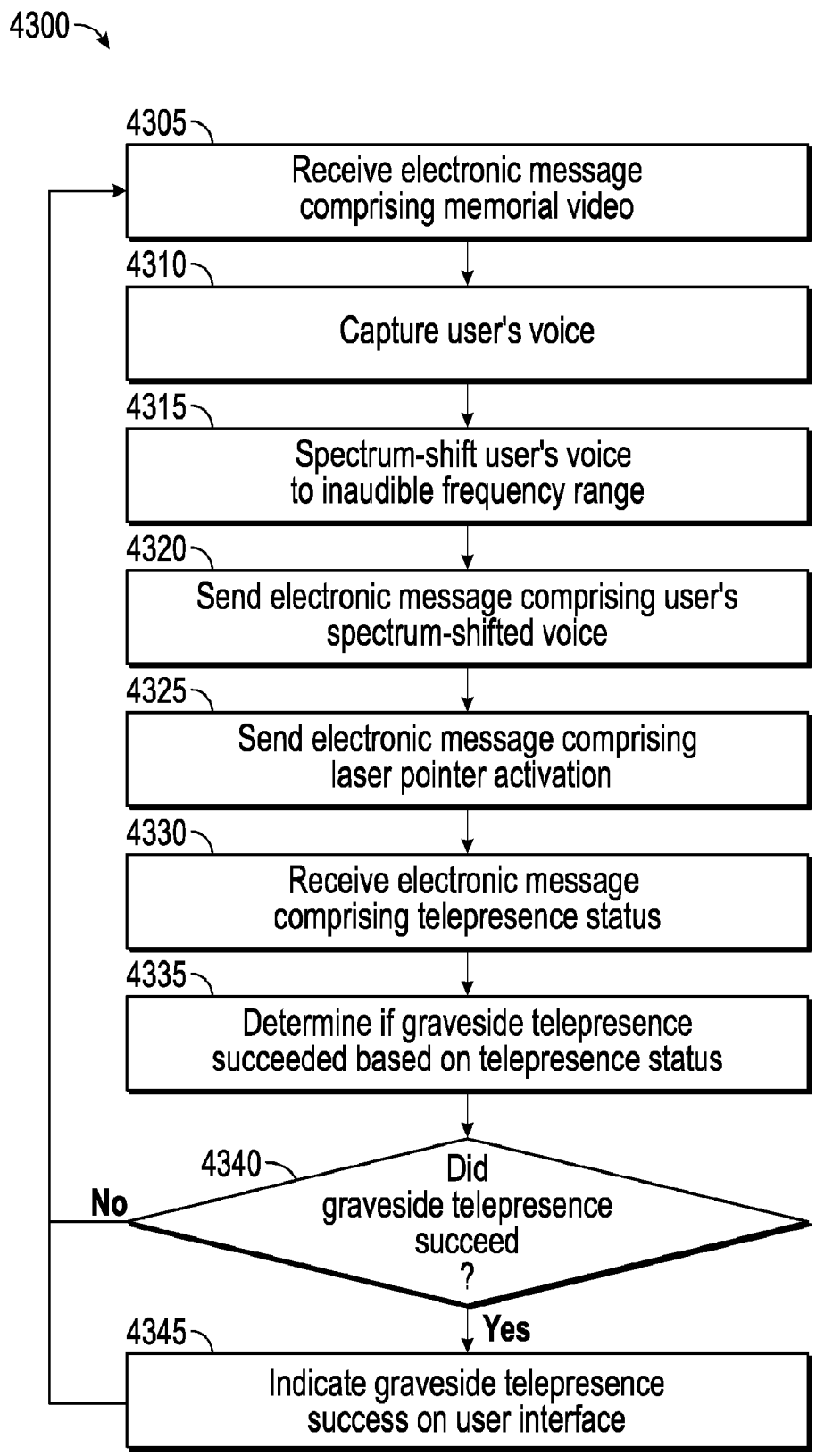
FIG. 43 depicts an exemplary process flow of an embodiment GTIE (GraveTime Interface Engine).

FIG. 43 depicts an exemplary process flow of an embodiment GTIE (GraveTime Interface Engine). The method depicted in FIG. 43 is given from the perspective of the GTIE (GraveTime Interface Engine) 4225 implemented via processor-executable program instructions executing on the mobile device 106 processor 4205, depicted in FIG. 42. In the illustrated embodiment, the GTIE 4225 executes as program instructions on the processor 4205 configured in the GTIE 4225 host mobile device 106, depicted in at least FIG. 1, FIG. 2, and FIG. 42. In some embodiments, the GTIE 4225 may execute as a cloud service communicatively and operatively coupled with system services, hardware resources, or software elements local to and/or external to the GTIE 4225 host mobile device 106. The depicted method 4300 begins at step 4305 with the processor 4205 receiving an electronic message comprising memorial video. In various embodiments, the electronic message received by the processor 4205 at step 4305 may be sent by the graveside telepresence device 115, depicted at least in FIG. 1, FIG. 2, and FIG. 40. In some examples, the memorial video may include graveside multimedia 163, depicted in FIG. 1. In various embodiments, the graveside multimedia 163 may include raw or encoded data organized in a frame, packet, or stream. Then, the method continues at step 4310 with the processor 4205 capturing the user's voice. Then, the method continues at step 4315 with the processor 4205 spectrum-shifting the user's voice to an inaudible frequency range. Then, the method continues at step 4320 with the processor 4205 sending an electronic message comprising the user's spectrum-shifted voice. Then, the method continues at step 4325 with the processor 4205 sending an electronic message comprising laser pointer activation. In some examples, the electronic message comprising laser pointer activation sent by the processor 4205 at step 4325 may include one or more user command 147, depicted in FIG. 1. In various implementations, the mobile device 106 processor 4205 may send one or more user command 147 to the graveside telepresence device 115, depicted in at least FIG. 1, FIG. 2, and FIG. 40. In some examples, the user command 147 may include a directive configured to cause the graveside telepresence device 115 to reorient a laser pointer to a different position or location relative to the memorial surface, or modulate the laser pointer illumination. Then, the method continues at step 4330 with the processor 4205 receiving an electronic message comprising telepresence status. In some examples, the electronic message comprising telepresence status received by the processor 4205 at step 4330 may include graveside telepresence indication 160, depicted in FIG. 1. In various embodiments, the graveside telepresence indication 160 received by the processor 4205 at step 4330 may include data representative of laser pointer activity captured by the remote device. For example, the data representative of laser pointer activity received by the processor 4205 at step 4330 may include a time-stamped sequence of coordinates representative of a laser pointer moving to target a sequence of locations on a memorial surface. Then, the method continues at step 4335 with the processor 4205 analyzing the telepresence status received by the processor 4205 at step 4330, to determine if graveside telepresence succeeded, based on the analysis. In an illustrative example, the processor 4205 may compare the data representative of laser pointer activity received by the processor 4205 at step 4330 with the laser pointer directive included in the user command 147, to determine if the laser pointer successfully followed the user command. In some examples, the processor 4205 may compare the difference between the user command 147 and the graveside telepresence indication 160 to a predetermined threshold, to determine if graveside telepresence succeeded. Then, the method continues at step 4340 with the processor 4205 performing a test to determine if graveside telepresence succeeded, based on the graveside telepresence analysis performed by the processor 4205 at step 4335. Upon a determination by the processor 4205 at step 4340 graveside telepresence did not succeed, the method continues at step 4305 with the processor 4205 receiving an electronic message comprising memorial video. Upon a determination by the processor 4205 at step 4340 graveside telepresence succeeded, the method continues at step 4345 with the processor 4205 indicating graveside telepresence success on the user interface. In various embodiments, the processor 4205 may activate a graveside telepresence success indication on the mobile device 106 user interface 112. In an illustrative example, the graveside telepresence success indication activated in the mobile device 106 user interface 112 may be based on tracking the movement of the laser pointer illumination from a first memorial surface location to a second memorial surface location. In various examples, the processor 4205 may analytically confirm, based on object tracking or optical flow algorithms implemented in the graveside device 115 or the mobile device 106, that the tracked laser pointer illumination movement was consistent with the user action, and provide an indication of the confirmation on the mobile device 106 user interface 112. Such a confirmation of live interaction based on physical measurement at the memorial may improve the sense of realism associated to a user's interaction with a loved one's memorial. In various implementations, the method 4300 may repeat.

Figure 44:
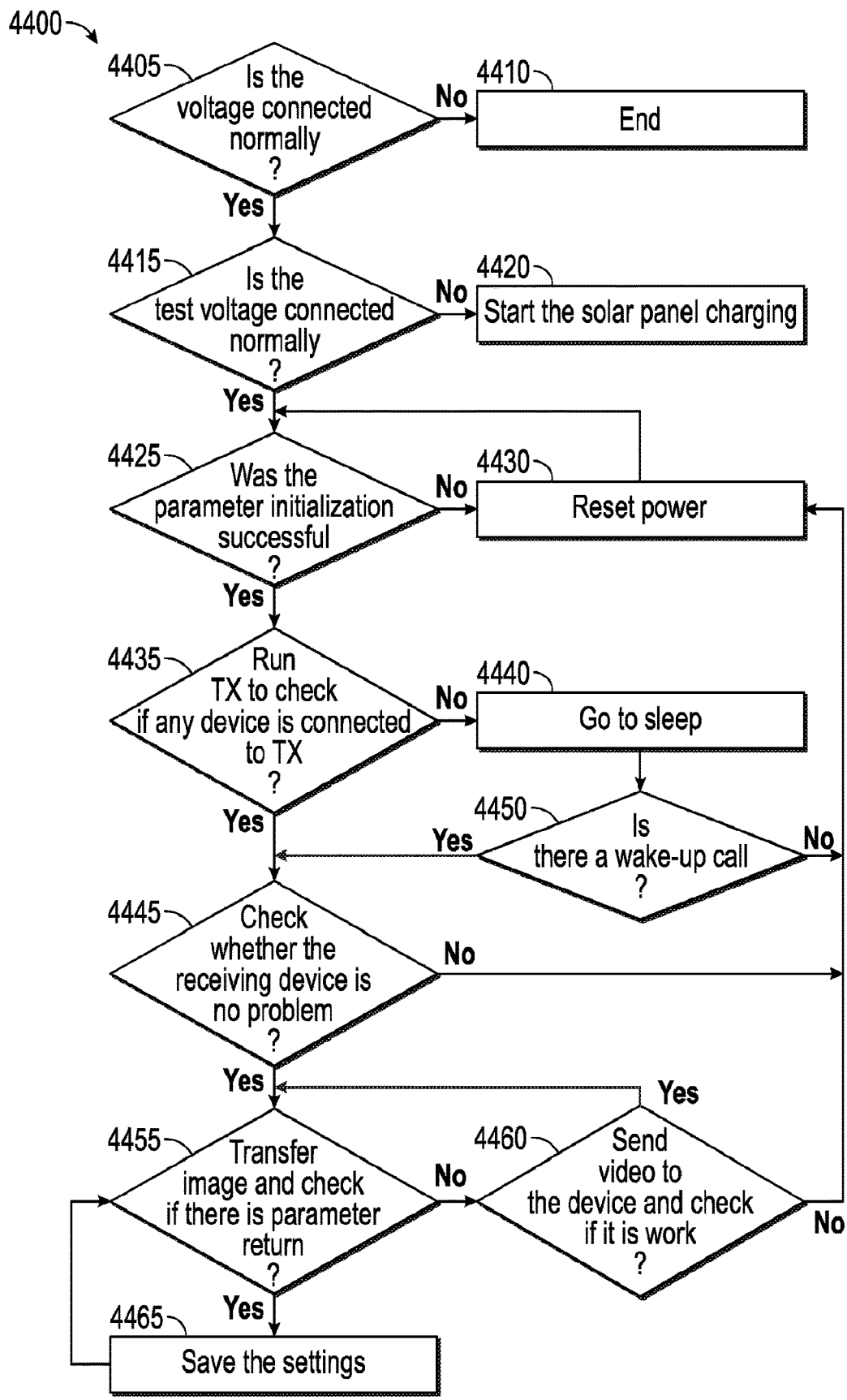
FIG. 44 depicts an exemplary initialization and configuration process flow of an embodiment graveside telepresence device configured to exchange multimedia between a grave and a user's communications device remote from the grave.

FIG. 44 depicts an exemplary initialization and configuration process flow of an embodiment graveside telepresence device configured to exchange multimedia between a grave and a user's communications device remote from the grave. The method depicted in FIG. 44 is given from the perspective of the GTME (GraveTime Management Engine) 4025 implemented via processor-executable program instructions executing on the graveside telepresence device 115 processor 4005, depicted in FIG. 40. In the illustrated embodiment, the GTME 4025 executes as program instructions on the processor 4005 configured in the GTME 4025 host graveside telepresence device 115, depicted in at least FIG. 1, FIG. 2, and FIG. 40. In some embodiments, the GTME 4025 may execute as a cloud service communicatively and operatively coupled with system services, hardware resources, or software elements local to and/or external to the GTME 4025 host graveside telepresence device 115. The depicted method 4400 begins at step 4405 with the processor 4005 performing a test to determine if the voltage is connected normally. Upon a determination by the processor 4005 at step 4405 the voltage is not connected normally, the method ends at step 4410. Upon a determination by the processor 4005 at step 4405 the voltage is connected normally, the method continues at step 4415 with the processor 4005 performing a test to determine if the test voltage is connected normally. Upon a determination by the processor 4005 at step 4415 the test voltage is not connected normally, the method continues at step 4420 with the processor 4005 starting the solar panel charging. Upon a determination by the processor 4005 at step 4415 the test voltage is connected normally, the method continues at step 4425 with the processor 4005 performing a test to determine if the parameter initialization was successful. Upon a determination by the processor 4005 at step 4425 the parameter initialization was not successful, the method continues at step 4430 with the processor 4005 resetting power, and the method continues at step 4425 with the processor 4005 performing a test to determine if the parameter initialization was successful. Upon a determination by the processor 4005 at step 4425 the parameter initialization was successful, the method continues at step 4435 with the processor 4005 performing a test to determine if any device is connected to TX, based on the processor 4005 running TX to check if a device is connected. Upon a determination by the processor 4005 at step 4435 no device is connected, the method continues at step 4440 with the processor 4005 configuring the graveside telepresence device 115 to go to sleep, and the method continues at step 4450 with the processor 4450 performing a test to determine if there is a wake-up call. Upon a determination by the processor 4005 at step 4450 there is no wake-up call, the method continues at step 4430 with the processor 4005 resetting power, and the method continues at step 4425 with the processor 4005 performing a test to determine if the parameter initialization was successful. Upon a determination by the processor 4005 at step 4450 there is a wake-up call, or upon a determination by the processor 4005 at step 4435 a device is connected, the method continues at step 4445 with the processor 4005 performing a test to determine if the receiving device is operating without any problem. Upon a determination by the processor 4005 at step 4445 the receiving device is not operating without any problem, the method continues at step 4430 with the processor 4005 resetting power. Upon a determination by the processor 4005 at step 4445 the receiving device is operating without any problem, the method continues at step 4455 with the processor 4005 performing a test to determine if there is an image transfer return parameter, based on transferring an image and checking for a return parameter. Upon a determination by the processor 4005 at step 4455 there is a parameter return, the method continues at step 4465 with the processor 4005 saving the settings, and the method continues at step 4455 with the processor 4005 performing a test to determine if there is an image transfer return parameter, based on transferring an image and checking for a return parameter. Upon a determination by the processor 4005 at step 4455 there is not a parameter return, the method continues at step 4460 with the processor 4005 performing a test to determine if the graveside telepresence device 115 is operating without a detectable problem, based on sending video to the device, and checking the device video operation. Upon a determination by the processor 4005 at step 4460 the graveside telepresence device 115 is not operating without a detectable problem, the method continues at step 4430 with the processor 4005 resetting power. Upon a determination by the processor 4005 at step 4460 the graveside telepresence device 115 is operating without a detectable problem, the method continues at step 4455 with the processor 4005 performing a test to determine if there is an image transfer return parameter, based on transferring an image and checking for a return parameter. In various implementations, the method 4400 may repeat.

Figure 45:
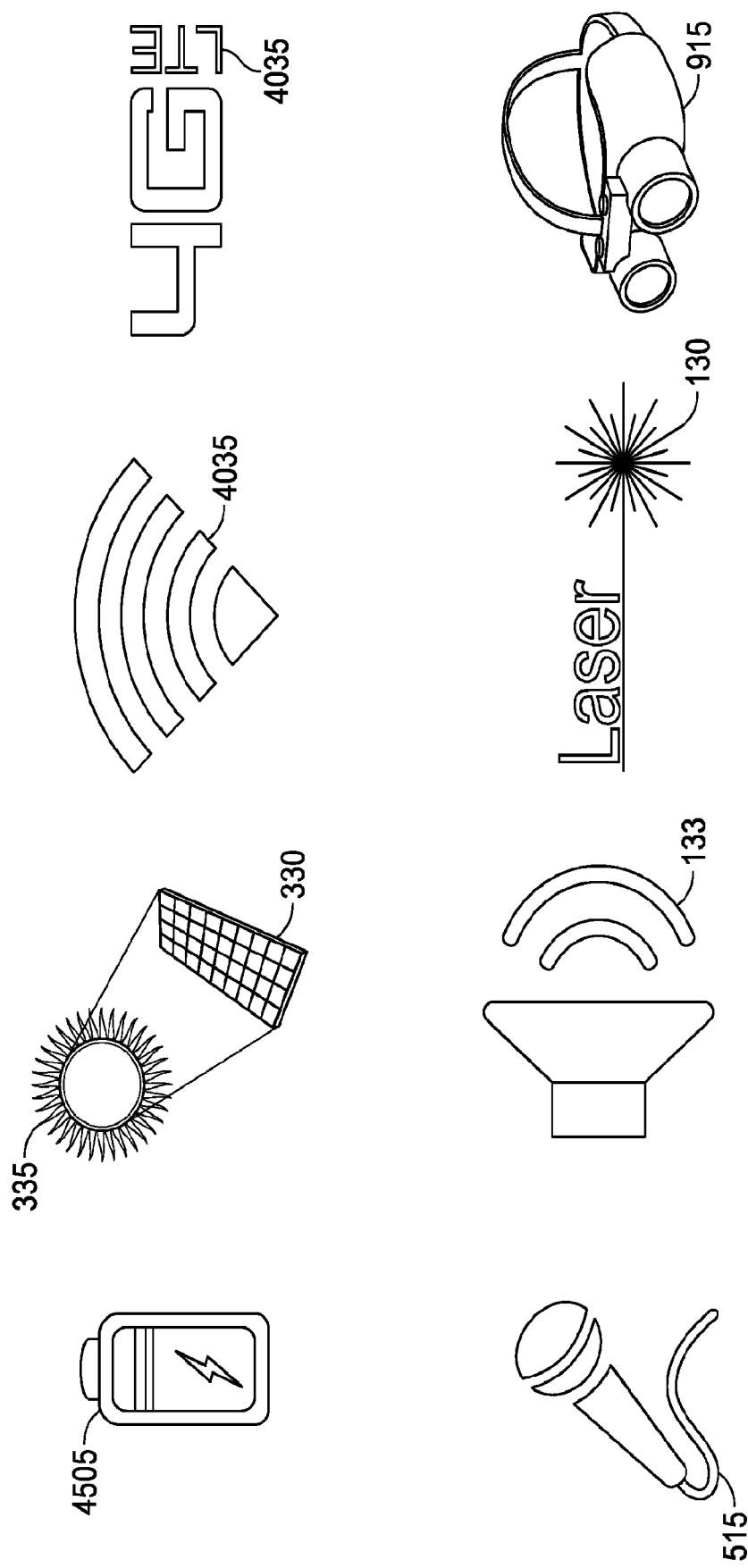
FIG. 45 depicts various exemplary graveside telepresence device embodiment implementation features.
Figure 46:
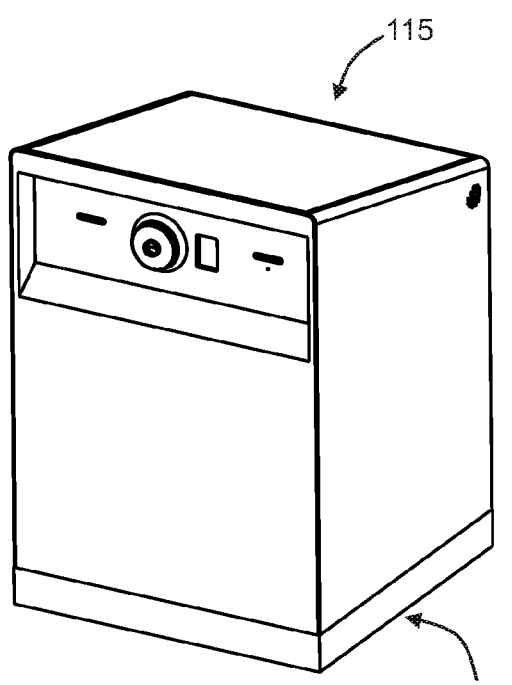
FIG. 46 is a perspective view of an exemplary graveside telepresence device embodiment implementation in an illustrative ground-mounted configuration, wherein the main housing is shown installed in secured fashion to the mounting plate.
Figure 47:
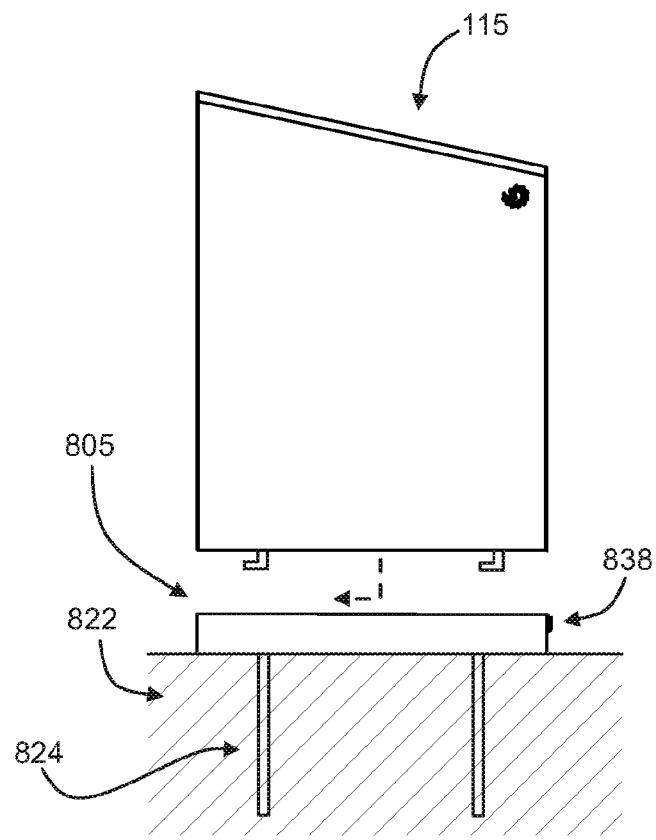
FIG. 47 is a side view of the exemplary graveside telepresence device embodiment implementation of FIG. 46, showing how the main housing may be installed on the mounting plate and secured thereat by way of orthogonal bi-axial relative movement of the main housing with respect to the mounting plate.
Figure 48:
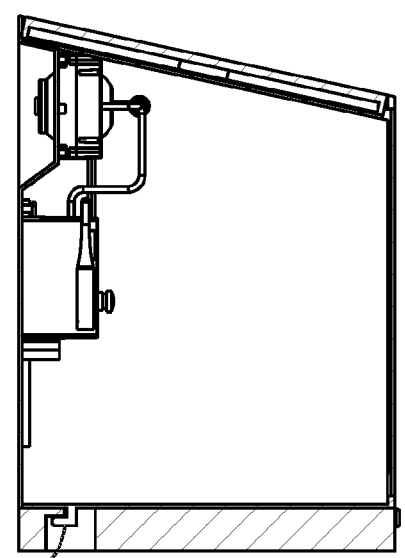
FIG. 48 is a side cross-sectional view of the exemplary graveside telepresence device embodiment implementation of FIG. 46.
Figure 49:
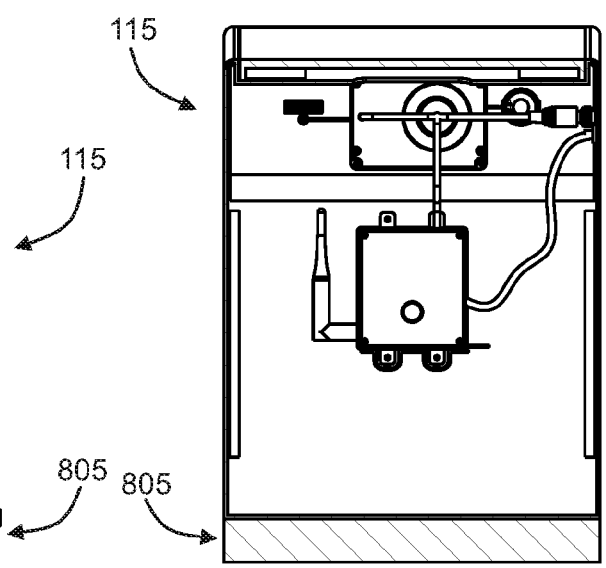
FIG. 49 is a rear cross-sectional view of the exemplary graveside telepresence device embodiment implementation of FIG. 46.
Figure 50:
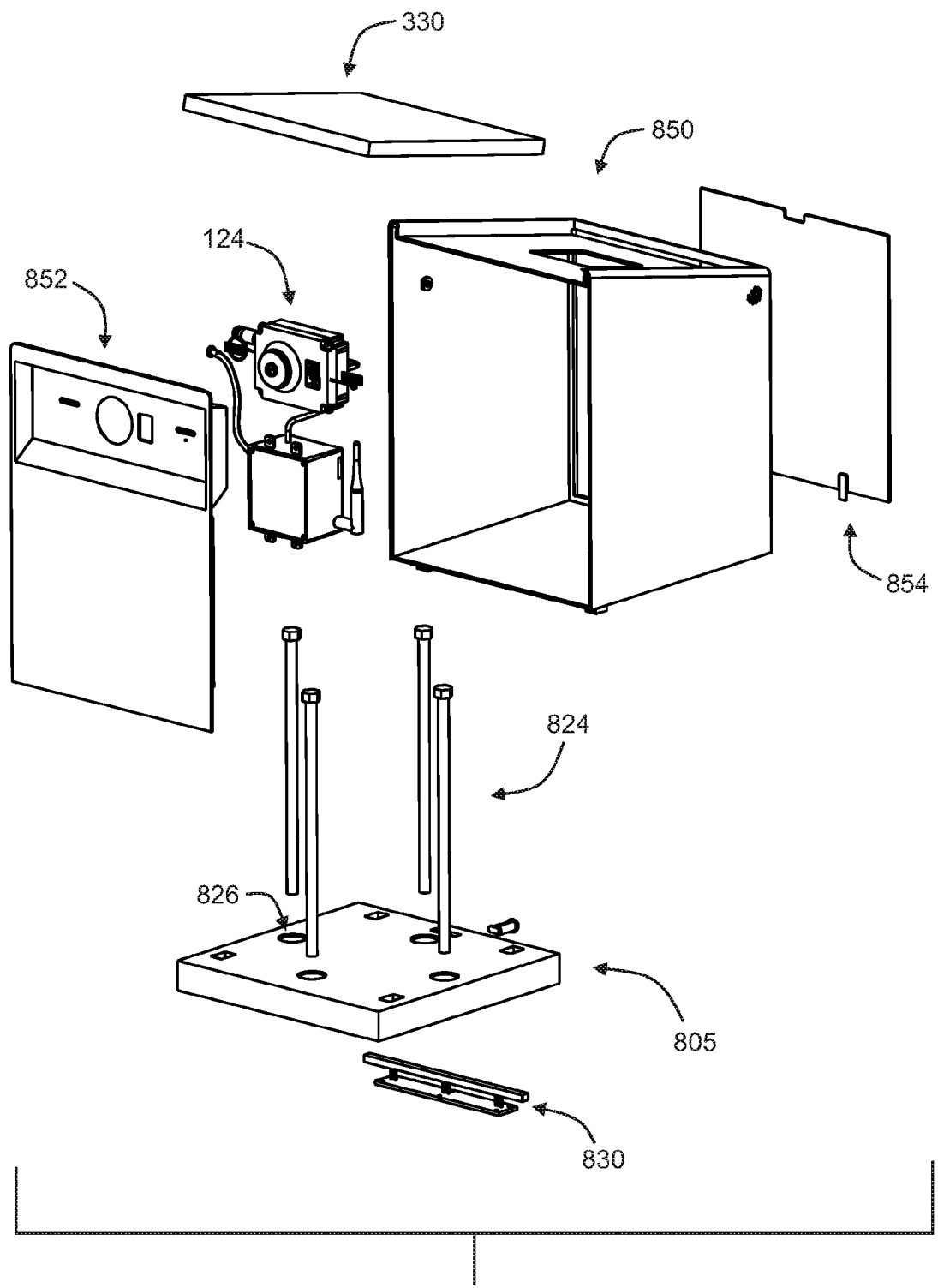
FIG. 50 is an exploded view of the exemplary graveside telepresence device embodiment implementation of FIG. 46.
Figure 51:
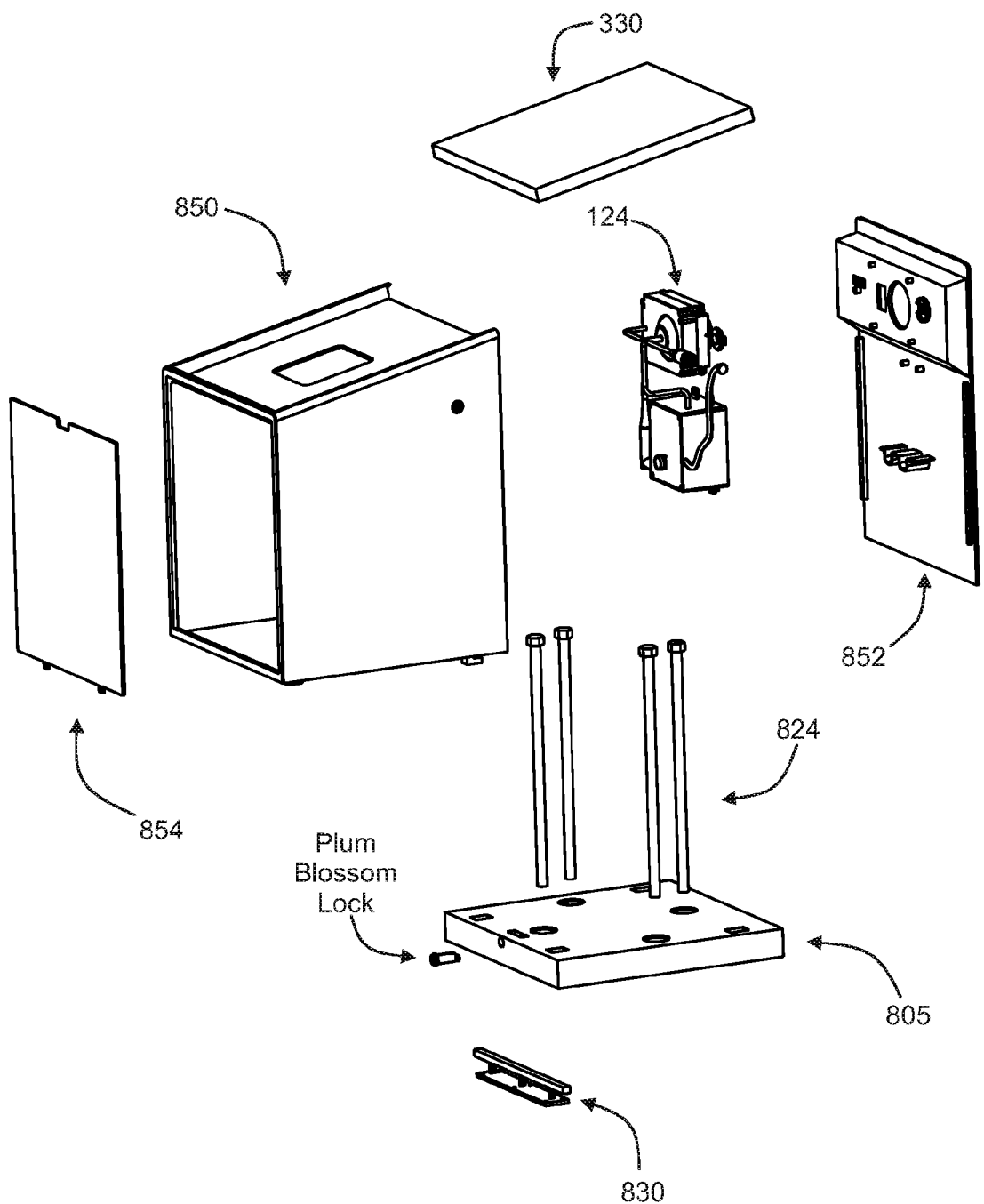
FIG. 51 is a further exploded view of the exemplary graveside telepresence device embodiment implementation of FIG. 46.
Figure 52:
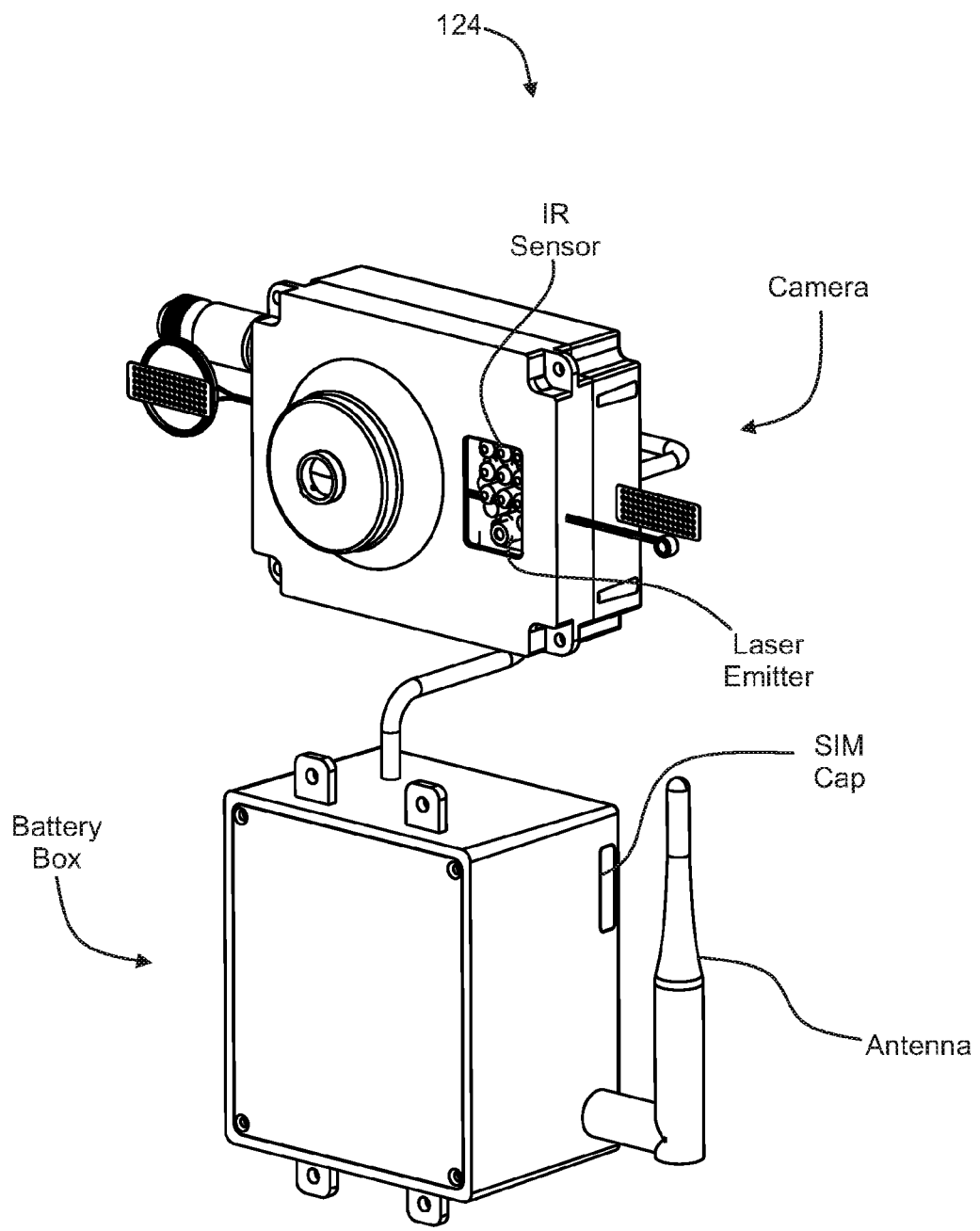
FIG. 52 is a perspective view of an exemplary multimedia impact module of the graveside telepresence device embodiment implementation of FIG. 46.
Figure 57:
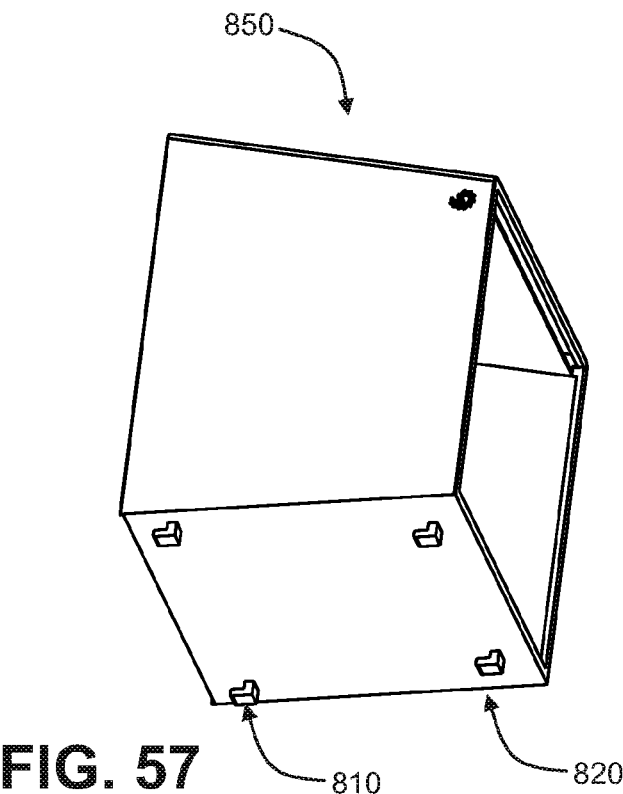
FIG. 57 is a perspective view of a main housing of the telepresence device embodiment implementation of FIG. 46. 54, with front and rear securing pins shown thereon.

FIG. 45 depicts various exemplary graveside telepresence device embodiment implementation features. In various embodiment implementations, an exemplary graveside telepresence device 115 may include rechargeable battery 4505. Some exemplary graveside telepresence device 115 designs may include solar panel 330, configured to provide power from the sun 335. Various graveside telepresence device 115 embodiments may include WiFi interface 4035. In some examples, an embodiment graveside telepresence device 115 may include 4G LTE interface 4035. Various graveside telepresence device 115 designs may include microphone 515. Some graveside telepresence device 115 implementations may include low-frequency speaker 133. In an illustrative example, various graveside telepresence device 115 embodiment implementations may include laser pointer 130. Some embodiment graveside telepresence device 115 designs may include infrared light 915 to facilitate night vision. In various embodiments, an exemplary graveside telepresence device 115 may include one or more such features. Some features may be optional. In an illustrative example, the list of embodiment graveside telepresence device 115 features is not exhaustive, exclusive, or limiting, and various features may be included in any useful combination the skilled artisan may recognize as advantageous.

Although various embodiments have been described with reference to the Figures, other embodiments are possible. For example, in various scenarios, some embodiment graveside telepresence devices may be referred to as a GraveCam. Some GraveCam usage scenarios may include a graveside telepresence user interface implementation that may be referred to as a GraveTime App. Some GraveCam designs may include a laser pointed at the memorial. In an illustrative example, the laser may provide a visual aid to show a user they are connected and speaking to their loved one using an embodiment GraveTime App configured to provide live camera connections, personal diary options, and meditation sections.

Various GraveCam embodiment designs may include an ultra-low frequency speaker that is not audible by humans, to ensure privacy while connected and speaking to the GraveCam. In some GraveCam embodiments, optional preset time-lapse images can be captured and delivered to the cloud at preset scheduled times.

In an illustrative example, various GraveCam embodiment implementations may include Geofencing to prevent theft.

Some exemplary GraveCam embodiments may include versatile mounting and camera positioning features. For example, in an illustrative GraveCam embodiment that may be referred to as MountCam, an extendable and flexible goose neck camera arm may be used to position the camera lens, microphone, Infrared (IR), and laser. Some MountCam embodiments may include a special mount that clips to a memorial using spring loaded clamps. Some GraveCam embodiment designs may facilitate graveside telepresence in environments that are not conducive to mounting a GraveCam to a memorial. For example, a GraveCam embodiment design referred to as GroundCam may be configured for installation on the ground in view of a memorial, based on a special mounting plate that anchors the GroundCam to the ground, secured by a lock to prevent theft.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in embodiments of the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described hereinabove may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, some inventive aspects may lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

According to an embodiment of the present invention, the system and method may be accomplished through the use of one or more computing devices. As depicted, for example, at least in FIG. 1, FIG. 2, FIG. 40, and FIG. 42, one of ordinary skill in the art would appreciate that an exemplary system appropriate for use with embodiments in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The embodiments disclosed hereinabove may be summarized as follows.

Embodiment 1

A process, comprising: a method to provide telepresence at a graveside memorial, comprising: configuring a graveside communications device to exchange multimedia between a grave and a user's communications device remote from the grave; configuring the graveside communications device to activate an energy emitter adapted to physically interact with the grave responsive to the remote user's activity; and, sending to the user's communication device from the graveside communications device a live indication of the energy emitter physical interaction with the grave.

Embodiment 2

The process of Embodiment 1, wherein the energy emitter further comprises a laser pointer adapted to emit light energy.

Embodiment 3

The process of Embodiment 2, wherein the laser pointer is disposed to direct light emitted by the laser pointer at a surface of the memorial when the laser pointer is activated.

Embodiment 4

The process of Embodiment 3, wherein the process further comprises: receiving, by the graveside device, an electronic message comprising a command to the graveside device to redirect the laser pointer so that the light emitted by the laser pointer moves from a first location on a surface of the memorial to a second location on a surface of the memorial.

Embodiment 5

The process of Embodiment 4, wherein the process further comprises: sending, by the graveside device, an electronic message comprising an indication the light emitted by the laser pointer moved from the first location on a surface of the memorial to a second location on a surface of the memorial, determined based on the graveside device detecting the laser pointer light reflected from the first location on a surface of the memorial and the laser pointer light reflected from the second location on a surface of the memorial.

Embodiment 6

The process of Embodiment 5, wherein the laser pointer light is modulated as a function of the user activity.

Embodiment 7

The process of Embodiment 6, wherein the process further comprises: receiving, by the graveside device, an electronic message comprising data representative of sound captured by the user's device; and, modulating, by the graveside device, the laser pointer light as a function of the sound captured by the user's device.

Embodiment 8

The process of Embodiment 1, wherein the energy emitter further comprises a low frequency audio transducer adapted to emit sound energy constrained to a frequency range below the lower limit of the human-audible frequency range, and wherein the sound energy emitted is not audible by humans when the audio transducer is activated.

Embodiment 9

The process of Embodiment 8, wherein the low frequency audio transducer is disposed to direct sound emitted from the low frequency audio transducer at the memorial when the low frequency audio transducer is activated.

Embodiment 10

The process of Embodiment 9, wherein the process further comprises: receiving, by the graveside device, an electronic message comprising data representative of sound captured by the user's device; and, activating, by the graveside device, the low frequency audio transducer as a function of the sound captured by the user's device.

Embodiment 11

A machine, comprising: a graveside memorial telepresence apparatus, comprising: a processor; a video camera, operably and communicatively coupled with the processor; a wireless communication interface, operably and communicatively coupled with the processor; and, a memory that is not a transitory propagating signal, the memory operably connected to the processor and encoding computer readable instructions, including processor executable program instructions, the computer readable instructions accessible to the processor, wherein the processor executable instructions, when executed by the processor, cause the processor to perform operations comprising: exchange multimedia between a grave and a user's communications device remote from the grave; activate an energy emitter adapted to physically interact with the grave responsive to the remote user's activity; and, send to the user's communication device a live indication of the energy emitter physical interaction with the grave.

Embodiment 12

The apparatus of Embodiment 11, wherein the video camera further comprises a microphone.

Embodiment 13

The apparatus of Embodiment 11, wherein multimedia further comprises at least one of audio, an image, or video.

Embodiment 14

The apparatus of Embodiment 11, wherein exchange multimedia further comprises send an electronic message comprising multimedia captured at the grave.

Embodiment 15

The apparatus of Embodiment 11, wherein exchange multimedia further comprises receive an electronic message comprising multimedia captured by the user's communications device remote from the grave.

Embodiment 16

The apparatus of Embodiment 11, wherein the energy emitter further comprises a laser pointer adapted to emit light energy.

Embodiment 17

The apparatus of Embodiment 16, wherein the laser pointer is disposed to direct light emitted by the laser pointer at a surface of the memorial when the laser pointer is activated.

Embodiment 18

The apparatus of Embodiment 17, wherein the operations performed by the processor further comprise: receive an electronic message comprising a command to redirect the laser pointer so that the light emitted by the laser pointer moves from a first location on a surface of the memorial to a second location on a surface of the memorial.

Embodiment 19

The apparatus of Embodiment 18, wherein the operations performed by the processor further comprise: sending an electronic message comprising an indication the light emitted by the laser pointer moved from the first location on a surface of the memorial to the second location on a surface of the memorial, determined based on detecting the laser pointer light reflected from the first location on a surface of the memorial and the laser pointer light reflected from the second location on a surface of the memorial.

Embodiment 20

The apparatus of Embodiment 19, wherein the laser pointer light is modulated as a function of the user activity.

Embodiment 21

The apparatus of Embodiment 20, wherein the operations performed by the processor further comprise: receive an electronic message comprising data representative of sound captured by the user's device; and, modulating the laser pointer light as a function of the sound captured by the user's device.

Embodiment 22

The apparatus of Embodiment 11, wherein the energy emitter further comprises a low frequency audio transducer adapted to emit sound energy constrained to a frequency range below the lower limit of the human-audible frequency range, and wherein the sound energy emitted is not audible by humans when the audio transducer is activated.

Embodiment 23

The apparatus of Embodiment 22, wherein the low frequency audio transducer is disposed to direct sound emitted from the low frequency audio transducer at the memorial when the low frequency audio transducer is activated.

Embodiment 24

The apparatus of Embodiment 23, wherein the operations performed by the processor further comprise: receive an electronic message comprising data representative of sound captured by the user's device; and, activating the low frequency audio transducer as a function of the sound captured by the user's device.

Embodiment 25

A machine, comprising: a graveside memorial telepresence apparatus, comprising: a processor; a video camera, comprising an optical image sensor and a microphone, wherein the video camera is operably and communicatively coupled with the processor; a wireless communication interface, operably and communicatively coupled with the processor; an energy emitter, comprising: a laser pointer adapted to emit light energy, wherein the laser pointer is operably and communicatively coupled with the processor, and wherein the laser pointer orientation in three dimensional space is governed by a pan and tilt apparatus operably and communicatively coupled with the laser pointer and the processor; and, a low frequency audio transducer adapted to emit sound energy constrained to a frequency range below the lower limit of the human-audible frequency range, wherein the low frequency audio transducer is disposed to direct sound emitted from the low frequency audio transducer at the memorial when the low frequency audio transducer is activated, and wherein the low frequency audio transducer is operably and communicatively coupled with the processor; and, a memory that is not a transitory propagating signal, the memory operably connected to the processor and encoding computer readable instructions, including processor executable program instructions, the computer readable instructions accessible to the processor, wherein the processor executable instructions, when executed by the processor, cause the processor to perform operations comprising: exchange multimedia between a grave and a user's communications device remote from the grave, wherein the multimedia comprises at least one of audio, an image, or video, and wherein exchange multimedia comprises: send an electronic message comprising multimedia captured at the grave; and, receive an electronic message comprising multimedia captured by the user's communications device remote from the grave; and, activate the energy emitter to physically interact with the grave responsive to the remote user's activity, comprising receiving an electronic message comprising a command to reorient the laser pointer so that the light emitted by the laser pointer moves from incidence at a first location on a surface of the memorial to incidence at a second location on a surface of the memorial; and, send to the user's communication device a live indication of the energy emitter physical interaction with the grave, comprising sending an electronic message comprising an indication the light emitted by the laser pointer moved from incidence at a first location on a surface of the memorial to incidence at a second location on a surface of the memorial, determined based on detecting the laser pointer light reflected from the first location on a surface of the memorial and detecting the laser pointer light reflected from the second location on a surface of the memorial.

Embodiment 26

The apparatus of Embodiment 25, wherein the laser pointer light is modulated as a function of the user activity.

Embodiment 27

The apparatus of Embodiment 25, wherein the operations performed by the processor further comprise: receive an electronic message comprising data representative of sound captured by the user's device; and, modulate the laser pointer light as a function of the sound captured by the user's device.

Embodiment 28

The apparatus of Embodiment 25, wherein the operations performed by the processor further comprise: receive an electronic message comprising data representative of sound captured by the user's device; and, activate the low frequency audio transducer as a function of the sound captured by the user's device.

Embodiment 29

The apparatus of Embodiment 25, wherein detecting the laser pointer light further comprises object tracking as a function of video captured by the graveside memorial telepresence apparatus.

Embodiment 30

The apparatus of Embodiment 25, wherein detecting the laser pointer light further comprises optical flow as a function of video captured by the graveside memorial telepresence apparatus.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method to provide telepresence at a graveside memorial, comprising:
    configuring a graveside communications device to exchange multimedia between a grave and a user's communications device remote from the grave;
    configuring the graveside communications device to activate an energy emitter adapted to physically interact with the grave responsive to the remote user's activity; and,
    sending to the user's communication device from the graveside communications device a live indication of the energy emitter physical interaction with the grave;
    wherein the energy emitter further comprises a laser pointer adapted to emit light energy;
    wherein the laser pointer is disposed to direct light emitted by the laser pointer at a surface of the memorial when the laser pointer is activated; and
    wherein the method further comprises: receiving, by the graveside device, an electronic message comprising a command to the graveside device to redirect the laser pointer so that the light emitted by the laser pointer moves from a first location on a surface of the memorial to a second location on a surface of the memorial.

2. The method of claim 1, wherein the method further comprises: sending, by the graveside device, an electronic message comprising an indication the light emitted by the laser pointer moved from the first location on a surface of the memorial to the second location on a surface of the memorial, determined based on the graveside device detecting the laser pointer light reflected from the first location on a surface of the memorial and the laser pointer light reflected from the second location on a surface of the memorial.

3. The method of claim 2, wherein the laser pointer light is modulated as a function of the user activity.

4. The method of claim 3, wherein the method further comprises: receiving, by the graveside device, an electronic message comprising data representative of sound captured by the user's device; and, modulating, by the graveside device, the laser pointer light as a function of the sound captured by the user's device.

5. A method to provide telepresence at a graveside memorial, comprising:
  configuring a graveside communications device to exchange multimedia between a grave and a user's communications device remote from the grave;
  configuring the graveside communications device to activate an energy emitter adapted to physically interact with the grave responsive to the remote user's activity; and,
  sending to the user's communication device from the graveside communications device a live indication of the energy emitter physical interaction with the grave;
  wherein the energy emitter further comprises a low frequency audio transducer adapted to emit sound energy constrained to a frequency range below the lower limit of the human-audible frequency range, and wherein the sound energy emitted is not audible by humans when the audio transducer is activated; and
  wherein the low frequency audio transducer is disposed to direct sound emitted from the low frequency audio transducer at the memorial when the low frequency audio transducer is activated.

6. The method of claim 5, wherein the method further comprises: receiving, by the graveside device, an electronic message comprising data representative of sound captured by the user's device; and, activating, by the graveside device, the low frequency audio transducer as a function of the sound captured by the user's device.

7. An apparatus configured to provide telepresence at a graveside memorial, comprising:
  a processor;
  a video camera, operably and communicatively coupled with the processor;
  a wireless communication interface, operably and communicatively coupled with the processor; and,
  a memory that is not a transitory propagating signal, the memory operably connected to the processor and encoding computer readable instructions, including processor executable program instructions, the computer readable instructions accessible to the processor, wherein the processor executable instructions, when executed by the processor, cause the processor to perform operations comprising:
    exchange multimedia between a grave and a user's communications device remote from the grave;
    activate an energy emitter adapted to physically interact with the grave responsive to the remote user's activity; and,
    send to the user's communication device a live indication of the energy emitter physical interaction with the grave;
  wherein the energy emitter further comprises a laser pointer adapted to emit light energy;
  wherein the laser pointer is disposed to direct light emitted by the laser pointer at a surface of the memorial when the laser pointer is activated; and
  wherein the operations performed by the processor further comprise: receive an electronic message comprising a command to redirect the laser pointer so that the light emitted by the laser pointer moves from a first location on a surface of the memorial to a second location on a surface of the memorial.

8. The apparatus of claim 7, wherein the operations performed by the processor further comprise: send an electronic message comprising an indication the light emitted by the laser pointer moved from the first location on a surface of the memorial to the second location on a surface of the memorial, determined based on detecting the laser pointer light reflected from the first location on a surface of the memorial and the laser pointer light reflected from the second location on a surface of the memorial.

9. The apparatus of claim 8, wherein the laser pointer light is modulated as a function of the user activity.

10. The apparatus of claim 9, wherein the operations performed by the processor further comprise: receive an electronic message comprising data representative of sound captured by the user's device; and, modulate the laser pointer light as a function of the sound captured by the user's device.

11. An apparatus configured to provide telepresence at a graveside memorial, comprising:
  a processor;
  a video camera, operably and communicatively coupled with the processor;
  a wireless communication interface, operably and communicatively coupled with the processor; and,
  a memory that is not a transitory propagating signal, the memory operably connected to the processor and encoding computer readable instructions, including processor executable program instructions, the computer readable instructions accessible to the processor, wherein the processor executable instructions, when executed by the processor, cause the processor to perform operations comprising:
    exchange multimedia between a grave and a user's communications device remote from the grave;
    activate an energy emitter adapted to physically interact with the grave responsive to the remote user's activity; and,
    send to the user's communication device a live indication of the energy emitter physical interaction with the grave;
  wherein the energy emitter further comprises a low frequency audio transducer adapted to emit sound energy constrained to a frequency range below the lower limit of the human-audible frequency range, and wherein the sound energy emitted is not audible by humans when the audio transducer is activated; and
  wherein the low frequency audio transducer is disposed to direct sound emitted from the low frequency audio transducer at the memorial when the low frequency audio transducer is activated.

12. The apparatus of claim 11, wherein the operations performed by the processor further comprise: receive an electronic message comprising data representative of sound captured by the user's device; and, activate the low frequency audio transducer as a function of the sound captured by the user's device.

13. An apparatus configured to provide telepresence at a graveside memorial, comprising:

a processor;

a video camera, comprising an optical image sensor and a microphone, wherein the video camera is operably and communicatively coupled with the processor;

a wireless communication interface, operably and communicatively coupled with the processor;

an energy emitter, comprising:

a laser pointer adapted to emit light energy, wherein the laser pointer is operably and communicatively coupled with the processor, and wherein the laser pointer orientation in three dimensional space is governed by a pan and tilt control operably and communicatively coupled with the laser pointer and the processor; and, a low frequency audio transducer adapted to emit sound energy constrained to a frequency range below the lower limit of the human-audible frequency range, wherein the low frequency audio transducer is disposed to direct sound emitted from the low frequency audio transducer at the memorial when the low frequency audio transducer is activated, and wherein the low frequency audio transducer is operably and communicatively coupled with the processor; and, a memory that is not a transitory propagating signal, the memory operably connected to the processor and encoding computer readable instructions, including processor executable program instructions, the computer readable instructions accessible to the processor, wherein the processor executable instructions, when executed by the processor, cause the processor to perform operations comprising:

exchange multimedia between a grave and a user's communications device remote from the grave, wherein the multimedia comprises at least one of audio, an image, or video, and wherein exchange multimedia comprises:

send an electronic message comprising multimedia captured at the grave; and, receive an electronic message comprising multimedia captured by the user's communications device remote from the grave; and, activate the energy emitter to physically interact with the grave responsive to the remote user's activity, comprising: receive an electronic message comprising a command to reorient the laser pointer so that the light emitted by the laser pointer moves from incidence at a first location on a surface of the memorial to incidence at a second location on a surface of the memorial; and, send to the user's communication device a live indication of the energy emitter physical interaction with the grave, comprising: send an electronic message comprising an indication the light emitted by the laser pointer moved from incidence at a first location on a surface of the memorial to incidence at a second location on a surface of the memorial, determined based on detecting the laser pointer light reflected from the first location on a surface of the memorial and detecting the laser pointer light reflected from the second location on a surface of the memorial.

14. The apparatus of claim 13, wherein the laser pointer light is modulated as a function of the user activity.

15. The apparatus of claim 13, wherein the operations performed by the processor further comprise: receive an electronic message comprising data representative of sound captured by the user's device; and, modulate the laser pointer light as a function of the sound captured by the user's device.

16. The apparatus of claim 13, wherein the operations performed by the processor further comprise: receive an electronic message comprising data representative of sound captured by the user's device; and, activate the low frequency audio transducer as a function of the sound captured by the user's device.

17. The apparatus of claim 13, wherein detecting the laser pointer light further comprises object tracking as a function of video captured by the graveside memorial telepresence apparatus.

18. The apparatus of claim 13, wherein detecting the laser pointer light further comprises optical flow as a function of video captured by the graveside memorial telepresence apparatus.

* * * * *